(12) United States Patent
Khalid et al.

(10) Patent No.: US 12,739,670 B2
(45) Date of Patent: Sep. 15, 2026

(54) METHODS AND APPARATUS FOR PROVIDING SPECTRUM ACCESS SYSTEM SERVICE CONTINUITY

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 238 days.

(21) Appl. No.: 18/659,576

(22) Filed: May 9, 2024

(65) Prior Publication Data

US 2025/0350968 A1 Nov. 13, 2025

(51) Int. Cl.
*H04W 24/06* (2009.01)
*H04W 88/08* (2009.01)

(52) U.S. Cl.
CPC ............ *H04W 24/06* (2013.01); *H04W 88/08* (2013.01)

(58) Field of Classification Search
CPC ..................................................... H04W 24/06
See application file for complete search history.

(56) References Cited

U.S. PATENT DOCUMENTS

2017/0055193 A1* 2/2017 Mueck .................. H04W 16/14
2019/0053186 A1* 2/2019 Mueck .................. H04W 60/02
2021/0400498 A1* 12/2021 Loffe .................... H04W 60/00
2022/0210819 A1* 6/2022 Sevindik ............. H04W 72/535
2022/0394491 A1* 12/2022 Khawer ................ H04W 16/14
2025/0106641 A1* 3/2025 Gurney ................. H04W 12/63
2025/0176006 A1* 5/2025 Furuichi ............... H04W 16/14
2025/0240639 A1* 7/2025 Furuichi ........... H04W 72/0457

* cited by examiner

*Primary Examiner* — David Bilodeau
(74) *Attorney, Agent, or Firm* — Straub & Straub; Stephen T. Straub; Michael P. Straub

(57) ABSTRACT

The present invention relates to methods and apparatus for testing and mitigating problems with Spectrum Access System (SAS) service provider systems. An exemplary method includes performing, by an SAS switch and availability function (SSAF), one or more tests on a first SAS service provider system, the first SAS service provider system providing SAS services to one or more wireless base stations (e.g., CBSDs) of a first wireless network (e.g., a first CBRS network); and determining whether or not the first SAS service provider system is experiencing problems providing SAS services to the first wireless network based on results of the one or more tests performed on the first SAS service provider system. In response to determining that there are problems with the first SAS service provider system switching the one or more wireless base stations to a second SAS service provider system.

20 Claims, 14 Drawing Sheets

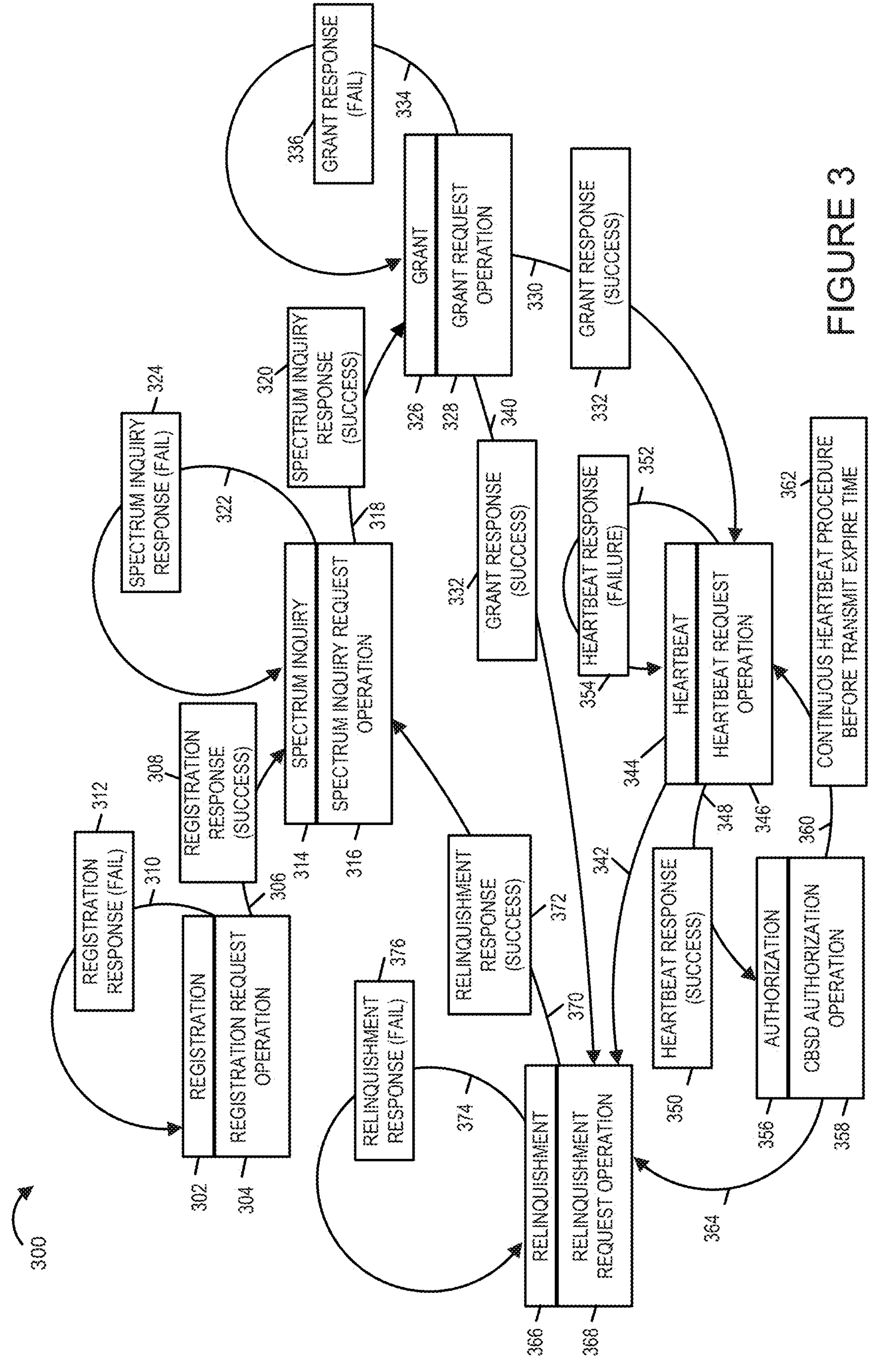
300
REGISTRATION
REGISTRATION REQUEST OPERATION
302
304
REGISTRATION RESPONSE (FAIL)
310
312
REGISTRATION RESPONSE (SUCCESS)
306
308
SPECTRUM INQUIRY
SPECTRUM INQUIRY REQUEST OPERATION
314
316
SPECTRUM INQUIRY RESPONSE (FAIL)
322
324
SPECTRUM INQUIRY RESPONSE (SUCCESS)
318
320
GRANT
GRANT REQUEST OPERATION
326
328
GRANT RESPONSE (FAIL)
334
336
GRANT RESPONSE (SUCCESS)
330
332
GRANT RESPONSE (SUCCESS)
340
332
HEARTBEAT
HEARTBEAT REQUEST OPERATION
344
346
348
HEARTBEAT RESPONSE (FAILURE)
352
354
HEARTBEAT RESPONSE (SUCCESS)
350
CONTINUOUS HEARTBEAT PROCEDURE BEFORE TRANSMIT EXPIRE TIME
360
362
AUTHORIZATION
CBSD AUTHORIZATION OPERATION
356
358
364
342
RELINQUISHMENT
RELINQUISHMENT REQUEST OPERATION
366
368
RELINQUISHMENT RESPONSE (SUCCESS)
370
372
RELINQUISHMENT RESPONSE (FAIL)
374
376
FIGURE 3

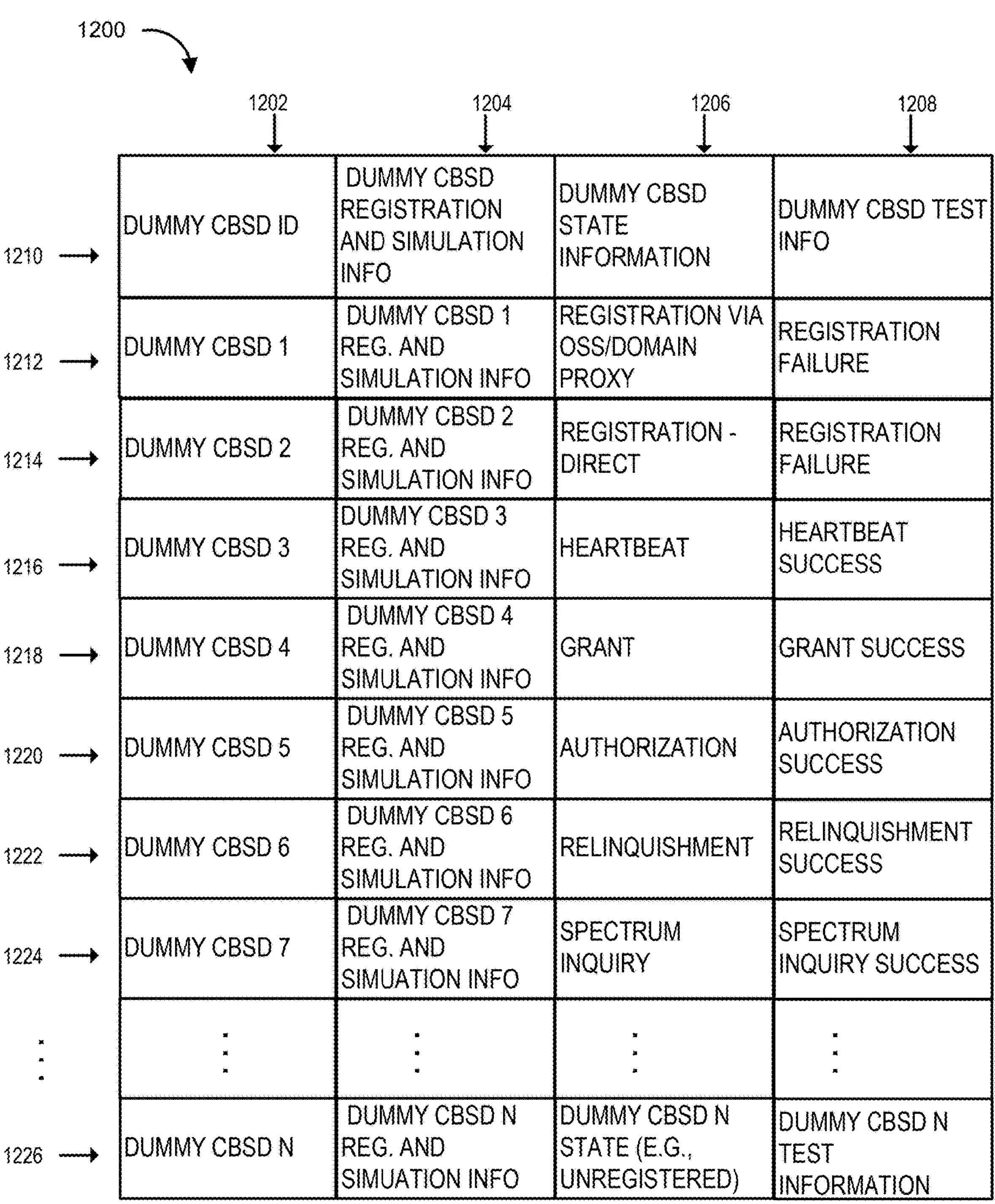

| DUMMY CBSD ID | DUMMY CBSD REGISTRATION AND SIMULATION INFO | DUMMY CBSD STATE INFORMATION | DUMMY CBSD TEST INFO |
|---|---|---|---|
| DUMMY CBSD 1 | DUMMY CBSD 1 REG. AND SIMULATION INFO | REGISTRATION VIA OSS/DOMAIN PROXY | REGISTRATION FAILURE |
| DUMMY CBSD 2 | DUMMY CBSD 2 REG. AND SIMULATION INFO | REGISTRATION - DIRECT | REGISTRATION FAILURE |
| DUMMY CBSD 3 | DUMMY CBSD 3 REG. AND SIMULATION INFO | HEARTBEAT | HEARTBEAT SUCCESS |
| DUMMY CBSD 4 | DUMMY CBSD 4 REG. AND SIMULATION INFO | GRANT | GRANT SUCCESS |
| DUMMY CBSD 5 | DUMMY CBSD 5 REG. AND SIMULATION INFO | AUTHORIZATION | AUTHORIZATION SUCCESS |
| DUMMY CBSD 6 | DUMMY CBSD 6 REG. AND SIMULATION INFO | RELINQUISHMENT | RELINQUISHMENT SUCCESS |
| DUMMY CBSD 7 | DUMMY CBSD 7 REG. AND SIMUATION INFO | SPECTRUM INQUIRY | SPECTRUM INQUIRY SUCCESS |
| ⋮ | ⋮ | ⋮ | ⋮ |
| DUMMY CBSD N | DUMMY CBSD N REG. AND SIMUATION INFO | DUMMY CBSD N STATE (E.G., UNREGISTERED) | DUMMY CBSD N TEST INFORMATION |

FIGURE 12

METHODS AND APPARATUS FOR PROVIDING SPECTRUM ACCESS SYSTEM SERVICE CONTINUITY

FIELD OF INVENTION

The present invention relates to methods and apparatus for providing Spectrum Access System service continuity (e.g., radio service continuity). The present invention also relates to methods and apparatus for identifying Spectrum Access System service provider outages and/or reliability problems in providing Spectrum Access System services.

BACKGROUND OF THE INVENTION

In a wireless network, wireless base stations (e.g., Citizens Broadband Radio Service Devices (CBSDs) in Citizen Broadband Radio Service (CBRS) networks) serve as access points which can support wireless communications with mobile devices and/or terminals also referred to herein as user equipment devices (UEs). In some such wireless networks there are multiple tiers defining what frequency spectrum bands may be used and the amount of interference that the users may cause. In the CBRS wireless network for example there are three tiers. Tier 1 is an incumbent access tier. Tier 2 is a Priority Access Tier. Tier 3 is General Authorized Access tier. The Priority Access tier consists of Priority Access Licenses (PALs) that are licensed by the government to operate in a specific geographic area. With respect to the CBRS wireless system the Priority Access Licenses are on a county-by-county basis. Each PAL consisting of a 10 megahertz channel within the 3550-3650 MHz band. While the Priority Access Licenses must protect and accept interference from Incumbent Access users such as for example, authorized federal users in the 3550-3700 MHz band and Fixed Satellite Service (space-to-Earth) earth stations in the 3600-3650 MHz band, the Priority Access Licenses receive protection from General Authorized Access (GAA) users. The General Authorized Access tier is licensed-by-rule to permit open, flexible access to the band with the intent of allowing access to the widest possible group of potential users. While the GAA users are permitted to operate throughout the 3550-3700 MHz band, GAA users must not cause harmful interference to Incumbent Access users or Priority Access Licensees. Furthermore, GAA users must accept interference from the Incumbent Access users and the Priority Access Licensees. Moreover, GAA users have no expectation of interference protection from other GAA users. In shared spectrum wireless networks such as CBRS networks each wireless base station (e.g., CBSD) is connected to and registered with a network resource allocation management device which manages the utilization of the shared spectrum.

In CBRS networks the resource allocation management device is called the Spectrum Access System (SAS). The resource allocation management device, e.g., Spectrum Access System in a CBRS network, is a central processing and database system that receives and processes spectrum grant requests managing the utilization of the CBRS networks spectrum. In such wireless networks, e.g., CBRS network, interference is managed through power management of wireless base station devices (e.g., CBSD devices) by the resource allocation management device, e.g., the Spectrum Access System (SAS). The resource allocation management device (e.g., SAS) stores information regarding which wireless base station (e.g., CBSD) uses how much spectrum at which location in the wireless network, e.g., CBRS network. When a specific amount of GAA spectrum is granted to a particular wireless base station (e.g., CBSD) with a specific transmission power, the resource allocation management device (e.g., SAS) calculates the coverage of this wireless base station (e.g., CBSD) by using a path-loss model. The resource allocation management device (e.g., SAS) monitors and manages the interference caused by the different wireless base stations and adjusts the transmission power of the different wireless base stations to minimize the interference while maximizing the utilization of the limited frequency spectrum which is available.

With respect to CBRS systems, the Federal Communications Commission (FCC) has designated a limited number of SAS administrators (e.g., Google, Federated Wireless Systems, Sony, etc.) also referred to herein as SAS service providers which interface with the SAS (e.g., a cloud based SAS database) providing SAS services as defined per FCC regulations and requirements. Whenever a CBRS network operator wants to utilize CBRS spectrum, the CBRS operator needs to communicate with one of the SAS service providers to obtain SAS services such as the allocation of spectrum for use. With respect to most CBRS network operators, the SAS service providers are third party companies which are providing the SAS service required to operate using CBRS spectrum. Due to the service model used by these third party SAS service providers, in at least some instances they have different levels of availability (i.e., 99% or more etc. availability to handle requests for services). However, this level of availability is not always provided by a given third party SAS provider and an SAS infrastructure outage of the SAS service provider's system (e.g., failure of nodes or maintenance occurring on nodes of the SAS service provider's system) can result in a CBRS network operator's wireless network outage as well. This SAS service outage (i.e., an SAS service provider's system not being able to provide one or more SAS services (e.g., because of an SAS service provider system problem, outage or failure) negatively impacts CBRS network operator's wireless networks which are relying on the SAS service provider.

From the foregoing, it should be understood that there is a need for new and/or improved methods and apparatus for achieving ways to ensure that in the event a SAS service provider's system has a problem and/or outage, the impact on the wireless networks relying on the SAS service provider are minimized and/or eliminated. Furthermore, there is a need for new and/or improved methods and apparatus for solving the technical problem of how to provide a System Access System service provider backup in an efficient and cost effective way. Furthermore, there is a need for new and/or improved methods and apparatus for detecting, e.g., by a wireless network operator, problems and/or outages with the availability of services provided by an SAS service provider system. There is a further need for new and/or approved methods and apparatus for switching from a primary SAS service provider system to one or more backup SAS service provider systems upon the detection of problems and/or outages with the availability of services provided by the primary SAS service provider system in an effective and efficient manner (e.g., a cost effective and efficient manner) while minimizing and/or eliminating wireless network service interruptions at a wireless network receiving SAS services from the primary SAS service provider system. There is a further need to determine which SAS services provided by an SAS service provider are experiencing problems and/or are offline and provide alerts to an operator and/or users of the wireless network(s) which is relying upon the SAS service provider system.

SUMMARY OF THE INVENTION

The present invention provides new and/or improved methods and apparatus for ensuring that in the event a System Access System service provider's system has a problem and/or outage, the impact on the wireless networks relying on the SAS service provider are minimized and/or eliminated. Various embodiments of the present invention provide new and/or improved methods and apparatus for solving the technical problem of how to provide a System Access System service provider backup in an efficient and cost effective way. Various embodiments of the present invention provider new and/or improved methods and apparatus for detecting, e.g., by a wireless network operator, problems and/or outages with the availability of services provided by an SAS service provider system. Various embodiments of the present invention provider new and/or approved methods and apparatus for switching from a primary SAS service provider system to one or more backup SAS service provider systems upon the detection of problems and/or outages with the availability of services provided by the primary SAS service provider system in an effective and efficient manner (e.g., a cost effective and efficient manner) while minimizing and/or eliminating wireless network service interruptions at a wireless network receiving SAS services from the primary SAS service provider system. Various embodiments of the present invention provide new and/or improved methods and apparatus for determining which SAS services provided by an SAS service provider are experiencing problems and/or are offline and provide alerts to a network operator and/or users of the wireless network(s) which are relying upon the SAS service provider system.

In an exemplary embodiment of the present invention, a System Access System Switch and Availability Function (SSAF) entity tests the availability and performance of SAS services provided by a first SAS service provider system by sending it requests on behalf of one or more dummy wireless base stations (e.g., dummy CBSDs which are fictious non-existent CBSDs). Based on the results of the tests, when the SSAF entity determines that the first SAS service provider is experiencing problems, the SSAF entity switches the wireless base stations of the wireless network to a second SAS service provider system. The switchover also referred to as a move or migration may be, and in some embodiments is, performed without interrupting of minimizing the interruption of the wireless services being provided by the migrated base stations (e.g., radio continuity is maintained or interruptions minimized).

An exemplary method in accordance with one embodiment of the present invention includes the steps of: performing (e.g., by an SAS switch and availability function (SSAF) entity) one or more tests on a first Spectrum Access System (SAS) service provider system, said first SAS service provider system providing SAS services to one or more wireless base stations (e.g., CBSDs) of a first wireless network (e.g., a first CBRS network); and determining whether or not the first SAS service provider system is experiencing problems providing SAS services to the first wireless network based on results of the one or more tests performed on the first SAS service provider system.

In some embodiments, the SAS services include one or more of the following: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

In various embodiments, the first wireless network is a Citizen Broadband Radio Service (CBRS) network; and the one or more wireless base stations are Citizens Broadband Radio Service Devices (CBSDs).

In some embodiments, the one or more tests are performed by a Spectrum Access System switch and availability function (SSAF).

In some embodiments, the SSAF is implemented as a function of an Operating Service Systems (OSS) or Domain Proxy of the first wireless network.

In some embodiments, the functionality of the SSAF is implemented as a cloud service.

In some embodiments, the functionality of the SSAF is implemented using one or more entities, devices or nodes.

In various embodiments, the step of performing one or more tests on the first SAS service provider system includes requesting one or more SAS services be provided for a first dummy wireless base station (e.g., a first dummy CBSD) of the first wireless network, said first dummy wireless base station being a fictious non-existent wireless base station.

In some embodiments the step of performing one or more tests on the first SAS service provider system includes: requesting one or more SAS services be provided for a first dummy wireless base station (e.g., a first dummy CBSD) of the first wireless network, said first dummy wireless base station being a non-operating CBSD belonging to the first wireless base station (e.g., a CBSD owned by the first wireless network operator which is not in service and/or a CBSD registered with the FCC as belonging to the first wireless network but which is not in service). In some embodiments, the first dummy wireless base station is a fictious non-existent wireless base station.

In some embodiments, the method further includes that prior to performing said one or more tests on the first SAS service provider system, the SSAF performs the step of generating information for registering a first dummy wireless base station with a Spectrum Access System (e.g., an FCC Spectrum Access System).

In some embodiments, the method further includes the step of storing, by the SSAF, the generated information for registering the first dummy wireless base station in a database.

In some embodiments, the information for registering the first dummy wireless base station with a Spectrum Access System includes fictious information (e.g., fictious information or made up information on the location at which the first dummy wireless base station is deployed).

In some embodiments, the information for registering the first dummy wireless base station with a Spectrum Access System further includes information corresponding to a wireless base station model certified with the Federal Communications Commission (e.g., fccid of a CBSD model which has been certified with the Federal Communications Commission—the same fccid corresponding to a certified CBSD model may be used for multiple CBSDs produced in accordance with the specifications of the certified model).

In some embodiments, the information for registering the first dummy wireless base station with a Spectrum Access System further includes information corresponding to an actual wireless base station (e.g., userid, fccid, cbsdSerialNumber of a certified CBSD which is not currently operational and will remain non-operational while the first dummy CBSD is registered with an SAS service provider).

In some embodiments, the first dummy wireless base station is a first dummy CBSD; and the information for registering the first dummy wireless base station with a Spectrum Access System includes one or more of the following: userid, fccid, cbsdSerialNumber, cbsdCategory, airinterface, measCapability, latitude, longitude, height, heightType, indoorDeployment, antennaAzimuth, antenna-Downtilt, antennaGain, antennaBeamwidth for the first dummy CBSD.

In some embodiments, the information for registering the first dummy wireless base station with the Spectrum Access System includes fictitious information not corresponding to an actual CBSD (e.g., fictitious location information such as latitude, longitude and height of the deployment of the CBSD base station).

In some embodiments, the first dummy wireless base station is a first dummy CBSD; and the information for registering the first dummy wireless base station with a Spectrum Access System includes one or more of the following: userid, fccid, cbsdSerialNumber, cbsdCategory, airinterface, measCapability, latitude, longitude, height, heightType, indoorDeployment, antennaAzimuth, antenna-Downtilt, antennaGain, antennaBeamwidth for the first dummy CBSD, said information for registering the first dummy wireless base station with the Spectrum Access System corresponding to an actual CBSD which is not operating.

In some embodiments, the step of performing one or more tests on the first SAS service provider system includes: emulating by the SAS switch and availability function one or more dummy CBSDs (e.g., non-operating and/or fictious CBSDs) requesting one or more SAS services from the first SAS service provider system. In some embodiments, the step of determining, by the SAS switch and availability function, which of the one or more SAS services requested by the SAS switch and availability function are experiencing problems based on one or more of the following: (i) one or more responses received by the SAS switch and availability function from the first SAS service provider system in response to the one or more SAS service requests, or (ii) failure to receive one or more responses by the SAS switch and availability function from the first SAS service provider system to the one or more SAS service requests.

In some embodiments, emulating by the SAS switch and availability function one or more dummy CBSDs requesting one or more SAS services from the first SAS service provider system includes: sending SAS service request messages to the first SAS service provider system requesting the one or more SAS services.

In some embodiments, the one or more SAS services are one or more of the following SAS services: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

In some embodiments, the one or more tests performed on the first SAS service provider system include tests to register one or more dummy wireless base station (e.g., dummy CBSD) with a Spectrum Access System (SAS).

In some embodiments, the step of determining whether or not the first SAS service provider system is experiencing problems providing SAS services to the first wireless network based on results of the one or more tests performed on the first SAS service provider system includes: making the determination that the first SAS service provider system is experiencing problems providing SAS services to the first wireless network when the results of the one or more tests performed on the first SAS service provider system indicate that the SAS service provider system is unable to register the one or more dummy wireless base stations with the SAS.

In some embodiments, the step of determining whether or not the first SAS service provider system is experiencing problems providing services to the first wireless network based on the results of the one or more tests performed on the first SAS service provider system includes: determining that the first SAS service provider system is experiencing problems when the test results indicate no response was received for a threshold number of SAS requests (e.g., dummy CBSD registration requests, dummy CBSD spectrum grant requests, dummy CBSD heartbeat requests) sent to the first SAS service provider system by the SSAF on behalf of one or more dummy CBSDs within a first period of time, said one or more dummy CBSDs being fictious non-existent CBSDs.

In some embodiments, the method further includes the additional steps of: migrating or switching wireless base stations of the first wireless network to a second SAS service provider system in response to determining that the first SAS service provider system is experiencing problems (e.g., has failed); performing on an on-going basis additional tests on the first SAS service provider system to determine when the first SAS service provider system SAS service has been restored (e.g., is back up and running); and upon detecting that the first SAS service provider system SAS service has been restored migrating or switching the wireless base stations of the first wireless network which had been switched to the second SAS service provider system back to the first SAS service provider system.

In some embodiments, the method further includes that prior to migrating or switching wireless base stations of the first wireless network to the second SAS service provider system, determining by the SSAF that a Spectrum Access System (SAS) is available, said SAS being an FCC SAS with which the first SAS service provider system is interacting to provide SAS services.

In some embodiments, the method further includes that prior to migrating or switching wireless base stations of the first wireless network to the second SAS service provider system, performing by the SSAF tests on the second SAS service provider system by sending dummy wireless base station service requests to the second SAS service provider system. In some embodiments, the SSAF upon detecting issue(s) with the first and/or second SAS service provider system (e.g., failure to provide one or more SAS services) send a notification to an operator of the SAS service provider system and/or the operator of the wireless network system.

The present invention is also applicable to apparatus and system embodiments wherein one or more devices implement the steps and/or operations and/or functions of the method embodiments. In some apparatus embodiments each of the wireless base station, user equipment devices, network equipment devices, Domain Proxy, Spectrum Access System Switch and Availability Function, Spectrum Access System service provider system, and each of the other apparatus/devices/nodes of the system include one or more processors and/or hardware circuitry, input/output interfaces including receivers and transmitters, and a memory. The memory including instructions when executed by one or more of the processors control the apparatus/device/node of the system to operate to perform the steps and/or functions of various method embodiments of the invention.

For example, a communication system in accordance with one embodiment of the present invention includes a Spectrum Access System switch and availability function (SSAF) node including: memory; and a first processor that controls the SSAF node to perform the following operations: performing one or more tests on a first Spectrum Access System (SAS) service provider system, said first SAS service provider system providing SAS services to one or more wireless base stations (e.g., CBSDs) of a first wireless network (e.g., a first CBRS network); and determining whether or not the first SAS service provider system is experiencing problems providing SAS services to the first wireless network based on results of the one or more tests performed on the first SAS service provider system.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 is a CBSD state diagram in accordance with an embodiment of the present invention.

FIG. 10 comprises FIG. 10A, FIG. 10B, FIG. 10C, and FIG. 10D.

FIG. 12 illustrates an exemplary table used for storing information for dummy CBSDs in accordance with an embodiment of the present invention.

DETAILED DESCRIPTION

Figure 1:
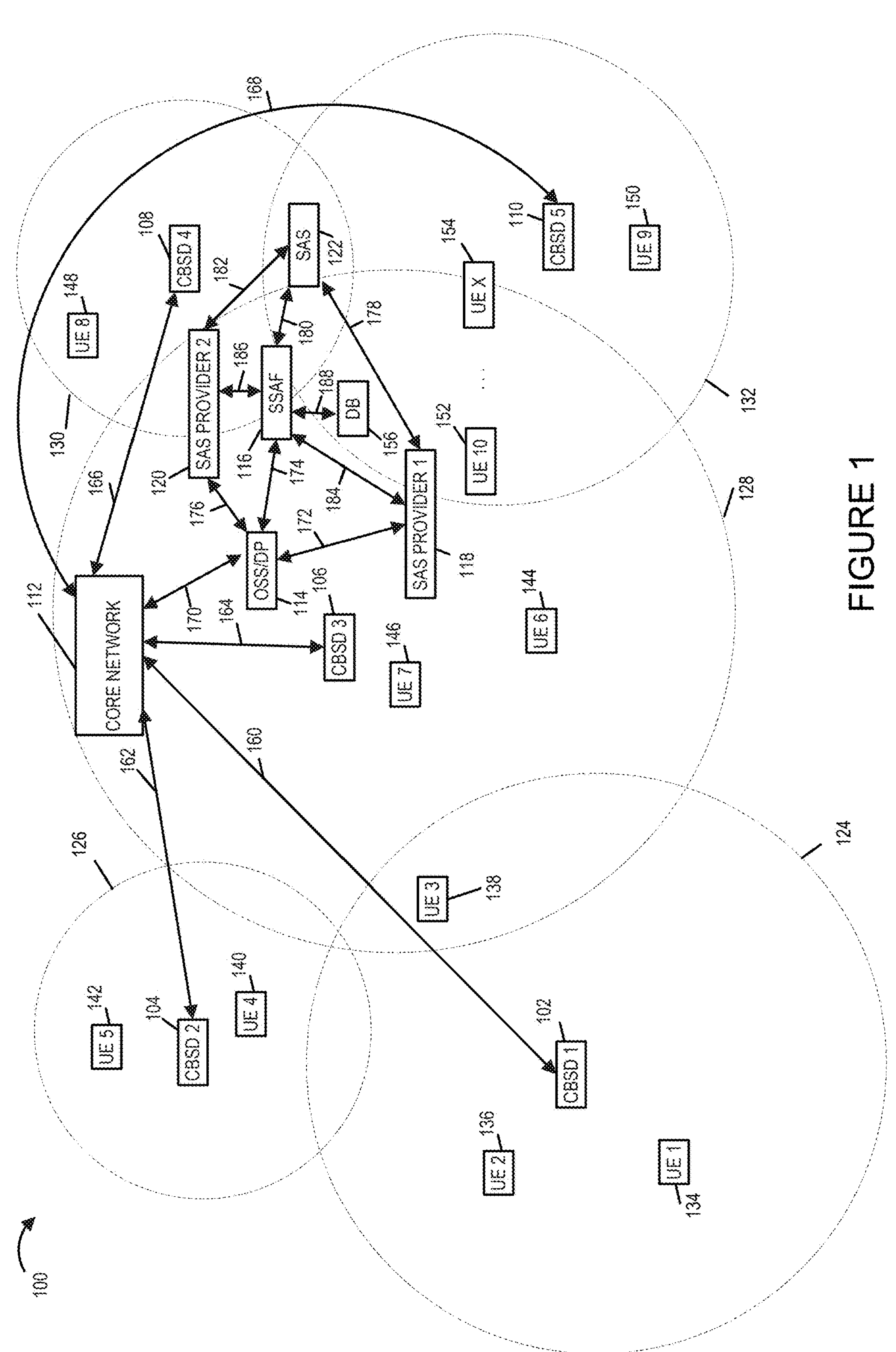
FIG. 1 illustrates an exemplary system in accordance with an embodiment of the present invention.

Citizens Broadband Radio Service (CBRS) is a tiered solution with the top tier dedicated for fixed satellite, wireless internet service providers as well as navy radar. The second tier consists of PAL (Priority Access Licensees) and the last tier consists of General Authorized Access (GAA). As previously discussed CBRS systems utilized shared spectrum which requires every single wireless base station referred to as Citizens Broadband Radio Services Devices (CBSDs) to be connected and registered to a Spectrum Access System (SAS) which manages the allocation and usage of the shared CBRS spectrum.

Access to the Spectrum Access System (SAS) (e.g., FCC SAS) is provided via Spectrum Access System (SAS) service providers also sometimes referred to as SAS administrators. The CBRS SAS service providers are designated and/or certified by the FCC. The SAS service providers operate SAS service provider systems which provide SAS services to CBRS system operators in accordance with government (e.g., FCC regulations). See for example 47 Code of Federal Regulations (CFR) Title 47—Telecommunications Charter I—Federal Communications Commission Subcharter D—Safety and Special Radio Services Part 96 Citizens Broadband Radio Service (Feb. 27, 2024) which identifies various requirements and regulations governing the operation of a CBRS network in the United States including requirements for the operation of user equipment devices, wireless base stations, and Spectrum Access Systems.

SAS service providers include for example Google, Sony and Federated Wireless System and are for the most part third parties to the CBRS network system operators. CBRS network system operators must utilize these SAS service providers to interact with the Spectrum Access System in order to operate. Among the SAS services offered by SAS service provider systems to wireless base stations (e.g., CBSDs) are registration service, de-registration service, spectrum inquiry service, spectrum grant service, heartbeat service, spectrum relinquishment service. The SAS service provider system will also perform authentication and authorization services for CBSDs with an SAS which is sometimes performed as part of the registration service. This includes the authentication or verification of the FCC identifier of any CBSD seeking access to the SAS's services is valid (i.e., FCC identification number supplied by a CBSD is for a certified device) and occurs prior to the SAS providing services.

The spectrum related services include spectrum inquiry services which include the evaluation of available spectrum in an area with respect to interference, spectrum grant services in which requested spectrum is granted to a CBSD for use to provide services, spectrum heartbeat services wherein a CBSD provides a heartbeat request message to request authorization to transmit utilizing the granted spectrum and receives in a heartbeat response message a transmitExpireTime, heartbeat interval, and a grant expiration time, and spectrum relinquishment requests in which the CBSD requests to release a spectrum grant it is no longer using.

Wireless network systems typically utilize an OSS or Domain Proxy that acts as an intermediary between the SAS service provider system and devices (e.g., CBSDs) sending SAS service requests. The SAS service provider system acts an intermediary between the Domain Proxy and the SAS. The service requests can be sent to a SAS administrator or system provider system via messages, a portal and/or an API.

As the SAS services provided by SAS service providers are mandatory for operation of CBSDs in a CBRS system, when an SAS service provider's system experiences problems (e.g., the SAS service provider system fails such that it can not provide one or more of the above discussed services) this negatively impacts the operation of CBSDs relying upon the SAS service provider system. The severity of the impact depending at least in part on the SAS service which has failed. For example, if the registration of CBSDs service fails but the other SAS services continue to be provided then only activation and registration of CBSDs will be affected but the CBSDs already registered and operating will not be impacted. This is less severe than a SAS service outage in which the service is the spectrum heartbeat service. If the SAS heartbeat service fails the spectrum granted and being used by all CBSDs will be affected and an entire CBRS network can be taken out of service as CBSDs lose the ability to utilize spectrum due to the failure of heartbeat requests.

Various embodiments of the present invention include new and/or improved methods and apparatus for a CBRS system to monitor and detect problems with a primary SAS service provider which is providing SAS services to the CBSDs of the CBRS system. Additionally, various embodiments of the present invention include methods and apparatus for automatically switching from utilizing the primary SAS service provider system for one or more SAS services in response to the detection of a problem with the primary SAS service provider system to utilizing a backup SAS service provider system until the affected SAS services of the primary SAS service provider system have been restored and/or resolved. This provides redundancy when there is a SAS service outage of the primary SAS service provider system while not requiring a full subscription with the backup SAS service provider system as it is only utilized when the primary SAS service provider system experiences a service outage. Only paying for subscription services on the backup SAS service provider system during primary SAS service provider system outages as opposed to a full subscription covering all times provides financial savings.

In some embodiments, there is a single primary SAS service provider system used by the CBRS network operator and a plurality of backup service SAS service provider systems. Upon the detection of the problems and/or issues (e.g., the failure) of the primary SAS service provider system, an SAS switch and availability function (SSAF), migrates CBSDs to the backup SAS service provider systems (e.g., if there are 3 back up services providers then a first percentage of the CBSDs are migrated to the first back up SAS service provider system, a second percentage of the CBSDs are migrated to the second backup SAS service provider system, and a third percentage are migrated to the third backup SAS service provider system. The first, second and third percentages combined being equal to or less than 100%. The combination of the first, second and third percentages being less than 100% for example when a particular SAS service of the primary SAS service provider has failed, but the failure is not impacting all of the CBSDs, e.g., if only the SAS spectrum grant service of the primary SAS service provider system is experiencing problems and/or failed, CBSDs which have already been granted spectrum and do not need to utilize the SAS grant service, may not be migrated to a backup SAS service provider system.

Various embodiments of the present invention include new and/or improved methods and/or apparatus to determine: (i) if a primary SAS service provider system is operating as expected, e.g., all SAS services are up and running, (ii) if the SAS service provider system is not operating as expected which of the SAS services and/or functions are not operating as expected, are down, and/or experiencing problems and/or failures, and (iii) if the SAS service provider is not operating as expected whether the overall SAS service (i.e., all SAS services provided by the SAS service provider system) is not operating as expected, is down and/or has failed. In addition, various embodiments of the present invention include new and/or improved methods and apparatus for moving the CBSDs registered with a primary SAS service provider system experiencing problems to a backup SAS service provider system (time based service) which is functioning as expected (e.g., for the duration of the outage of the primary SAS service provider system) and upon determination of the restoration of the primary SAS service provider system operation moving the CBSD back the primary SAS servicer provider system. Various embodiments of the present invention address the technical problem of CBRS network outages due to SAS service provider system problems, failures and/or outages and problems of how to avoid and/or minimize CBRS service interruptions due to SAS service provider problems. Furthermore, various embodiments provide an economical solution that does not require a continuous reliance on a backup SAS Service provider system.

FIG. 1 illustrates elements of an exemplary system 100 in accordance with an embodiment of the present invention. System 100 includes a Citizens Broadband Radio Service (CBRS) network operated by a wireless network operator (e.g., a CBRS network operator) including a plurality of wireless base stations referred to as Citizens Broadband Radio Service Devices (CBSDs) (CBSD 1 102, CBSD 2 104, CBSD 3106, CBSD 4 108, CBSD 5 108), a core network 112, an Operations Support Systems (OSS) including a Domain Proxy (OSS/Domain Proxy) (OSS/DP 114), a System Access System Switch and Availability Function (SSAF) entity 116, a database system 156, and a plurality of user equipment devices (UE 1 134, UE 2 136, UE 3 138, UE 4 140, UE 5 142, UE 6 144, UE 7 146, UE 8 148, UE 9 150, UE 10 152, . . . , UE X 154). The system 100 further includes a first System Access System (SAS) service provider system (SAS provider 1 118), a second System Access System service provider system (SAS provider 2 120), a System Access System (SAS) 122 (e.g., a Federal Communications Commission cloud SAS) and a plurality of communications links which couple and/or connect the various elements of the system 100 allowing for the exchange or messages, data, and/or information. The Citizens Broadband Radio Service network operates in the 150 MHz of spectrum (from 3.55 to 3.7 GHz) in the 3.5 GHz band ("Band 48"). The core network 112 is coupled and/or connected to CBSD 1 102, CBSD 2104, CBSD 3106, CBSD 4108, CBSD 5110 via communications links 160, 162, 164, 166, and 168 respectively. The communications links 160, 162, 164, 166, and

168 are typically high speed wired, fiber and/or optical communications links. However, in some embodiments, one or more of the communications links 160, 162, 164, 166 and 168 are wireless communications links. While only two SAS service provider systems are shown a plurality of SAS service provider systems greater than 2 can be, and in some embodiments are, included in the system, e.g., a plurality of N SAS servicer provider systems where N is a positive integer greater than 2.

The CBSD 1 102 has a wireless coverage area 124. The CBSD 2 104 has a wireless coverage area 126. The CBSD 3106 has a wireless coverage area 128. The CBSD 4 108 has a wireless coverage are 130. The CBSD 5 has a wireless coverage area 132. The user equipment devices are typically end-point wireless devices such as for example smartphones, laptops, tablets, wireless sensors, wireless smart devices (appliances), computers, etc. which communicate using CBRS spectrum with the CBSDs of system 100 using CBRS spectrum allocated to the CBSD. The CBRS spectrum is managed by the SAS 122. In some embodiments, one or more of the user equipment devices are replaced with wireless devices such as Customer Premises Equipment (CPE) devices, other CBSDs or wireless gateways which include a wireless interface which emulates a user equipment device allowing the wireless device to communicate with and be provided wireless services from a CBSD (e.g., wireless device to device connections for CBSD to CBSD backhaul and/or other purposes). The CPE device for example being a stationary device located at a customer premises which communicates wirelessly with a CBSD using CBRS bandwidth while also providing services to user equipment devices located at the customer premises at which it is located, e.g., wired and/or wireless communications links (e.g., Wi-Fi services, CBRS service, hardwired connections). In the exemplary system 100, UE 1 134, UE 2 136 and UE 3 138 are wirelessly coupled and/or connected to CBSD 1 102; UE 4 140 and UE 5 142 are wirelessly coupled and/or connected to CBSD 2 104; UE 6 144 and UE 7 146 are wirelessly coupled and/or connected to CBSD 3 106; UE 8 148 is wirelessly coupled and/or connected to CBSD 4 108; UE 9 1 50, UE 10 152, . . . , UE X 154 are wirelessly coupled and/or connected to CBSD 5 110. The user equipment devices being provided wireless services by the CBSD to which they are coupled and/or connected using CBRS spectrum allocated to the CBSD by the SAS 122 which manages the use of CBRS spectrum. The user equipment devices (or CPE devices, gateways or other base stations which include user equipment device emulators) of system 100 have receiving and transmitting circuitry allowing each of these devices to wirelessly communicate using spectrum (e.g., CBRS spectrum such as PAL or GAA spectrum utilized by the wireless network operator). One or more of the user equipment devices may be, and in many embodiments are, mobile devices which receive wireless services from different CBSDs as the user equipment devices move between different coverage areas of the different CBSDs of system 100. While the system 100 only shows five CBSDs and a limited number of user equipment devices, this is only exemplary and for the sake of simplicity in explaining the invention. In actual implementations, the large numbers (e.g., thousands) of base stations including micro and/or macro base stations may be, and in some embodiments are implemented, with large numbers (e.g., thousands and/or hundreds of thousands) of user equipment devices being supported by the CBRS network.

The core network 112 is coupled and/or connected to the OSS/Domain Proxy 114 via communications link 170. In some embodiments, the SSAF entity 116 is part of or included in the OSS/Domain Proxy 114. While in some embodiments the OSS includes the Domain Proxy functionality, in some other embodiments, the Domain Proxy is implemented as a separate entity from the OSS. In some embodiments, the SSAF functionality may be included in either the OSS and/or the Domain Proxy if they are separate elements. Communications links 172, 176, . . . , 177 couple and/or connect the OSS/Domain Proxy 114 to the SAS service provider system 1 118, SAS service provider 2 120, . . . , SAS service provider system N 121 respectively. The communications link 174 couples and/or connects the OSS/Domain Proxy 114 to the SSAF entity 116. Communications link 184 couples and/or connects the SSAF entity 116 to the SAS provider system 1 118. Communications links 186, . . . , 187 couple and/or connect the SSAF entity 116 to the SAS provider system 2 120, . . . , SAS service provider system N. The communications link 188 couples and/or connects the SSAF entity 116 to the database 156. The communications link 180 couples and/or connects the SSAF entity 116 to the SAS 122. The communications links 178 couples and/or connects the SAS provider system 1 118 to the SAS 122. The communications links 182, . . . , 183 couples and/or connects the SAS service provider system 2 120, . . . , SAS service provider N to the SAS 122 respectively. Typically, the communications links 170, 172, 174, 176, 177, 178, 180, 182, 183, 184, 186, 187, and 188 are typically high speed wired, fiber and/or optical communications links but can also be wireless links.

In some embodiments, the CBRS wireless network is a 4G wireless network. In some of these embodiments, the CBSDs are implemented as eNodeBs. In some embodiments, the CBRS network is a 5G wireless network. The CBSDs in 5G wireless networks may be, and in some embodiments are, implemented as gNodeBs or eNodes as 5G wireless networks support both eNodeBs and gNodeBs.

Figure 2:
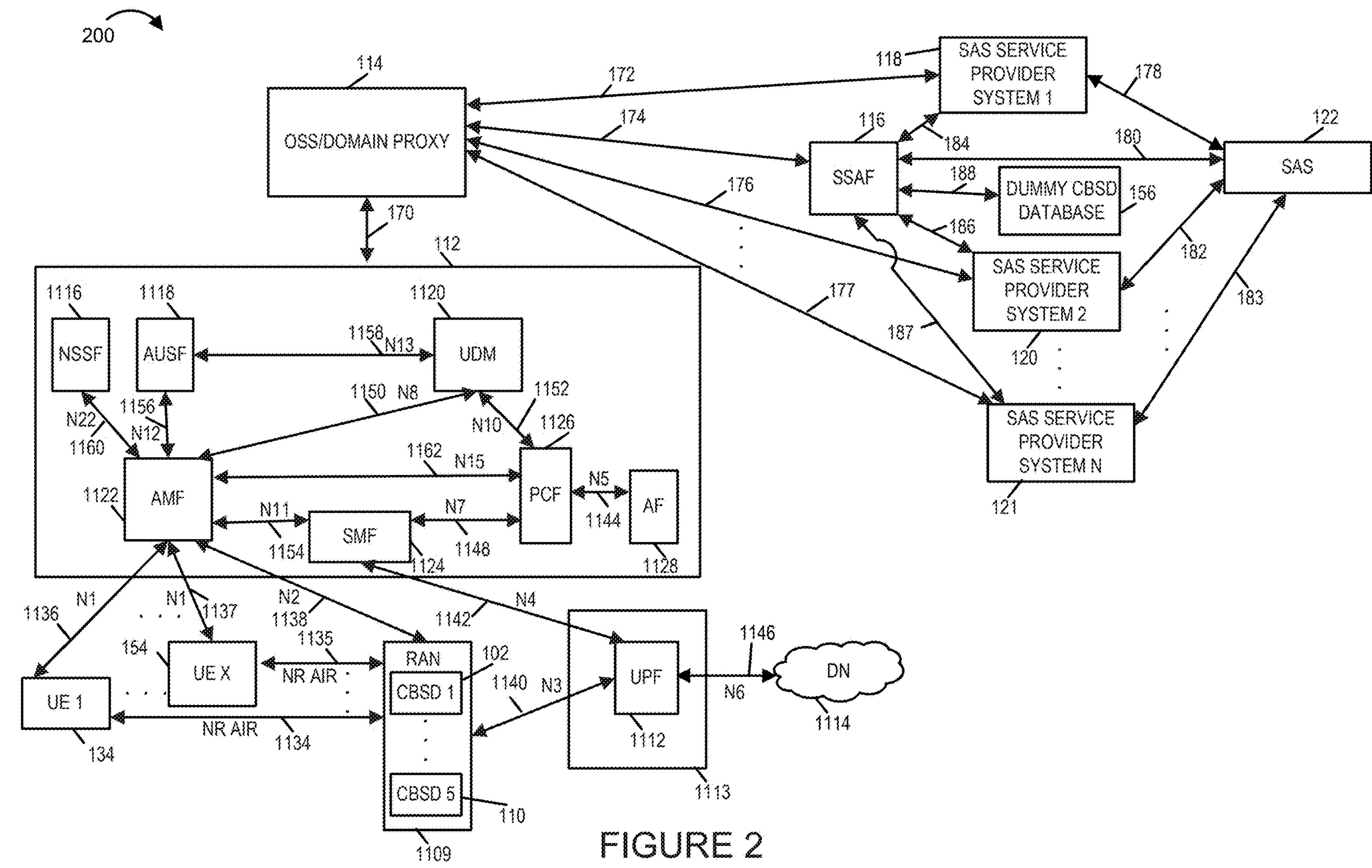
FIG. 2 illustrates another exemplary system in accordance with an embodiment of the present invention.

FIG. 2 illustrates an exemplary system 200 implemented using 5G wireless technology in accordance with an embodiment of the present invention. System 200 includes a wireless network (e.g., a 5G wireless network implemented as a CBRS wireless network operated by a wireless network operator (e.g., Charter Communications). The use of 5G technology in system 200 is merely exemplary and for the sake of clarity in explaining the invention. It should be understood that the invention is not limited to 5G technology but may be, and in some embodiments is, implemented using other wireless technologies, e.g., 4G, LTE, etc.

In some embodiments, the wireless network of system 200 is the wireless network of system 100 with additional details provided with respect to the functions/elements of the system and in particular the core network 112. Elements or steps with the same reference numbers used in different figures are the same or similar and those elements or steps will not be described in detail again. System 200 includes a wireless network, an OSS/Domain Proxy 114, a System Access System Switch and Availability Function (SSAF) entity 116, a plurality of SAS service provider systems (a first SAS service provider system 1118, a second SAS service provider system 2 120, . . . , a Nth SAS service provider system N 121, wherein N is an integer greater than 2), a SAS 122, and a database 156 used for storing information on dummy or fictious base stations (e.g., CBSDs). In some embodiments, the OSS/Domain Proxy 114, SSAF entity 116 and/or database 156 are part of the wireless network of system 200.

The communications links 170, 172, 174, 176, 177, 178, 180, 182, 183, 184, 186, 187, and 188 are typically high speed wired, optical or fiber optic communications links. While physical communications links are shown in system 200 in some embodiments, the communications links are logic communications links which represent connections and/or interfaces.

The Spectrum Access System 122 is responsible for managing the allocation of CBRS spectrum (PAL and GAA spectrum) in the CBRS network of system 200. The SAS 122 may be, and in most embodiments is an FCC system, e.g., a cloud based SAS system.

The SAS service provider systems of system 100 act as an intermediary between the SAS 122 and the OSS/Domain Proxy 114 and/or CBSDs which request services from the SAS 122.

The wireless network of system 200 includes Radio Access Network (RAN) 1109 including a plurality of base stations (CBSD 1 102, . . . , CBSD 5 110), a User Plane Function (UPF) 1112, a plurality of user equipment devices, and a core network 112 including Network Slice Selection Function (NSSF) 1116, an Authentication Server Function (AUSF) 1118, a Unified Data Management Function (UDM) 1120, an Access and Mobility Management Function (AMF) 1122, a Session Management Function (SMF) 1124, a Policy Control Function (PCF) 1126, and an Application Function (AF) 1128. The wireless network includes a core network 112 which includes a user plane 1113 which includes the UPF 1112 component and a control plane 1106 which includes the NSSF 1116, AUSF 1118, the UDM 1120, the AMF 1122, the SMF 1124, the PCF 1126, and AF 1128 components. In some embodiments, the core network 112 also includes the Spectrum Access System Switch and Availability Function (SSAF) 116 node, entity or device.

The user plane function (UPF) component 1112 of the wireless network is coupled to a Data Network (DN) 1114, e.g., the Internet. The base stations (e.g., CBSD 1 102, . . . , CBSD 5 110) of the Radio Access Network 1109 may be, and in some embodiments are, gNodeBs implemented as CBRS CBSD base stations.

As previously mentioned, the wireless network of system 200 includes user equipment devices (UE 1 134, . . . , UE X 154) (e.g., mobile devices) which can connect to the RAN 1109.

In some embodiments, one or more of the OSS/Domain Proxy 114, SSAF 116, data base system 156 are functions, nodes or devices which are implemented in a cloud. In some embodiments, the SSAF 116 is implemented as a function or service in a cloud. In some embodiments, the OSS and Domain Proxy are separate elements. In some such embodiments, the OSS can interact directly with SAS service provider requesting services on behalf of the CBSDs in the system 100. In some embodiments, messages are communicated from the CBSDs of the system 100 to the SAS service providers via a Domain Proxy which is a separate element from the OSS.

The RAN 1109 operates using spectrum managed by the SAS 122 (e.g., CBRS spectrum). In some embodiments, RAN 1109 is a CBRS radio access network (e.g., Charter Communications CBRS network). The resources, e.g., spectrum, utilized by the base stations, e.g., CBSDs of the wireless network, are controlled by Spectrum Access System 122. The SAS 122 allocating CBRS spectrum channels to the CBSDs in responses to requests from the OSS/Domain Proxy 114 via one or more of the SAS service provider system 1 118, SAS service provider system 2 120, . . . , SAS service provider system N 121. The SAS 122 as explained in further detail below also registers and allocates CBRS spectrum channels to dummy or fictious CBSDs in response to requests from the SSAF entity 116 (e.g., requests from the SSAF entity 116 via a SAS service provider system or from the SSAF entity 116 via the OSS/Domain Proxy 114 and a SAS service provider system) for test purposes.

The user equipment devices UE 1 134, . . . , UE X 154 may be, and in some embodiments are, 5G wireless devices such as for example 5G smartphones. It will be understood that the various functions of the system may be implemented in a variety of ways as components, servers, devices, nodes, entities, etc. The components of the system 200 are coupled and/or connected via communications links using various interfaces as shown in FIG. 2 including New Radio Air Interface 1134, . . . , New Radio Air Interface 1135, N1 interface 1136, N1 interface 1137, N3 interface 1140, N4 interface 1142, N5 interface 1144, N7 interface 1148, N8 interface 1150, N10 interface 1152, N11 interface 1154, N12 interface 1156, N13 1158, N22 interface 1160, N15 interface 1162, so that they can exchange information, data, and messages. UE 1 134, . . . , UE X 154 utilize New Radio (NR) air interfaces 1134, . . . , 1135 to communicate with the base stations of the first Radio Access Network 1109. UE 1 134, . . . , UE X 154 utilize the N1 interfaces 1136, . . . , 1137 to communicate with the AMF 1122. While only a few user equipment devices are illustrated as being connected to the base stations of the first Radio Access Network 1109 in practice a large plurality (e.g., thousands) of user equipment devices (e.g., mobile devices) may be, and in some embodiments are, connected to first RAN 1109. The UPF 1112 utilizes the N6 1146 interface to communicate with the Data Network 1114.

The registration parameters for a dummy CBSD (e.g., a fictious non-existent CBSD) will be discussed in the context of a small cell indoor dummy CBSD since the transmission power will be lower than outside CBSDs. This will minimize the impact on any spectrum interference determinations made by the SAS 122 with respect to the dummy CBSD spectrum usage. However, it should be understood that in some embodiments, the registration parameters for one or more of the dummy CBSDs can be for outside CBSDs or a combination of indoor and outdoor CBSDs. A Registration Request message object may, and in some embodiments does, include the following information and/or parameters: userid, fccid, callSign, cbsdSerialNumber, cbsdCategory, airinterface, measCapability, groupingParam, eirCapability, horizontalAccuracy, verticalAccuracy, latitude, longitude, height, heightType, indoorDeployment, antennaAzimuth, antennaDowntilt, antennaGain, antennaBeamwidth, antennaModel, vendor, cbsdModel, softwareVersion, hardwareVersion, firmwareVersion.

The following parameters are mandatory for CBSD registration with an SAS: userid, fccid, cbsdSerialNumber, cbsdCategory, airinterface, measCapability, latitude, longitude, height, heightType, indoorDeployment, antennaAzimuth, antennaDowntilt, antennaGain, antennaBeamwidth and therefore will be provided to the SAS 2105 when registering a dummy CBSD.

The parameters: userid, fccid, callSign, cbsdSerialNumber, cbsdCategory, airinterface, measCapability, and groupingParam are sent to the SAS 122 via an SAS service provider system (e.g., SAS service provider system 1 118) by the OSS/Domain Proxy 114 as part of a dummy CBSD registration request which originates with SSAF 116. In some embodiments, the SSAF 116 will register the dummy CBSD directly with the SAS service provider system (e.g., SAS service provider system 1 118 by sending a message directly to the SAS service provider system 1 118 thereby bypassing the OSS/Domain Proxy 114. Information for dummy CBSDs such as registration parameters are generated by the SSAF 116 and stored in the Dummy CBSD database 156. Other information such as registration Identifiers, spectrum allocations, timing information for heartbeat responses, timing information for re-authorization requests, and state information for each dummy CBSD is also stored in the dummy CBSD database 156. In some embodiments, the dummy CBSD fccid, cbsdSerialNumber, and/or other identifiers (e.g., manufacturer identifiers) required for registration will be identifiers of actual products which have been certified and/or registered with the FCC but which are not currently in service. By doing this, the dummy CBSD will have identifiers (e.g., fccid) which can be authenticated by the SAS during the dummy CBSD registration process.

The parameters cbsdSerialNumber, eirCapability, horizontalAccuracy, verticalAccuracy, latitude, longitude, height, heightType, indoorDeployment, antennaAzimuth, antennaDowntilt, antennaGain, antennaBeamwidth, antennaModel are signed off and submitted to the SAS 122 via an SAS service provider system (e.g., SAS service provider system 1 118) using the CPI tool included in the OSS/Domain Proxy 114. This information is originated at SSAF 116 and sent to the OSS/Domain Proxy 114 for submission to the SAS 122 via an SAS service provider system. The latitude, longitude, height, and antennaAzimuth parameters will vary by site. The remainder of these parameters in various embodiments will remain the same for each small cell type and will be auto populated for each dummy CBSD.

The parameters: vendor, cbsdModel, softwareVersion, hardwareVersion, firmwareVersion are optional and may be left blank in the Registration Request message object. Optionally, these parameters can be supplied from the SSAF 116 to the SAS 122 via the CPI tool included in the OSS/Domain Proxy 114, e.g., as part of a predefined template for each small cell type (e.g., dummy CBSD). The information being provided to the SAS 122 from the OSS/Domain Proxy 114 via an SAS service provider system (e.g., SAS service provider system 1 118).

In some embodiments, when the SSAF 116 is performing tests to determine whether the OSS/Domain Proxy 114 has the correct address for an SAS service provider system, the SSAF 116 generates and sends registration request messages for dummy CBSD(s) directly to the SAS service provider system bypassing the OSS/Domain Proxy 114. If the SSAF 116 is able to register a dummy CBSD and communicate with the SAS service provider system while the OSS/Domain Proxy 114 is not able to communicate with the SAS service provider system, the SSAF 116 determines that problems with SAS services being provided by the SAS service provider system are the result of an OSS/Domain Proxy problem (e.g., incorrect address information for the SAS service provider system) and not a problem with the SAS service provider system.

The communications links and interfaces shown in FIG. 2 are exemplary and the functions/components of the system 200 may be, and in some embodiments are, coupled and/or connected using a different configuration and/or interfaces.

In some embodiments, one or more of the functions and/or devices of the wireless network are implemented on one or more compute nodes in a cloud. For example, in some embodiments, the SSAF 116, OSS/Domain Proxy 114, and elements of the core network are implemented on a separate compute node in a cloud.

The communications system of FIGS. 1 and 2 illustrate an exemplary architecture of an embodiment of the invention. As previously discussed, CBRS systems utilize shared spectrum which requires every single CBSD to be connected and registered to the Spectrum Access System (e.g., 122). The SAS service is offered by third parties which are typically different entities than the CBRS network operator. The third parties include Google, Sony, Federated Wireless, etc. and are certified by the FCC. Due to the service model used by these third parties, these SAS service providers may have different level of availability, e.g., 99% or more etc. However, this SAS service availability is not always available from a given SAS service provider's system and an SAS service provider system's infrastructure outage can result in the CBRS operator's network outage as well. This SAS service provider system outage, e.g., a SAS service provider system's service going out will affect the operation of the CBRS wireless network operator relying on the SAS service provider system for SAS services will be negatively impacted. For example, when CBSD SAS heartbeat request messages fail the CBSD must stop transmitting using spectrum granted to the CBSD by the SAS. This can result in the entire CBRS network ceasing to be able to operate and provide wireless services to its customers.

An important element of the exemplary systems 100 and 200 is the SAS switch and availability function entity (SSAF) 116 which operates to ensure that in the event of a primary SAS service provider system (e.g., SAS service provider system 1) which is providing SAS services to the CBSDs of the CBRS wireless network experiences problems such as for example an outage, one or more backup SAS service provider systems (e.g., SAS service provider 2, . . . , SAS service provider N) is utilized until the primary SAS service provider system SAS services have been restored. In many embodiments, this will provide a redundancy only in the event there is an outage at the primary SAS service provider with respect to it providing one or more SAS services, providing a backup SAS service only when needed. An agreement between the CBRS operator and the backup SAS service providers having been entered into in which subscription charges for SAS services are on a usage basis. Thus, resulting in a savings in comparison with a full subscription for SAS services from the backup SAS service provider system. The SSAF entity has some built in features and/or components to determine if a given SAS service provider is up and running and it is also capable of performing a switch over in the case of a failure being detected. While it is typically a stand alone entity, in some embodiments, the SSAF entity is a function which is part of or incorporated in the OSS and/or domain proxy of the wireless communications system.

The SSAF entity includes functionality which can determine problems with a SAS service provider system including: (i) determining if the SAS service provider system has issues and/or problems accepting new sites (e.g., registering new CBSDs or base stations), (ii) determining if the SAS service provider system is completely down (i.e., no SAS services are being provided), (iii) determining if the SAS Service provider system is partially down (i.e., one or more SAS services are down while other SAS services are still up), and (iv) determining whether a specific service is out (e.g., whether a SAS registration service, a SAS spectrum inquiry service, a SAS spectrum grant service, a SAS heartbeat request service, a SAS spectrum usage authorization service, and/or a SAS spectrum relinquishment service is out and/or experiencing problems such as intermittent service). The SSAF entity includes some built in test services, test features and/or test functionality to determine what is wrong and/or issues and/or problems an SAS service provider system is experiencing, e.g., what SAS services the SAS service provider is not able to perform as expected or in accordance with its service agreement.

To determine which SAS service or SAS services of an SAS service provider system are out, not functioning properly, or experiencing issues, the SSAF entity implements a set of SAS service tests by emulating and/or simulating one or more CBSDs requesting SAS services from the SAS service provider system. The emulated and/or simulated CBSDs are dummy CBSDs which are either fictious non-existent CBSD(s) and/or actual CBSD(s) which are not in service. The SSAF entity implements a dummy CBSD by simulating and/or emulating a CBSD implementing and transitioning between the CBSD states of state diagram 300 illustrated in FIG. 3. The SSAF exchanges messages with the SAS service provider system as if it were the dummy CBSD which the SAS service provider system responds to as an actual CBSD. By utilizing the CBSD state diagram which includes a CBSD state for each of the SAS services and following the sequence of operations/messages and CBSD state transitions (including SAS service requests and responses exchanged with the SAS service provider system), the SSAF entity is able to determine which specific SAS service(s) (e.g., SAS registration service, SAS spectrum inquiry service, SAS spectrum grant service, SAS heartbeat service, SAS spectrum usage authorization service, and SAS spectrum relinquishment service) are out or experiencing issues/problems.

For example, with respect to the system 100, the SSAF 116 registers or attempts to register one or more dummy CBSDs with SAS 122 using the SAS registration services of the SAS service provider service provider system 1 118 by sending SAS registration requests to the SAS service provider system 1 118. If the SSAF 116 is successfully in registering the one or more dummy CBSDs, then for each dummy CBSD successfully registered it can follow the transitions of the CBDS state diagram and the corresponding message flow to test the other SAS services of the SAS service provider system 1 118. The sequence of messages (e.g., SAS service requests) and the responses to those SAS service requests or the lack of responses is used by the SSAF 116 to determine which specific SAS services of the SAS service provider system 1 118 are out or experiencing problems.

If there are no services available, the SAS service provider system 1 118 is deemed out service and the SSAF 116 commences moving or migrating the CBSDs of the system 100 to one or more different backup SAS servicer provider systems (e.g., SAS service provider system 2 120, . . . , SAS service provider system N 121).

FIG. 3 illustrates an exemplary CBSD state diagram 300 used for testing the availability and/or operation of SAS services being offered by an SAS service provider system. The CBSD state diagram 300 shows the transition between the various CBSD states using arrows 306, 310, 318, 322, 330, 334, 340, 342, 348, 352, 360, 364, 370, and 374. The CBSD states in some embodiments are dummy CBSD test states when the CBSD is a dummy CBSD that an SSAF is emulating and/or simulating to test the SAS services of a SAS service provider system. In such cases, the SSAF performs the operations described as being performed by the CBSD by emulating and/or simulating CBSD operations for a dummy CBSD including sending requests to the SAS service provider system and receiving responses from the SAS service provider system. The SSAF using the responses received, the timing of the received responses, and the failure to receive response to determine the status of the SAS servicer provider system's SAS services (e.g., operational and/or performance status of the SAS services of the SAS servicer provider system such as for example no problem with a SAS service operation or performance, problems and/or issues with a SAS service operation and/or performance (e.g., service not working, slow response, or service partially or intermittently functioning, and/or severity of problem and/or issue based on test results).

The CBSD state diagram includes a CBSD registration state 302, a CBSD spectrum inquiry state 314, a CBSD grant state 326, a CBSD heartbeat state 344, a CBSD authorization state 356, and a CBSD relinquishment state 366.

The CBSD states and state transitions of CBSD state diagram 300 will now be discussed in detail. The initial CBSD state is the CBSD registration state 302. In the CBSD registration state 302, a CBSD performs a registration request operation 304. In some embodiments, the CBSD registration request operation 304 is to send a registration request either directly or via an OSS/Domain Proxy (e.g., OSS/Domain Proxy 114 of system 100) to a SAS servicer provider system (e.g., SAS service provider system 1 118 of system 100). In response to receiving at the CBSD, a registration response 308 indicating the CBSD has been successful registered, the state of the CBSD transitions as shown by state transition arrow 306 to CBSD spectrum inquiry state 314. In response to receiving at the CBSD, a registration response 312 indicating that the registration failed, the CBSD remains in the CBSD registration state 302 as shown by state transition arrow 310. While in the registration state 302 following a registration failure, the process may be repeated with the CBSD once again performing a registration operation 304 such as sending out another registration request to the SAS service provider system. This process may be repeated until a registration response indicating a successful registration of the CBSD with the SAS received by the CBSD.

In some embodiments, if the CBSD is already registered, the registration operation may be sending a de-registration request to an SAS servicer provider system to de-register the CBSD. If a de-registration response message indicating that the CBSD has de-registration has been successful, the CBSD remains in CBSD registration state but is unregistered or may transition to a separate de-registered state which is not shown. If the de-registration response message indicates a failure then the CBSD remains as registered and still in the registration state.

In the CBSD spectrum inquiry state 314, the CBSD performs a spectrum inquiry request operation 316. The CBSD spectrum inquiry request operation 316 may, and in some embodiments does, include generating and sending a spectrum inquiry request to an SAS service provider system (e.g., SAS service provider system 1 118 of system 100) either directly or via an OSS/Domain Proxy. In response to receiving at the CBSD, a spectrum inquiry response 320 indicating a success along with the requested spectrum information, the state of the CBSD transitions as shown by state transition arrow 318 to CBSD spectrum grant state also referred to as a CBSD grant state 326. In response to receiving at the CBSD, a spectrum inquiry response 324 indicating that the spectrum inquiry request failed, the CBSD remains in the CBSD spectrum inquiry state 314 as shown by state transition arrow 322. While in the spectrum inquiry state 314 following a spectrum inquiry failure, the process may be repeated with the CBSD once again performing a spectrum inquiry operation 316 such as sending out another spectrum inquiry request to the SAS service provider system. This process may be repeated until a spectrum inquiry success response 320 providing the requested spectrum information is received by the CBSD and the CBSD transitions to the CBSD grant state 326.

In the CBSD spectrum grant state 326, the CBSD performs a grant request operation 328. The CBSD grant request operation 328 may, and in some embodiments does, include generating and sending a spectrum grant request to an SAS service provider system (e.g., SAS service provider system 1 118 of system 100) either directly or via an OSS/Domain Proxy. In response to receiving at the CBSD, a spectrum grant response 322 indicating a success along with the spectrum grant information such as for example a spectrum grant identifier, the state of the CBSD transitions as shown by state transition arrow 330 to CBSD heartbeat state 344 or CBSD relinquishment state 366 as shown by transition arrow 340. The decision of whether to transition to the heartbeat state 344 or the spectrum relinquishment state 366 is made by the CBSD. For an actual CBSD, the CBSD typically transitions to the heartbeat state so that it can utilize the granted spectrum. However, if circumstances have changed at the CBSD and it no longer needs the granted spectrum it may transition immediately from the spectrum granted stated to spectrum relinquishment state. When the SSAF is emulating a dummy CBSD and SSAF is to test the spectrum relinquishment services of the SAS service provider system, the dummy CBSD may be directly transitioned to the spectrum relinquishment state 366 from the spectrum grant state 326 upon receipt of a spectrum grant response 332 which indicates success. Alternatively, when the SSAF is emulating a dummy CBSD and the SSAF is testing the SAS heartbeat services of the SAS service provider system then the dummy CBSD will transition to heartbeat state 344 from the spectrum grant state 326 upon receipt of a spectrum grant response 332 which indicates success. In response to receiving at the CBSD, a spectrum grant response 336 indicating that the spectrum grant request failed, the CBSD remains in the CBSD spectrum grant state 326 as shown by state transition arrow 334. While in the spectrum grant state 326 following a spectrum grant request failure, the process may be repeated with the CBSD once again performing a grant operation 328 such as sending out another spectrum grant request to the SAS service provider system. This process may be repeated until a spectrum grant success response 332 is received by the CBSD and the CBSD transitions to the CBSD heartbeat state 322 or the CBSD relinquishment state 366 as previously described.

In the CBSD heartbeat state 344, the CBSD performs a heartbeat request operation 346. The CBSD spectrum heartbeat request operation 344 may, and in some embodiments does, include generating and sending a heartbeat request to an SAS service provider system (e.g., SAS service provider system 1 118 of system 100) either directly or via an OSS/Domain Proxy. In response to receiving at the CBSD, a spectrum heartbeat success response 350 indicating a success, the state of the CBSD transitions as shown by state transition arrow 348 to CBSD authorization state 356. In response to receiving at the CBSD, a heartbeat response 354 indicating a failure, the CBSD remains in the CBSD heartbeat state 344 as shown by state transition arrow 352. While in the spectrum heartbeat state 344 following a spectrum heartbeat failure, the process may be repeated with the CBSD once again performing a spectrum heartbeat request operation 346 such as sending out another spectrum heartbeat request to the SAS service provider system. This process may be repeated until a spectrum heartbeat success response 350 providing is received by the CBSD and the CBSD transitions to the CBSD authorization state 356. In some embodiments, the CBSD may determine to transition as shown by transition arrow 342 to the CBSD relinquishment state 366 in response to receiving either a successful heartbeat response or a failure heartbeat response. This may be, and sometimes is done, when the CBSD determines to relinquish the granted spectrum for other CBSDs to utilize for example when it no longer needs to utilize the granted spectrum. In some embodiments, when the CBSD is a dummy CBSD, the SSAF may make the transition from the CBSD heartbeat state 344 to the CBSD relinquishment state 366 when the SSAF determines the SAS relinquishment service of the SAS service provider system is to be tested.

In the CBSD authorization state 356, the CBSD performs a CBSD authorization operation 358. The CBSD authorization operation 358 may, and in some embodiments does, include determining that the CBSD has been authorization to transmit using the granted spectrum in the heartbeat success response 350. The CBSD authorization operation may also include continuously determining when a heartbeat request to an SAS service provider system (e.g., SAS service provider system 1 118 of system 100) is needed to be sent before a transmit expire time and transitioning to the heartbeat state 344 to send the heartbeat request. Additionally, the CBSD authorization operation may further include determining when the spectrum grant authorization is set to expire and generating and sending by the CBSD a re-authorization request to the SAS service provider system to re-authorize the CBSD to utilize the granted spectrum for transmitting to and/or communicating with other devices (e.g., wireless devices such as user equipment devices or smartphone). In some embodiments, the CBSD may transition to the CBSD grant state 326 when a re-authorization is required and the re-authorization request is performed as a grant request operation. The CBSD may determine transition to the CBSD relinquishment state 366 as shown by transition arrow 364. This may occur for example, when the CBSD determines that it no longer needs to utilize the authorized spectrum and wishes to relinquish it. This may also occur when the CBSD is a dummy CBSD and testing of the SAS relinquishment service of the SAS service provider system is to performed by the SSAF.

In the CBSD relinquishment state 366 also referred to as CBSD spectrum relinquishment state 366, the CBSD performs a relinquishment request operation 368. The CBSD relinquishment request operation 368 may, and in some embodiments does, include generating and sending a spectrum relinquishment request to an SAS service provider system (e.g., SAS service provider system 1 118 of system 100) either directly or via an OSS/Domain Proxy. In response to receiving at the CBSD, a spectrum relinquishment success response 372 indicating a success, the state of the CBSD transitions as shown by state transition arrow 370 to CBSD spectrum inquiry state 314. In response to receiving at the CBSD, a spectrum relinquishment response 376 indicating a failure, the CBSD remains in the CBSD relinquishment state 366 as shown by state transition arrow 374. While in the CBSD relinquishment state 366 following a spectrum relinquishment failure, the process may be repeated with the CBSD once again performing a relinquishment request operation 368 such as sending out another spectrum relinquishment request to the SAS service provider system. This process may be repeated until a spectrum relinquishment success response 372 is received by the CBSD and the CBSD transitions to the CBSD spectrum inquiry state 314. Upon transitioning to the CBSD spectrum inquiry state, the process continues as previously described.

When the state diagram 300 is used for testing, the SSAF (e.g., SSAF 116) emulates and/or simulates a dummy CBSD by performing the operations described in connection with each of the CBSD states described above (registration state 302, spectrum inquiry state 314, spectrum grant state 326, heartbeat state 344, authorization state 356, and relinquishment state 366). These states then become dummy CBSD test states which test the SAS services of a SAS servicer provider system by the SSAF sending requests to the SAS servicer provider system either directly or via an OSS/Domain Proxy and monitoring the responses to determine which SAS services offered by the SAS servicer provider system are experiencing problems and/or issues.

For example, the SAS registration service of a SAS service provider system is tested by the SSAF generating a CBSD registration request message for a dummy CBSD and sending the registration request message to the SAS service provider system either directly or via an OSS/Domain Proxy. When the SSAF is unable to register the dummy SSAF either by failing to receive a timely successful response or by continually receiving a registration response which indicates a failure to register the dummy CBSD, the SSAF is able to collect test data and/or metrics on the registration failure(s) and/or success(es) and use the collected test data and/or metrics to make a determination on the status (operational and/or performance) of the CBSD SAS registration service of the SAS servicer provider system. Similarly, the SSAF generates spectrum inquiry requests, spectrum grant requests, heartbeat requests, heartbeat requests with requests for authorization to transmit, and spectrum grant relinquishment requests for one or more dummy CBSDs and send the requests to the SAS service provider system either directly or via an OSS/Domain Proxy. The SSAF collects test data and/or metrics on the service failure(s) and/or success(es) resulting from the service requests and uses it to make a determination on the status (operation and/or performance) of the spectrum inquiry services, spectrum grant services, heartbeat services, authorization services, and spectrum grant relinquishment services of the SAS service provider system as well as the overall status (e.g., not operational, partially operational, fully operational) of the SAS service provider system.

An exemplary method of implementing the invention using the SSAF entity will now be described. The exemplary method may be, and in some embodiments is, implemented using the exemplary system 100 or 200 illustrated in FIGS. 1 and 2 respectively.

When a domain proxy, e.g., OSS/Domain Proxy 114 of system 100) is unable to communicate with or hear from SAS 122 as usual (e.g., within bounds of normal operation) but instead experience abnormal or unusual behavior when communicating with the SAS 122 (e.g., not receiving responses to requests from the domain proxy or constantly receiving service request failure responses), the domain proxy makes a determination that there is a potential problem with the SAS service provider system. Examples of abnormal or unusual behavior indicating a potential problem with an SAS servicer provider system include: (i) no response or repeated failure responses to spectrum inquiry requests, (ii) no responses to registration requests for multiple CBSDs or nodes and/or registration failures for multiple CBSDs or nodes, (iii) no response or repeated failures to spectrum grant requests, (iv) no response to heartbeat requests, (v) no response or multiple failures to spectrum relinquishment requests, and (vi) CBSD going from authorized state (e.g., authorized to transmit on granted spectrum) to another state. The Domain Proxy upon determining that there is a potential problem with the SAS service provider system (e.g., SAS service provider system 1 118), notifies the SSAF 116. The Domain Proxy communicates Key Performance Indicator (KPI) SAS service performance metrics to the SSAF 116 including the number and type of SAS service provider system 1 failures, problems and/or issues being experienced within certain time periods (e.g., 15 minutes, 1 hour, 4 hours, 1 day, 1 week, 1 month, etc.). The SSAF 116 will analyze the KPI SAS service performance metrics to determine what test or set of tests to perform on the SAS service provider system.

In the event, the SSAF 116 determines that multiple cells or CBSDs have not been able to be registered (i.e., that there appears to be an SAS registration service problem with the SAS servicer provider system), the SSAF 116 will perform one or more SAS CBSD registration service tests. In the SSAF 116 SAS CBSD registration service test, the SSAF 116 attempt to register a dummy CBSD with the correct credentials (e.g., dummy CBSD registration object will have known good registration information) to determine that the prior CBSD registration failures are not due to incorrect credentials (e.g., incorrect registration information). If the dummy CBSD registration is successful it indicates that the CBSD credentials (e.g., CBSD registration information) which resulted in the prior failures may be incorrect and that the SAS registration service of the SAS service provider system is not offline. The SSAF 116 SAS CBSD registration service test can include first sending the dummy CBSD registration request to the SAS service provider system via the OSS/Domain Proxy (e.g., OSS/Domain Proxy 114). If the dummy CBSD registration fails, SSAF 116 SAS CBSD registration service next sends the dummy CBSD registration request to the SAS service provider system directly so as to bypass the OSS/Domain Proxy. If the dummy CBSD is able to be successfully registered directly but not through the OSS/Domain Proxy, the SSAF 116 determines that there the SAS service provider system is not experiencing an SAS CBSD registration problem but that there is an issue or problem with the OSS/Domain Proxy operation and/or connection to the SAS servicer provider system (e.g., unacceptable delay of the link between the SAS servicer provider system and the OSS/Domain Proxy, incorrect addressing being used by the OSS/Domain Proxy for the SAS service provider system with respect to SAS CBSD registration services, and/or incorrect credentials or registration information being used by the OSS/Domain Proxy for CBSDs attempting to be registered by the OSS/Domain Proxy. If the SSAF 116, is unable to successfully register the dummy CBSD either directly or via the OSS/Domain Proxy, the SSAF 116 will determine that there is a SAS CBSD registration problem. Following the determination that there is a CBSD registration problem, the SSAF 116 next step is to send a ping message to the SAS 122 to formally make sure that the SAS 122 is online. A ping response from the SAS 122 to the ping message indicates that the SAS 122 is online and indicates that the SAS service provider system SAS CBSD registration service could be offline or experiencing problems. If there is no ping response from the SAS 122, the SSAF 116 determines that the SAS 122 is offline and that the CBSD registration problem is with the SAS 122 and not the SAS servicer provider system.

In some embodiments, the SSAF 116 will register multiple dummy CBSDs so as to determine whether the CBSD registration problem being experienced is an intermittent problem (e.g., with the SAS service provider system when it experiencing high load or has a partial system failure such as a number of SAS service node or container failures).

When the SSAF 116 determines that the SAS service provider system SAS registration service is done or having problems, it will notify the OSS/Domain Proxy to commence using a backup SAS service provider system (e.g., SAS service provider system 2 120) to register new CBSDs. The SSAF 116 will continue to try to register dummy CBSDs via the SAS service provider system experiencing problems and when the SSAF 116 determines that the SAS registration problem has been fixed, the SSAF 116 will notify the OSS/Domain Proxy to switch back to using the original SAS service provider system which previously was experiencing problems with respect to registering new CBSDs with the SAS.

If the SSAF 116 determines based on the KPI metrics and/or information it received from the OSS/Domain Proxy that there is a problem with the SAS spectrum inquiry request (e.g., the spectrum inquiry messages are not being responded to for multiple CBSDs within a specific time period), the SSAF 116 will perform one or more SAS spectrum inquiry service tests on the SAS service provider system. The SSAF 116 will attempt to get spectrum reassigned for multiple dummy CBSDs it has previously registered as part of the test by sending spectrum inquiry requests to the SAS service provider system using the dummy CBSD IDs of the previously registered dummy CBSDs. If the spectrum inquiry requests from the dummy CBSDs are successful, the SSAF 116 will determine that there is not a problem with the SAS spectrum inquiry service of the SAS servicer provider system while the spectrum inquiry requests from the dummy CBSDs do fail, the SSAF 116 will determine that the SAS spectrum inquiry service of the SAS service provider system is having problems or issues or is out of service based on the number of attempts made and the number of failures experienced. In some embodiments, the SSAF 116 will also register a new dummy CBSD and then send a spectrum inquiry request for the newly registered dummy CBSD to determine if the SAS service provider system is experiencing problems only with newly registered CBSDs as opposed to those previously registered.

If the SSAF 116 determines based on the KPI metrics and/or information it received from the OSS/Domain Proxy that there is a problem with the SAS spectrum grant service such as for example multiple CBSDs within a specific time period have not had spectrum granted to them in response to spectrum grant requests, the SSAF 116 will perform one or more SAS spectrum grant service tests on the SAS service provider system. The SSAF 116 SAS spectrum grant service test includes generating and sending one or more spectrum grant requests for one or more registered dummy CBSD to the SAS service provider system. Based on the responses or lack of response(s) from the SAS service provider system to the spectrum grant requests, the SSAF 116 will determine whether the SAS service provider system SAS spectrum grant service is experiencing problems. If the SSAF 116 is unable to successfully obtain a spectrum grant in response to the one or more spectrum grant requests for the one or more registered dummy CBSDs, the SSAF 116 will determine that there is a problem with the SAS service provider system SAS grant service (e.g., it is out of service). If the SSAF 116 does receive responses to the spectrum grant requests which are successful (i.e., the dummy CBSDs are granted the requested spectrum), the SSAF 116 will determine that the SAS service provider system SAS spectrum grant service is not offline but is operational. In some embodiments, the SSAF 116 may first register a dummy CBSD via the SAS service provider system, second perform a spectrum inquiry of the SAS service provider system and third send the spectrum grant request based on the SAS service provider system response to the spectrum inquiry request when testing the spectrum grant service of the SAS service provider system.

If the SSAF 116 determines based on the KPI metrics and/or information it received from the OSS/Domain Proxy that there is a problem with the SAS spectrum grant authorization service such as for example multiple CBSDs within a specific time period having received a spectrum grant but not being authorization to use the granted spectrum, the SSAF 116 will perform one or more SAS spectrum authorization service tests on the SAS service provider system. The SSAF 116 SAS spectrum authorization service test includes generating and sending for a dummy CBSD which has generated spectrum but is not authorized to use the granted spectrum one or more spectrum heartbeat request messages to the SAS service provider system requesting to use the spectrum granted to the dummy CBSD but not authorized for use. Based on the responses or lack of response(s) from the SAS service provider system to the spectrum heartbeat requests seeking authorization to use the spectrum granted to the to dummy CBSD, the SSAF 116 will determine whether the SAS service provider system SAS spectrum authorization and/or heartbeat service is experiencing problems. If the SSAF 116 is unable to successfully obtain authorization to use the spectrum granted to the dummy CBSD in response to the one or more spectrum authorization and/or heartbeat request seeking authorization, the SSAF 116 will determine that there is a problem with the SAS service provider system SAS spectrum authorization and/or heartbeat service (e.g., it is out of service). If the SSAF 116 does receive responses to the spectrum authorization requests or heartbeat requests seeking authorization to utilize granted spectrum which are successful (i.e., the dummy CBSD is authorized to use spectrum for which it has a spectrum grant), the SSAF 116 will determine that the SAS service provider system SAS spectrum authorization service and/or heartbeat service is not offline but is operational. In some embodiments, the SSAF 116 may first register a dummy CBSD via the SAS service provider system, second perform a spectrum inquiry of the SAS service provider system, third send a spectrum grant request based on the SAS service provider system response to the spectrum inquiry request and once being granted spectrum sending a spectrum heartbeat request seeking authorization to utilize the granted spectrum when testing the spectrum authorization and/or heartbeat service of the SAS service provider system.

If the SSAF 116 determines based on the KPI metrics and/or information it received from the OSS/Domain Proxy that there is a problem with the SAS spectrum heartbeat service such as for example multiple CBSDs within a specific time period having not receiving heartbeat responses to heartbeat requests, the SSAF 116 will perform one or more SAS heartbeat service tests on the SAS service provider system. The SSAF 116 will attempt to register one or more new dummy CBSDs via the SAS service provider system. If the registration fails it means there is a possible outage of the SAS service provider system or the SAS 122. Upon registering the dummy CBSDs, the SSAF 116 will send in spectrum inquiry request messages for the dummy CBSDs to the SAS service provider system and then spectrum grant requests to the SAS service provider system. The CBSD dummy spectrum grant requests will request the grant of spectrum identified as available in the response to the spectrum inquiry request for the particular dummy CBSD. Once the SSAF 116 receives the spectrum grants for the dummy CBSDs, the SSAF 116 will send dummy CBSD heartbeat requests to the SAS service providers system. If this is successful, then the SSAF 116 will send in dummy CBSD requests for authorization to utilize the granted spectrum (e.g., a dummy CBSD heartbeat request seeking authorization to use granted spectrum). For the above sequence, if no message (e.g., dummy CBSD registration response, spectrum inquiry response, spectrum grant response, spectrum heartbeat response) is returned on time, the SSAF 116 will directly ping the SAS 122 to ensure that it is online. If a ping response is received from the SAS 122, the SSAF 116 determines that the SAS 122 is online and that the SAS service provider system is down. If the SAS 122 does not respond to the ping message, the SSAF 116 determines that the SAS 122 is off line and that the problems are not being caused by the SAS service provider system (e.g., SAS service provider system is operation but is not responding because it is awaiting responses from the SAS which is offline).

If the SSAF 116 determines that the SAS service provider system is out of service or experiencing problems with providing critical services such as fore example heartbeart services, the SSAF 116 starts a process to move or migrate the CBSDs of wireless system 100 from the SAS service provider which is out of service or experiencing problems to a backup SAS service provider system. For example, if the SAS service provider system 118 is the primary SAS service provider system which is out of service or experiencing problems, the SSAF 116 starts the process of moving or migrating the CBSDs of the system 100 to the SAS service provider system 2 120. The CBSDs or the radios of the CBSDs are moved to the backup SAS service provider system for the duration of the outage (i.e., the CBSD are moved and/or migrated to receive SAS services from the SAS service provider system 2 120 during the outage of the SAS service provider system 1 118). This way the radios of the CBSDs of system 100 will remain in service and the CBRS wireless network operator is only charged by the backup SAS service provider system for the duration it uses the backup SAS service provider system. In the meantime, the SSAF 116 will continue to determine if the primary SAS service provider system 1 118 has come back on-line or fixes the problems it was having providing SAS services. This is done by the SSAF 116 continuing to use the dummy CBSDs after detecting an outage or problem at the primary SAS service provider system to continue to conduct SAS service tests on the primary SAS service provider system (e.g., new dummy CBSD registration service tests, dummy CBSD spectrum inquiry service tests, dummy CBSD spectrum grant service tests, dummy CBSD spectrum authorization and heartbeat request tests). Once the SSAF 116 determines that the primary SAS service provider system 1 118 is back on-line and/or fixed the problems and/or issues it was experiencing such that it now meets SAS service provider system reliability thresholds in providing SAS services established by the SSAF 116, the SSAF 116 will commence the process of moving or migrating the CBSDs or radios of the CBSDs of system 100 back to the primary SAS service provider system 1 118 from the backup SAS service provider system 2 120. The SAS service provider system reliability thresholds may be, and in some embodiments are, that the SAS service provider system is able to successfully respond to X percentage of SAS service requests (e.g., heartbeat service requests) within a given time period (e.g., 20 minutes), where X e is a positive number and X percentage is indicative of expected and/or contracted SAS service from the SAS service provider system (e.g., 99.5%).

The process of moving or migrating the CBSDs of the system 100 to the backup SAS service provider system includes the following steps. The SSAF 116 confirms that the backup SAS service provider system 2 120 has availability to provide SAS services for the CBSDs of the system 100. Upon confirming that the backup SAS service provider system 2 120 has availability, the SSAF 116 sends a dormancy message to the primary SAS service provider system 1 118 notifying the primary SAS service provider system 1 118 to place the identified CBSDs into a dormant state with respect to the primary SAS service provider system 1 118 performing SAS services for the identified CBSDs. The SSAF 116 then provides the backup SAS service provider system 2 120 with registration information (e.g., registration objects) for the CBSDs to be moved and/or migrated to the backup SAS service provider system 2 120. Upon confirmation from the backup SAS service provider system 2 120 that the backup SAS service provider system 2 120 has re-registered the identified CBSDs with SAS 122 as now being serviced by the backup SAS service provider system 2 120 as opposed to the primary SAS service provider system 1 118, the SSAF 116 notifies the OSS/Domain Proxy 114 to begin using the SAS service provider system 2 120 when requesting SAS services for the CBSDs of the system 100.

A similar procedure is followed to move the CBSDs of the system 100 back to the primary SAS service provider system 1 118 once, the SSAF 116 determines that the primary SAS service provider system 1 118 has resolved its problems and is operating reliably. In that case, the SSAF 116 sends the list of active registered CBSDs of system 100 and/or the registration information (e.g., CBSD registration objects) to the primary SAS service provider system 1 118 which in turn communicates with SAS 122 and re-registers the CBSDs as being handled or provided SAS services from the primary SAS service provider system 1 118 instead of the backup SAS service provider system 2 120 and takes over management of the SAS services for the CBSDs. Upon receipt of confirmation that the primary SAS service provider system 1 118 has re-registered the CBSDs as being handled by the primary SAS service provider system, the SSAF 116 notifies the OSS/Domain Proxy 114 to commence using the primary SAS service provider 1 118 for SAS services with respect to the list of identified active CBSDs and new CBSDs to be registered with the SAS 122. In some embodiments, the SSAF 116 will send a message to the backup SAS service provider 2 120 with the list of identified active CBSDs to be moved or migrated from the backup SAS service provider system 2 120 to the primary SAS service provider system 1 118 indicating that these CBSDs should be placed in a dormant state with respect to providing SAS services, prior to sending the list of active CBSDs and/or registration information of the list of active CBSDs of the system 100 to the primary SAS service provider system 1 118. This is done to avoid having two different SAS service provider systems attempting to send requests to the SAS 122 for the same CBSD which can result in problems such as the conflicts in the state of the CBSD (e.g., authorized or not authorized to transmit based on messages not being received by the SAS service provider system which is no longer handling the SAS services for the CBSD).

Figure 10A:
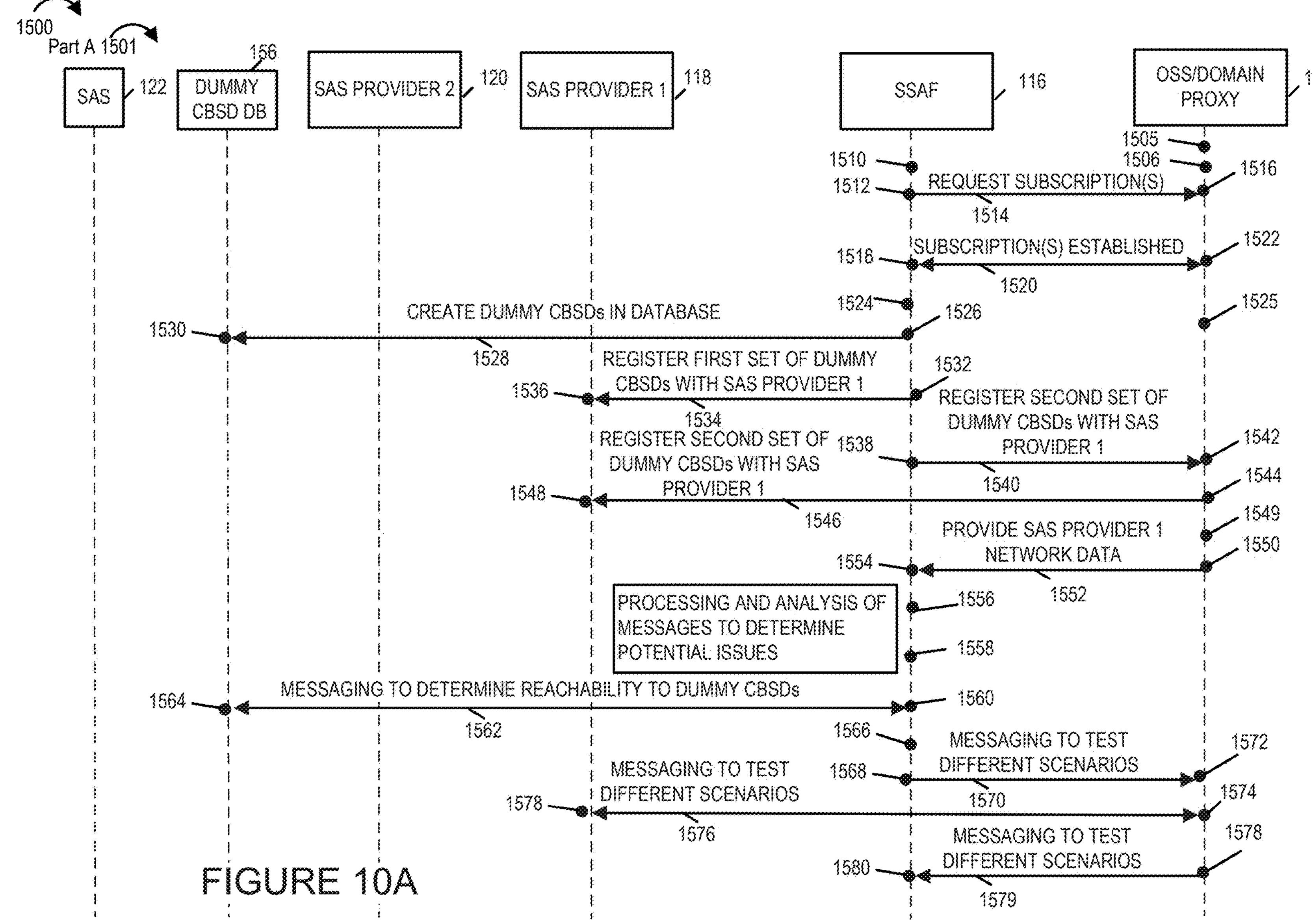
FIG. 10A is the first part of a signaling diagram which illustrates the steps and signaling of an exemplary method in accordance with an embodiment of the present invention.
Figure 10B:
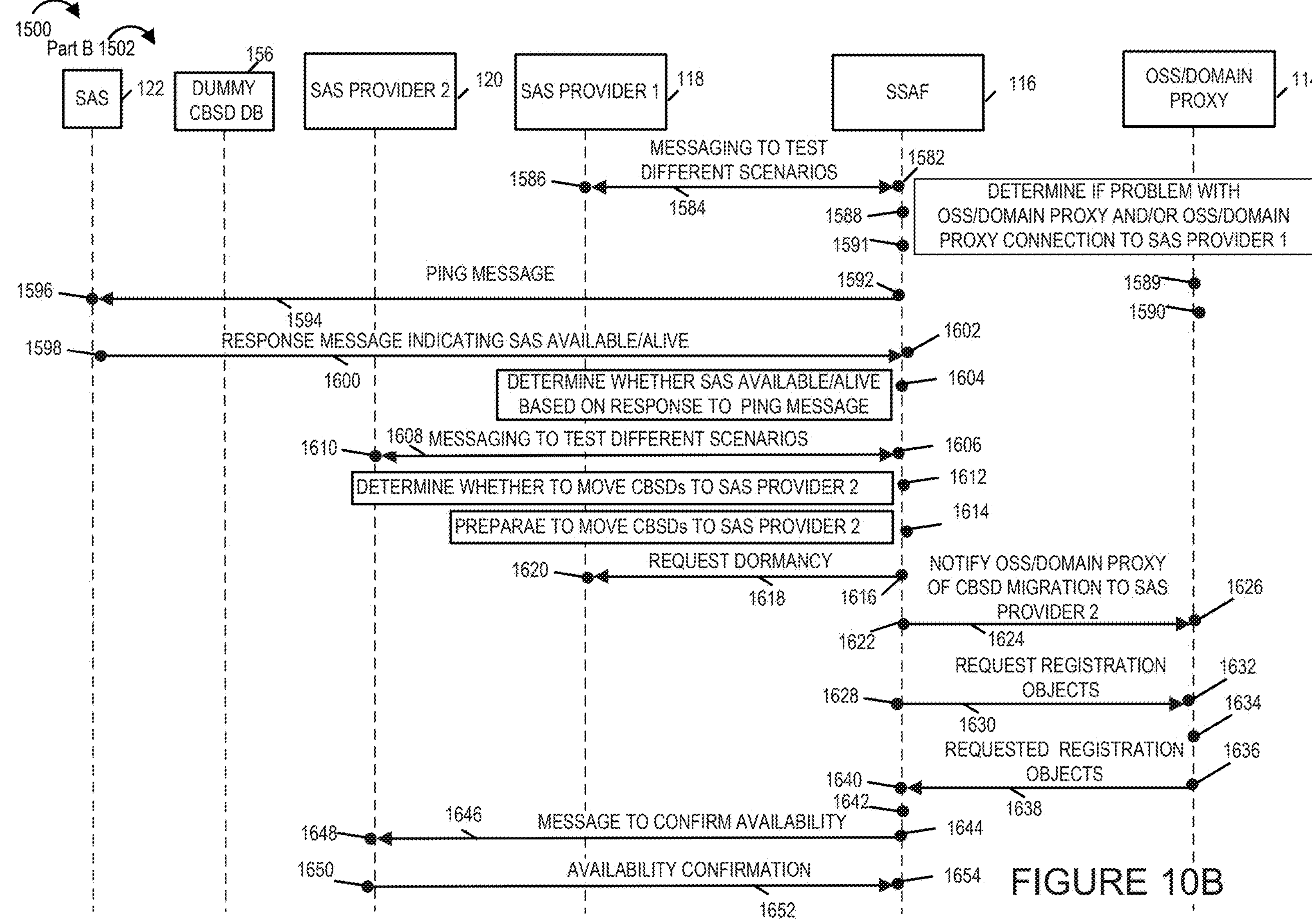
FIG. 10B is the second part of a signaling diagram which illustrates the steps and signaling of an exemplary method in accordance with an embodiment of the present invention.
Figure 10C:
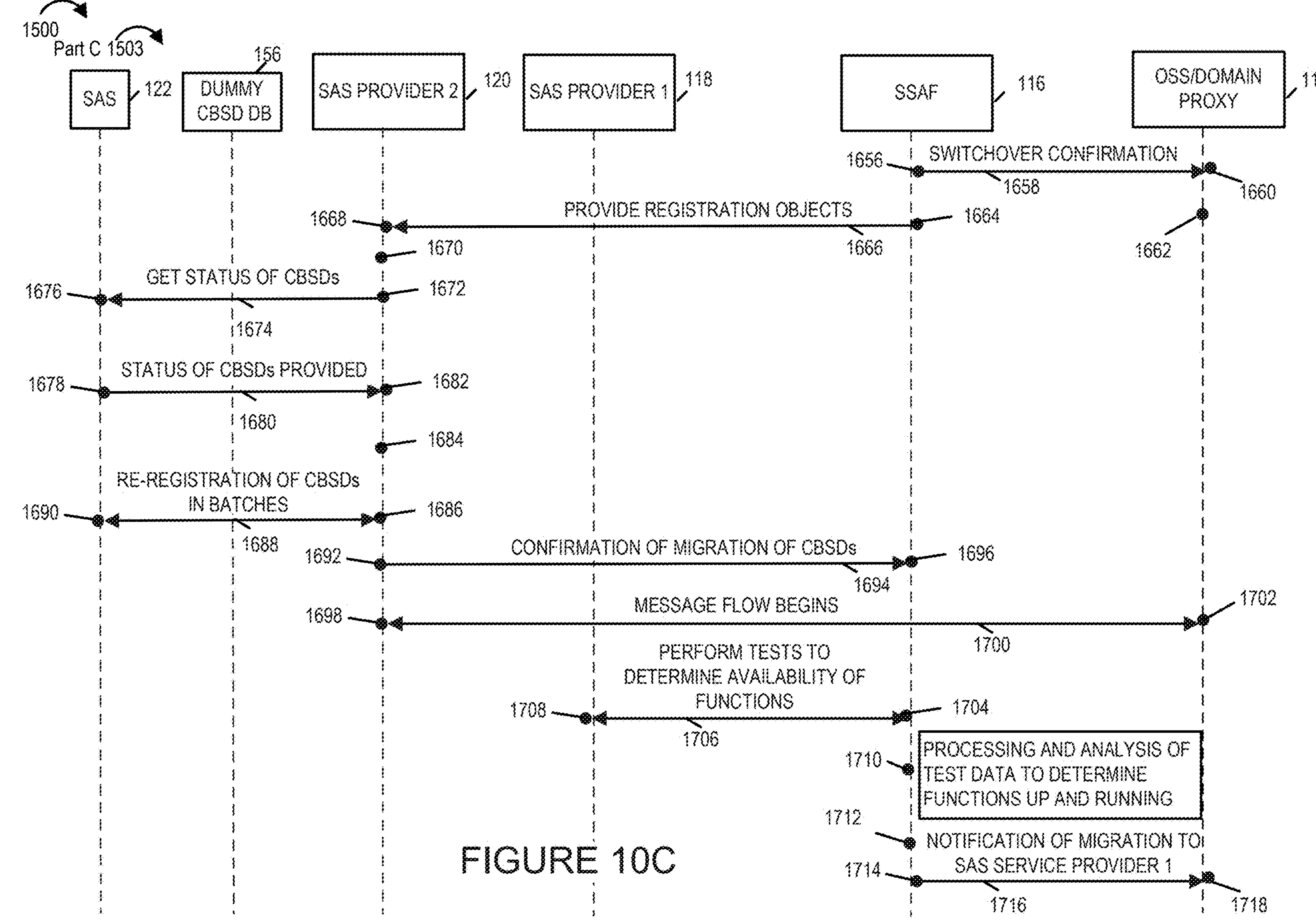
FIG. 10C is the third part of a signaling diagram which illustrates the steps and signaling of an exemplary method in accordance with an embodiment of the present invention.
Figure 10D:
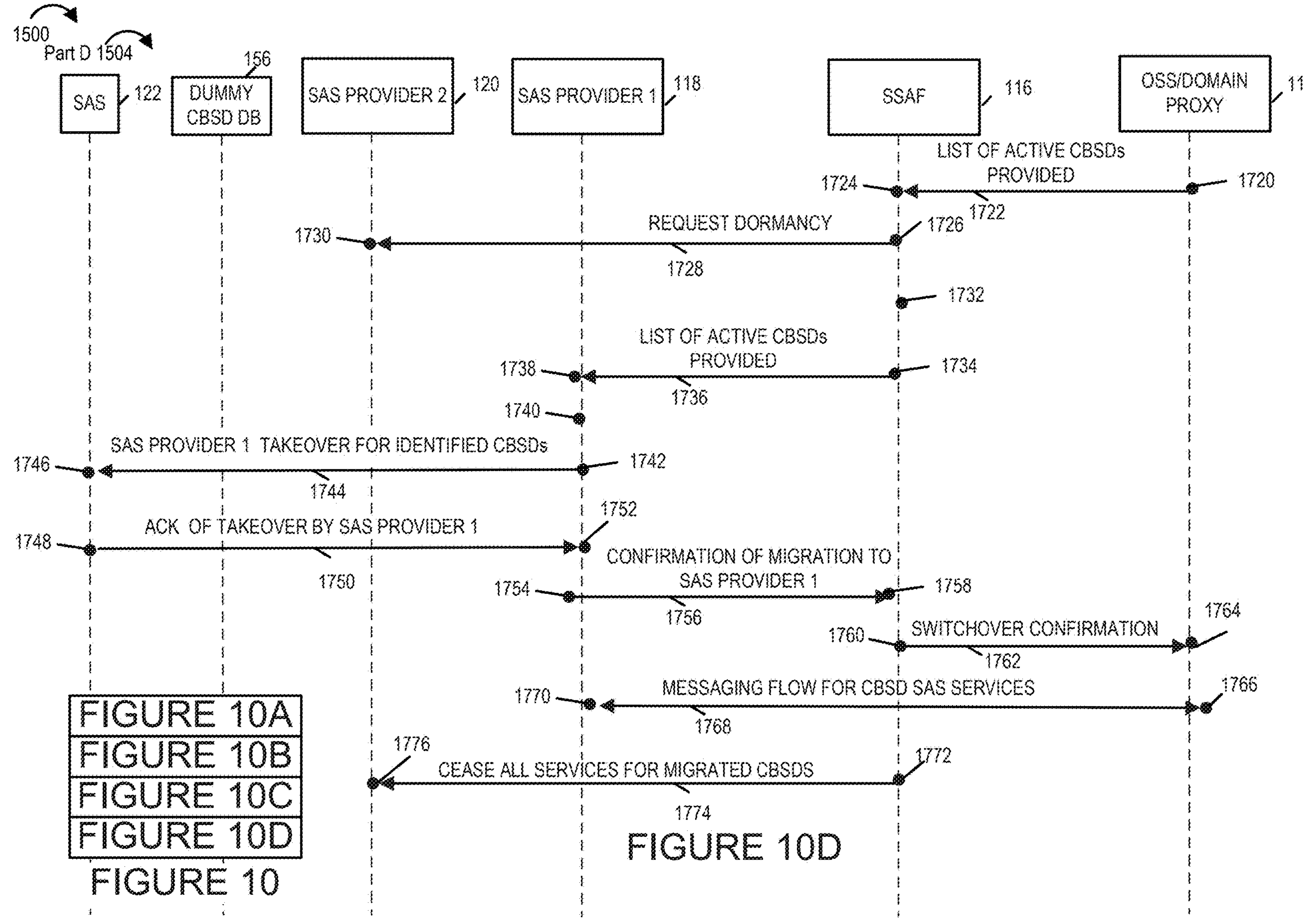
FIG. 10D is the fourth part of a signaling diagram which illustrates the steps and signaling of an exemplary method in accordance with an embodiment of the present invention.

FIG. 10 comprises FIG. 10A, FIG. 10B, FIG. 10C, and FIG. 10D. FIG. 10A is the first part (Part A 1501) of a signaling diagram which illustrates the steps and signaling of an exemplary method in accordance with an embodiment of the present invention. FIG. 10B is the second part (Part B 1502) of a signaling diagram which illustrates the steps and signaling of an exemplary method in accordance with an embodiment of the present invention. FIG. 10C is the third part (Part C 1503) of a signaling diagram which illustrates the steps and signaling of an exemplary method in accordance with an embodiment of the present invention. FIG. 10D is the fourth part (Part D 1504) of a signaling diagram which illustrates the steps and signaling of an exemplary method in accordance with an embodiment of the present invention.

While it will be readily understood that additional steps and signaling are performed in connection with communicating information, messages, and packets between devices, the method 1500 focuses on and discusses the steps and signaling for understanding the invention. Elements or steps with the same reference numbers used in different figures are the same or similar and those elements or steps will not be described in detail again.

The signaling diagram/method 1500 may be, and in some embodiments is, implemented using exemplary systems 100 or 200. In such embodiments, the CBRS wireless network operator of the system 100 or system 200 enters into a first subscription service agreement with the operator of the SAS service provider system 1 118 to be the primary SAS service provider for the CBSDs of system 100 or 200. The CBRS wireless network operator of system 100 or 200 also enters into a second subscription service agreement with the operator of the SAS service provider 2 120 to be a backup SAS service provider which will provide SAS services to the CBSDs of system 100 or system 200 on an as needed basis. The second subscription service agreement is an agreement in which the operator of the CBRS wireless network only has to pay for services for the period of time that the SAS services are being used. The service agreement with the operator of the primary SAS service provider system is typically not a time basis of use payment agreement like the agreement with the backup SAS service provider but is a charge per CBSD registration for a fixed pre-determined period of time or a fixed number of CBSDs per fixed period of time payment regardless of use. It should be understood that the method 1500 is not limited to the exemplary systems 100 or 200 and may be, and is used, on other systems and system configurations. The signaling diagram/method 1500 illustrates the exemplary signaling and steps for efficiently and effectively identifying and responding to problems with a primary SAS service provider that can result in outages and loss of revenue of a CBRS network to which the primary SAS service provider system is providing SAS services. The signaling diagram/method 1500 determines problems with the primary SAS service provider system (e.g., SAS service provider system 1 118) and migrates the CBSDs of the CBRS system to a back up SAS service provider system (e.g., SAS service provider system 2 120) to minimize and/or eliminate outages and/or problems caused by service outages, problems, and/or issues with the primary SAS service provider system.

The method 1500 starts in start step 1505 shown on FIG. 10A. Operation proceeds from start step 1505 to step 1506. In step 1506, the OSS/Domain Proxy 114 is acting as Domain Proxy for the CBSDs of system 100 and requesting SAS services from the SAS service provider system 1 118 on the CBSDs of system 100's behalf. Operation proceeds from step 1506 to step 1510.

In step 1510, the SSAF entity 116 is initialized and becomes operational. Operation proceeds from step 1510 to step 1512.

In step 1512, the SSAF entity 116 generates and sends message 1514 to the OSS/Domain Proxy 114. The message 1514 is a message subscription request message including information requesting subscriptions be established with the primary SAS service provider system 1 118 and the backup SAS service provider system 2 120 so that the SSAF entity 116 can communicate with and utilize/test the services of primary SAS service provider system 1 118 and the backup SAS service provider system 2 120. Operation proceeds from step 1512 to step 1516.

In step 1516, the OSS/Domain Proxy 114 receives and processes the message 1514 and begins the process of establishing the subscription for the SSAF 116 entity with the primary SAS service provider system 1 118 and the backup SAS service provider system 2 120. Operation proceeds from step 1516 to steps 1518 and 1522. In step 1518 and 1520, the SSAF entity 116 and the OSS/Domain Proxy 114 exchange messages 1520 used to establish the subscriptions for the SSAF entity 116 with the primary SAS service provider system 1 118 and the backup SAS service provider system 2 120. Upon the establishment of the subscriptions with the primary SAS service provider 1 118 and the second SAS service provider system 2 120, operation proceeds to step 1524.

In step 1524, the SSAF entity 116 generates information for creating a plurality of dummy CBSDs (e.g., generating registration information or registration objects for each of the dummy CBSDs). Operation proceeds from step 1524 to step 1526.

In step 1526, the SSAF entity 116 generates and sends message 1528 to the dummy CBSD database 156 creating dummy CBSDs in the database 156. This includes sending instructions and/or database commands to store the generated CBSD information including the generated CBSD registration information for each of the dummy CBSDs in the database 156. Operation proceeds from step 1526 to step 1530.

In step 1530, the dummy CBSD database 156 receives and processes message 1528. Processing message 1528 including storing the dummy CBSD information per any instructions and/or commands. Operation proceeds from step 1530 to step 1532.

In step 1532, the SSAF entity 116 generates and sends message 1534 to primary SAS service provider system 1 118. The message 1534 includes SAS registration requests to register a first set of dummy CBSDs with the FCC SAS 122 via primary SAS service provider system 1 118. The first set of dummy CBSDs being a non-empty sub-set of the dummy CBSDs created and stored in dummy CBSD database 156. The message 1534 including information for registering the first set of dummy CBSDs including dummy CBSD registration information and/or dummy CBSD registration objects. Operation proceeds from step 1532 to step 1536.

In step 1536, the primary SAS service provider system 1 118 receives and processes the message 1534 which includes registering the first set of dummy CBSDs as requested using the CBSD registration information and/or dummy CBSD registration objects included in the message 1534 and responding that the registration of the first set of dummy CBSDs to the SSAF entity 116 has been successful along with providing a CBSD registration Id for each of the registered dummy CBSDs of the first set of dummy CBSDs. This CBSD registration Id information will be used by the SSAF 116 entity while emulating the dummy CBSD and is stored by the SSAF 116 in the dummy CBSD database with other information for each of the dummy CBSDs of the first set of CBSDs. The SSAF 116 also stores with each of the CBSDs in the first set of CBSDs that the CBSD has been directly registered with the primary SAS service provider system 1 118 without going through the OSS/Domain Proxy 114. Operation proceeds from step 1536 to step 1538.

In step 1538, the SSAF entity 116 generates and sends message 1540 to OSS/Domain Proxy 114. The message 1540 includes SAS registration requests to register a second set of dummy CBSDs with the FCC SAS 122 via primary SAS service provider system 1 118. The second set of dummy CBSDs being a non-empty sub-set of the dummy CBSDs created and stored in dummy CBSD database 156. The dummy CBSDs in the second set of dummy CBSDs being different than the dummy CBSDs in the first set of dummy CBSDs. The message 1540 including information for registering the second set of dummy CBSDs including dummy CBSD registration information and/or dummy CBSD registration objects. Operation proceeds from step 1538 to step 1542.

In step 1542, the OSS/Domain Proxy 114 receives and processes the message 1540. Operation proceeds from step 1542 to step 1544. In step 1544, the OSS/Domain Proxy 114 generates message 1546 and sends it to the primary SAS service provider system 1 118. The message 1546 is based on the message 1540 and incudes information (e.g., registration information and/or registration objects for the dummy CBSDs of the second set of dummy CBSDs) and a request to register each of the dummy CBSDs with the FCC SAS 122. Operation proceeds from step 1544 to step 1548.

In step 1548, the primary SAS service provider system 1 118 receives and processes the message 1546 which includes registering the second set of dummy CBSDs as requested using the CBSD registration information and/or dummy CBSD registration objects included in the message 1546 and responding to the OSS/Domain Proxy 114 that the registration of the second set of dummy CBSDs has been successful along with providing a CBSD registration Id for each of the registered dummy CBSDs of the second set of dummy CBSDs. The success of the registration of the second set of dummy CBSDs and related information is forwarded by the OSS/Domain Proxy 114 to the SSAF 116. The CBSD registration Id information will be used by the SSAF 116 entity while emulating the dummy CBSD and is stored by the SSAF 116 in the dummy CBSD database with other information for each of the dummy CBSDs of the second set of CBSDs. The SSAF 116 also stores with each of the CBSDs in the second set of CBSDs that the CBSD has been registered with the primary SAS service provider system 1 118 through the OSS/Domain Proxy 114. Operation proceeds from step 1548 to step 1549.

In step 1549, the OSS/Domain Proxy 114 collects network data, metrics and Key Performance Indicator measurements on the CBRS wireless network including interactions between the OSS/Domain Proxy 114 and the primary SAS service provider system 1 118 (e.g., information on the successes and failures of the primary SAS service provider system to provide SAS requested services (e.g., CBSD SAS registration service requests, spectrum inquiry service requests, spectrum grant service requests, heartbeat service requests, spectrum authorization service requests, spectrum relinquishment service requests, and if there is a failure the reason for the failure (e.g., failure due to lack of response or time out from the primary SAS service provider system in response to service request, receipt of failure response messages from the primary SAS service provider system 1 118 in response to service requests, percentage of requests and request types that are failing within one or more time periods, number of CBSDs in the network affected by the failures, severity of the SAS service problem)). Operation proceeds from step 1549 to step 1550.

In step 1550, the OSS/Domain Proxy 114 generates message 1552 and sends it to SSAF entity 116. Message 1552 includes the network data, metrics and Key Performance Indicator measurements collected on the CBRS wireless network including interactions between the OSS/Domain Proxy 114 and the primary SAS service provider system 1 118. Operation proceeds from step 1550 to step 1554.

In step 1554, the SSAF 116 receives the message 1552 and extracts the network data, metrics and Key Performance Indicator measurements collected on the CBRS wireless network including interactions between the OSS/Domain Proxy 114 and the primary SAS service provider system 1 118 from the message 1552. Operation proceeds from step 1554 to step 1556.

In step 1556, the SSAF entity 116 processes and analyzes the information from message 1552 to determine potential issues with the SAS services being provided by the primary SAS service provider system 1 118. This includes determining which of the SAS services being provided by the primary SAS service provider system 1 118 from the set of SAS services including SAS CBSD registration service, spectrum inquiry service, spectrum grant service, spectrum heartbeat service, spectrum authorization service and spectrum relinquishment service are experiencing problems and/or issues. This may, and in some embodiments does include one or more of the following: (i) determining the percentage of failures of each of the type of SAS service within one or more time periods (e.g., last 15 minutes, last hour, last 4 hours, etc.) and whether the percentage of failures is greater than a threshold value for the service type, (ii) Determining the overall SAS service success rate for all SAS service requests and whether that success rate is below an expected SAS service success rate threshold (e.g., primary SAS service provider system 1 118 may have guaranteed a success rate of 99% but is operating at 80% success rate), (iii) determining the overall SAS service failure rate for all SAS service requests and whether that failure rate is above an expected SAS service failure rate threshold (e.g., primary SAS service provider system 1 118 may have guaranteed a success rate of 99% but is operating at 80% success rate). In some embodiments, when a SAS service failure rate threshold is greater than an expected failure rate, the SSAF 116 determines that there is a problem with that SAS service. In some embodiments, a determined SAS service failure rate for a SAS service is compared to a set of SAS failure rate threshold to determine the severity of the problem. For example, the SAS CBSD registration service is failing 61% of the time over a given time period. The 61% is compared to failure thresholds of 0%, 10%, 20%, 30%, 40%, 50%, 60%, 70%, 80%, 90%, 100% which correspond to severity levels of 0, 1, 2, 3, 4, 5, 6, 7, 8, 9, 10 and is assigned a severity of 6 as the 61% is equal to or greater than 60% and less than 70%. Based on the analysis of the message 1552 data, metrics, KPI and information, the SSAF entity 116 determines which SAS services are experiencing problems and/or issues and in some embodiments the severity of the issue. The SSAF 116 may, and in some embodiments, also determines a CBRS network impact severity level for the SAS service failures based on the type of SAS service experiencing the failure and the projected impact on the CBRS network. For example, if the SAS service that is failing is the SAS heartbeat request service, the impact on the CBRS network will be far greater than the impact of an SAS spectrum relinquishment service failure. The CBRS network impact failure may also be based on the number of CBSDs being impacted by the SAS service failures as well as the type of SAS service and the network traffic being handled by the CBSDs being impacted. Operation proceeds from step 1556 to step 1558.

In step 1558, the SSAF 116 ranks and/or prioritizes the potential problems/issues identified in step 1556 with the SAS services (e.g., based on SAS service failures per time period, SAS service type, and/or impact on CBRS wireless network) for testing and remedial action operations. Operation proceeds from step 1558 to steps 1560 and 1564.

In steps 1560 and 1564, the SSAF entity 116 exchanges messages 1562 with the dummy CBSD database 156 to determine the reachability to the dummy CBSD information needed for emulating/simulating dummy CBSD during testing of the primary SAS service provider system 1 118. Upon confirming that the SSAF entity 116 can reach and obtain information from the dummy CBSD database, operation proceeds from steps 1560 and 1564 to step 1566.

In step 1566, the SSAF entity 116 determines what test or tests are to be performed to further determine which specific SAS services are experiencing problems and/or issues, the cause of the SAS service problems and/or issues being experienced, and the impact on the system 100. In some embodiments, the step 1566 includes the SSAF entity 116 determining what test or tests are to be performed based on the issues and/or problems with SAS services being provided by the primary SAS service provider system 1 118 based on one or more of the following: (i) message 1552 (e.g., data and information from message 1552), (ii) the results of the analysis of SAS services performed in 1556, and/or (iii) the ranking/prioritizing of issues/problems with SAS services determined in step 1558. For example, if problems with the SAS heartbeat service and the spectrum inquiry service have been identified with the SAS heartbeat service being ranked and/or prioritized having a highest priority than the spectrum inquiry service, the SSAF entity 116 will determine one or more tests to be performed to test the SAS heartbeat service request followed by one or more tests to be performed to test the SAS spectrum inquiry request. Operation proceeds from step 1566 to step 1568.

In step 1568, the SSAF entity 116 generates message or messages 1570 and sends it to the OSS/Domain Proxy 114. Message(s) 1570 includes one or more SAS service request test messages including SAS service requests for the dummy CBSDs of the second set of dummy CBSDs. The particular SAS service request test message or messages being based on the test message(s) determined in step 1566. For example, if the SAS heartbeat service is to be tested, dummy CBSD heartbeat request messages are sent for registered dummy CBSDs which have been granted spectrum of the second set of registered dummy CBSDs. The use of dummy CBSD SAS service request messages and different test scenarios has been discussed above and in connection with the state diagram 300. One or more of these SAS service tests (e.g., SAS CBSD registration service test, SAS spectrum inquiry service test, spectrum grant service test, spectrum heartbeat service test, spectrum authorization service test, and spectrum relinquishment service test) may be, and in some embodiments is, implemented as part of the testing for different test scenarios. Operation proceeds from step 1568 to step 1572.

In step 1572, the OSS/Domain Proxy 1572 receives and processes the message or messages 1570 which include requests and information for testing one or more SAS services being provided by the primary SAS service provider 1 118. Operation proceeds from step 1572 to step 1574 and step 1578.

In steps 1574 and 1578, the OSS/Domain Proxy 114 and the SAS service provider 1 118 generate and exchanges message or messages 1576. The message or messages 1576 generated by the OSS/Domain Proxy 114 are based on message(s) 1570 and include requests and information for testing one or more SAS services being provided by the primary SAS service provider 1 118. For example, one or more dummy CBSD heartbeat requests from the dummy CBSDs of the second set of CBSDs. The messages 1576 generated by the primary SAS service provider 1 118 are the responses to the dummy CBSD requests (e.g., responses to the dummy CBSD heartbeat requests from the second set of dummy CBSDs). In step 1574, the OSS/Domain Proxy 114 will also determine for which SAS requests sent as part of messaging 1576 no response or an untimely response (after timer expired) has been received. Operation proceeds from steps 1578 to steps 1578.

In step 1578, the OSS/Domain Proxy 114 generates and sends message(s) 1578 to the SSAF entity 116. The message(s) 1579 are responses or lack of responses to the test SAS service requests received by the OSS/Domain Proxy 114 in step 1574. For example, the responses received by the OSS/Domain Proxy 114 to the dummy CBSD heartbeat requests made to test to the primary SAS service provider system heartbeat service in exchange of messages in steps 1574 and 1578. Operation proceeds from step 1578 to step 1580.

In step 1580, the SSAF entity 116, receives the message 1579 including the responses to the dummy CBSD SAS service test request messages. In some embodiments, a particular SAS service test scenario can include several SAS service request messages to be exchanged. If this is the case operation proceeds from step 1580 back to step 1568 where additional test request messages are generated and sent to the OSS/Domain Proxy 114. For example, if there are no dummy CBSDs in the second set of dummy CBSDs which have granted spectrum and the SSAF entity 116 has determined that the spectrum heartbeat service is to be tested, the SSAF entity 116 will first send a spectrum inquiry request, followed by a spectrum grant request using the identified spectrum from the spectrum inquiry response, and once a spectrum grant has been received, then a heartbeat request will be sent on behalf of the dummy CBSD to test the heartbeat service. As a result, a number of messages will be exchanged between the SSAF entity 116, the OSS/Domain Proxy 114 and the primary SAS service provider system 1 118 as part of this test. With respect to such a test scenario, multiple cycles of the steps 1568, 1572, 1574, 1578, 1576 and 1580 will be performed as part of the test. Operation proceeds from step 1580 to steps 1582 and 1586 shown on FIG. 10B.

In steps 1582 and 1586, the SSAF entity 116 exchanges messages 1584 with the primary SAS service provider system 1 118. The test messages are dummy CBSD SAS service request test messages with the dummy CBSDs being from the first set of dummy CBSDs which were directly registered by the SSAF entity 116 with primary SAS service provider system 1 118. The specific SAS services to be tested are determined in step 1566. The operations in the state diagram 300 are used by the SSAF entity 116 in testing the various SAS services provided by the primary SAS service provider system 1 118. In some embodiments, the same SAS services are tested as were previously tested in steps 1568, 1572, 1574, 1578, 1576 and 1580. However, these test messages are not sent through the OSS/Domain Proxy 114 but are sent directly from the SSAF entity 116 to the primary SAS service provider system 1 118. Operation proceeds from step 1582 and 1586 to step 1588.

In step 1588, the SSAF entity 116 determines whether the SAS service problems/issues being experienced are with the OSS/Domain Proxy and/or the OSS/Domain Proxy connection and/or link to the primary SAS service provider system 1 118 based on the results of the tests performed in steps 1568, 1572, 1574, 1578, 1576 1580, 1582 and 1586. If the results of the tests from steps 1582 and 1586 where the SSAF entity 116 test messages did not pass through the OSS/Domain Proxy 114, the SSAF entity 116 determines that there is a problem with the OSS/Domain Proxy 114 and/or the connection and/or link between the OSS/Domain Proxy 114 and primary SAS service provider system 1 118. For example, time out of response message may be, and in some embodiments is, the result of delays or problems (e.g., congestion or impairments) with the connection or link between the OSS/Domain Proxy 114 and the primary SAS service provider system 1 118. Additionally, the OSS/Domain Proxy 114 may be modifying the SAS service request messages while processing or generating requests causing errors (e.g., wrong credentials and/or address information included in SAS service request messages) resulting in problems only occurring when messages are passed through the OSS/Domain Proxy 114 as opposed to during direct communications between the SSAF entity 116 and the SAS service provider system 1 118. If the SSAF entity 116 determine the problem and/or issue with an SAS service being provided by the primary SAS service provider system 1 118 is determined to be caused by the OSS/Domain Proxy 114, the SSAF entity 116 notifies the OSS/Domain Proxy 114 of the problem as being determined to be caused by the OSS/Domain Proxy 114 and/or the OSS/Domain Proxy connection and/or links to the primary SAS service provider system 118. Operation in such a case, proceeds from step 1588 to step 1589.

In step 1589, the OSS/Domain Proxy 114 in response to being notified of the problem with the OSS/Domain Proxy 114 and/or connection and/or link to the primary SAS service provider system 1 118 takes remedial action to identify and/or fix the problem (e.g., performing verification checks on credentialing information used with the primary SAS service provider system 1 118, performing verification on configuration settings and/or parameters for interfacing to and requesting and receiving services from the primary SAS service provider system 1 118, performing connection and link performance and latency tests on the connection paths between the OSS/Domain Proxy 114 and the SAS service provider system 1 118, taking remedial action to modify connection paths found to have undue latency or performance issues, changing OSS/Domain Proxy 114 configuration settings found to be wrong or causing issues, fixing any credential problems identified). Operation would then proceed from step 1589 to step 1590 where the OSS/Domain Proxy 114 would collection additional network data, information, metrics, KPI information on the SAS services being provided by the primary SAS service provider system 1 118. Operation proceeds from step 1589 to step 1550 where the method continues as previously described.

When the SSAF entity 116 in step 1588 determines that the problem is not with the OSS/Domain Proxy 114 and/or the connection and/or links connecting the OSS/Domain Proxy 114 to the primary SAS service provider system 1 118, operation proceeds from step 1590 to step 1591.

In step 1591, the SSAF entity 116 determines based on the results of the dummy CBSD testing performed in steps 1568, 1572, 1574, 1578, 1576 1580, 1582 and 1586, the particular SAS services experiencing problems and/or issues and the severity of the problems/issues with respect to the particular SAS services and what if any action is to be taken. For example, if the SSAF entity 116 determines that the primary SAS service provider system 1 118 CBSD registration service is not operational or functioning reliably but its other SAS services are operating properly, the SSAF entity 116 determines to have the OSS/Domain Proxy 114 request CBSD registration services from the backup SAS service provider system 2 120 but continue to use the primary SAS service provider system 1 118 for all other SAS services and notifies the OSS/Domain Proxy 114 of this decision. The OSS/Domain Proxy 114 then commences to utilize the backup SAS service provider system 2 120 for SAS CBSD registration services for new CBSDs while continuing to use the primary SAS service provider system 1 118 for its other SAS services so as not interrupt service to the other active CBSDs while also limiting the cost of the expense of the backup services to be provided by the backup SAS service provider system 2 120. In other cases, when the SSAF entity 116 determines that the primary SAS service provider system 1 118 is out of service (e.g., there is no response from the primary SAS service provider system 1 118 or the responses are all failure messages, the SSAF entity 116 determines to test the availability of the FCC SAS 122. Operation proceeds from step 1591 to step 1592.

In step 1592, the SSAF entity 116 generates and sends a test message 1594 directly to the SAS 122. In this example, the test message 1594 is a ping message. Operation proceeds from step 1592 to step 1596.

In step 1596, the SAS 122 receives the test message 1594 from the SSAF entity 116 and processes it. Operation proceeds from step 1596 to step 1598.

In step 1598, the SAS 122 generates and sends response message 1600 to the SSAF entity 116 in response to the test message 1600. The message 1600 in this example is a ping response message indicating that the SAS 122 is available and alive. Operation proceeds from step 1598 to step 1602.

In step 1602 the SSAF entity 116 receives the response message 1600 from the SAS 122 and processes it. Operation proceeds from step 1602 to step 1604.

In step 1604, the SSAF entity 116 determines based on the response message 1600 or the lack of a response to message 1594 whether the SAS 122 is available and/or alive. In this example, the SAS 122 is available/alive based on the ping response message 1600. If message 1600 was a failure message or no message is received from the SAS 122 before an expiration timer, the SSAF entity 116 determines that the SAS 122 is not available and/or alive and based on this determination that the SAS 122 is not available and/or alive determines that the SAS service problems being experienced are not the fault of the primary SAS service provider system 1 118 but instead are the fault of the SAS 122 and notifies the OSSS/Domain Proxy 114 that the SAS 122 is not available and/or alive. When in step 1604, the SSAF entity 116 determines the SAS 122 is available and/or alive, operation proceeds from step 1604 to steps 1606 and 1610.

In some embodiments, in step 1591, when the SSAF entity 116 determines that a critical SAS service is not operational or is determined to have a severe impact (e.g., greater than a threshold level of outages in the CBRS network) (e.g., the heartbeat service is not working) but other primary SAS service provider system 1 118 SAS services are operational, steps 1592, 1596, 1598, 1602 and 1604 are by-passed and/or skipped, and operation proceeds to steps 1606 and 1610.

In steps 1606 and 1610, the SSAF entity 116 generates and exchanges messages 1608 with the backup SAS service provider system 2 120 to test the SAS service capability of the backup SAS service provider system 2 120. The exchanged messages 1608 include SAS registration messages for registering a third set of dummy CBSDs with the SAS service provider system 2 120. The third set of dummy CBSDs being an empty set. The third set of dummy CBSDs are a sub-set of the dummy CBSDs whose information was created by SSAF entity 116 and stored in the dummy CBSD database 156. The third set of dummy CBSDs are dummy CBSDs which are not included in the first set of dummy CBSDs or the second set of CBSDs and are unregistered dummy CBSDs. In the exchange of messages 1608 in steps 1606 and 1610, SSAF entity 116 in some embodiments, performs one or more of the following tests on the backup SAS service provider system 2 120: SAS CBSD registration service tests, SAS spectrum inquiry service tests, SAS spectrum grant service tests, SAS heartbeat service tests, SAS spectrum authorization service tests, and SAS spectrum relinquishment service tests. These tests may be performed as described above and in the state diagram 300 of FIG. 3. Operation proceeds from step 1606 and 1610 to step 1612.

In step 1612, the SSAF entity 116 determines whether or not to move or migrate the CBSDs of the CBRS network system 100 to the backup SAS service provider system 2 120 based on the results of the tests performed in steps 1606 and 1610. If tests are successful or a percentage of the tests are successful above and/or equal to a first threshold level that indicates the backup SAS service provider system 2 120 is operating reliably, the SSAF entity 116 makes the determination to move the CBSDs of the CBRS network system 100 to the backup SAS service provider system 2 120. If the tests are not successful or the percentage of the tests which are successful is below the first threshold indicating the backup SAS service provider system 2 is not operating reliably, the SSAF entity 116 makes a further determination as to whether the current operational capabilities of the backup SAS service provider system 2 is greater than the current operational capabilities of the primary SAS service provider system 1 118. If the determination is that the backup SAS service provider system 2 120 currently has better operational capabilities (e.g., higher reliability with respect to critical SAS services (e.g., SAS heartbeat and authorization services), the SSAF entity 116 makes the determination to move and/or migrate the CBSDs of the CBRS system 100 to the backup SAS service provider system 2 120. If the determination is that the backup SAS service provider system 2 120 currently does not better operational capabilities (e.g., it has lower reliability with respect to critical SAS services (e.g., SAS heartbeat and authorization services)), the SSAF entity 116 makes the determination not to move and/or migrate the CBSDs of the CBRS system 100 to the backup SAS service provider system 2 120 but instead to have them remain utilizing the primary SAS service provider system 1 118. In this example, the SSAF entity 116 determines that the CBSDs should be moved and/or migrated to backup SAS service provider system 2 120 which is currently providing better SAS service reliability with respect to critical SAS services. Operation in such a situation proceeds from step 1612 to step 1614. In some embodiments, steps 1606 and 1610 are skipped and no testing is performed on the reliability of the backup SAS service provider system 2 120 with operation proceeding from step 1604 to step 1614. This may, and in some cases, is done when the primary SAS service provider system 1 118 is experiencing a total outage or SAS service outage which has resulted in the CBSDs of the CBRS network of system 100 being unable to utilize granted spectrum to provide services resulting in a CBRS wireless network outage.

In step 1614, the SSAF entity 116 commences operations and preparations to move and/or migrate the CBSDs of the CBRS network system 100 from the primary SAS service provider system 1 118 to the backup SAS service provider system 2 120 which includes generating a CBSD dormancy request message 1618 and a migration notification message 1624. The CBSD dormancy request message 1618 includes a request for the primary SAS service provider system 1 118 to enter a dormant state with respect to the providing SAS services for the CBSDs of the CBRS network system 100. The dormancy message 1618 includes a list of the CBSDs for which the primary SAS service provider system 1 118 is stopping providing SAS services. This list includes the actual CBSDs of the CBRS system 100 but typically not the dummy CBSDs of the first and/or second set of dummy CBSDs, as the SSAF entity 116 will continue to test the primary SAS service provider system 1 118 using dummy CBSD test messages to determine when the SAS service provider system 1 118 problems/issues have been resolved. The message 1624 includes information notifying the OSS/Domain Proxy 114 that the SAS services for the CBSDs of the CBRS network system 100 will be moved and/or migrated and/or transferred from the primary SAS service provider system 1 118 to the backup SAS service provider system 2 120. In some embodiments, the message 1624 includes a list of the CBSDs to be moved. For example, if only certain CBSDs are to be moved but others are unaffected by the current SAS service outage (e.g., when only the CBSD spectrum grant service is not working while the other services are then only CBSDs who do not have granted spectrum will listed for moving and/or migrating to the backup SAS service provider system 2 120 while the other CBSDs of the system 100 will remain using the primary SAS service provider system 1 118). Operation proceeds from step 1614 to steps 1616 and 1622.

In step 1616, the SSAF entity 116 sends the message 1618 to the primary SAS service provider 1 118 requesting that it enter a dormancy state with respect to actual CBSDs of the system 100. A list of the CBSD IDs for which the primary SAS service provider system 1 118 is to enter a dormant state and not provide SAS services is included in the message 1618. Operation proceeds from step 1616 to step 1620.

In step 1620, the primary SAS service provider system 1 118 receives and processes the message 1618. The primary SAS service provider system 1 118 enters a dormant state with respect to providing services for the CBSDs with the IDs listed in the message 1618. In such instances, the primary SAS service provider system 1 118 ceases to contact the SAS 122 on behalf of the any CBSD for which it has been placed in a dormant state regardless of messages of SAS service requests received for those CBSDs. This is done to prevent two different SAS service provider system sending conflicting or duplicative requests to the SAS 122 on behalf of the same CBSD. The primary SAS service provider system 1 118 sends a confirmation to the SSAF entity 116 that it has received the message 1618 and enters a dormant state with respect to the identified CBSDs. When the primary SAS service provider system 1 118 is completely down, the SSAF entity 116 will not receive a response from the primary SAS service provider system 1 118. In such an instance, the SSAF entity 116 will continue to send the dormancy request message 1618 to the primary SAS service provider system 1 118 until it receives a confirmation message.

In step 1622, the SSAF entity 116 sends the message 1624 to the OSS/Domain Proxy 114 notifying the OSS/Domain Proxy 114 that the CBSDs identified in the message are being moved and/or migrated to the backup SAS service provider system 2 120 for SAS services. Operation proceeds from step 1622 to steps 1628 and 1626.

In step 1626, the OSS/Domain Proxy 114 receives and processes the message 1624. The OSS/Domain Proxy 114 updates its configuration so that the identified CBSDs SAS services are to be provided by the backup SAS service provider system 2 120 (e.g., changing addressing information with respect to which SAS service provider system to send SAS services to with respect to the CBSDs identified in the message 1624 and ceasing to send SAS service requests to the primary SAS service provider system 1 118 in connection with the identified CBSDs.

In step 1628, the SSAF entity 116 generates and sends message 1630 to the OSS/Domain Proxy 114 requesting registration information (e.g., registration objects) for each of the CBSDs to be moved and/or migrated to the backup SAS service provider system 2 120. In some embodiments, the message 1630 includes the CBSD ID for each of the CBSDs to be moved and/or migrated. In some embodiments, request for registration information for the CBSDs is include in the message 1624 instead of in a separate message. In some embodiments in step 1612, the SSAF entity 116 exchanges messages with OSS/Domain Proxy 114 to determine which of the CBSDs of the system 100 are to be migrated and/or moved based on the current states of each of the CBSDs current state and/or the expected SAS service needs. Operation proceeds from step 1628 to step 1632.

In step 1632, the OSS/Domain Proxy 114 receives and processes the message 1630. Operation proceeds from step 1632 to step 1634.

In step 1634, the OSS/Domain Proxy 114 generates and/or obtains the requested registration information (e.g., registration objects) for the identified CBSDs which are to be moved and/or more migrated from the primary SAS service provider system 1 118 to the backup SAS service provider system 2 120. Operation proceeds from step 1634 to step 1636.

In step 1636, the OSS/Domain Proxy 114 generates and sends the message 1638 to the SSAF entity 116 in response to the message 1630. The message 1638 includes the requested CBSD registration information (e.g., CBSD registration objects) for the CBSDs to be moved and/or migrated to the backup SAS service provider system 2 120. Operation proceeds from step 1636 to step 1640.

In step 1640, the SSAF entity 116 receives and processes the messages 1636 with the requested CBSD registration information (e.g., the CBSD registration objects). Operation proceeds from step 1640 to step 1642.

In step 1642, the SSAF entity 116 generates message 1646. Message 1646 includes a request to confirm the availability for the backup SAS service provider system 2 120 to provide SAS services the CBSDs of the system 100. In some embodiments, the number of CBSDs for which SAS services are to be provided is included in the message 1646 and/or a list of the CBSD IDs for the CBSDs for which the SAS services are to be provided. Operation proceeds from step 1642 to step 1644.

In step 1644, the SSAF entity 116 sends the message 1646 to the backup SAS service provider system 2 120 requesting the backup SAS service provider system 2 120 that it confirm its availability to provides SAS services to the CBSDs of the system 100 and/or for a specific number of CBSDs or for a specific set of CBSDs for which CBSD ID information is provided. Operation proceeds from step 1644 to step 1648.

In step 1648, the backup SAS service provider 2 120 receives and processes the message 1646 which includes making the determination as to whether or not the SAS service provider system 2 120 has the ability (e.g., capacity) to provide SAS services as requested in message 1546 (e.g., for the CBSDs of the system 100, the number of CBSDs identified, and/or the specific set of CBSDs identified). In this example, the backup SAS service provider system 2 determines that whether or not it has the ability to provide the requested SAS services based on its current load (e.g., by comparing the number of CBSDs for which SAS services are being requested to its current availability which may be calculated as the maximum number of CBSDs to which it can provide SAS services minus the current number of CBSDs to which it is providing services or has agreed to provide SAS services). Operation proceeds from step 1648 to step 1650.

In step 1650, the backup SAS service provider system 2120 generates and sends message 1652 to SSAF entity 116. When the backup SAS service provider system 2 120 has determined in step 1648 that it can provide the requested SAS services, message 1652 includes information confirmation that it has the ability to provide the requested SAS services. When the backup SAS service provider 2 120 determines that it cannot provide the SAS services requested (e.g., the number of CBSDs is beyond its capability given the current number of CBSDs it is already supporting), message 1652 includes information indicating the number of CBSDs, for which SAS services can be provided by the backup SAS service provider system 2 120. In some embodiments, the message 1646 requests the number of CBSDs the backup SAS service provider system 2 120 is available to support and the message 1652 includes the requested number of CBSDs the backup SAS service provider system 2 120 is available to supported (e.g., its available capacity based on current loading conditions). In this example, the backup SAS service provider system 2 120 indicates in message 1652 that it has availability to provide the requested SAS services. Operation proceeds from step 1650 to step 1654.

In step 1654, the SSAF entity 116 receives and processes the message 1652. The SSAF entity 116 determines based on the information included in message 1652 whether or not the backup SAS service provider system 2 120 has the availability to provide SAS services for all, some or none of the CBSDs of system 100. When the information indicates that the backup SAS service providers system 2 120 only has the availability to provide SAS services to N CBSDs where N is a number less then the number of CBSDs for which the SSAF entity 116 wishes to move or migrate to the backup SAS service provider system 2 120, the SSAF entity 116 determines which of the N CBSDs of the set of CBSDs experiencing SAS services problems to move and/or migrate to the backup SAS service provider system 2 120 based on a priority ranking of the N CBSDs. The priority ranking being based on one or more of the following: the number of subscribers the CBSD is currently supporting, the location of the CBSD (e.g., location with higher number of subscribers has higher priority such as a city location has a higher priority ranking than a rural location), the anticipated traffic of the CBSD, the type of traffic supported by the CBSD (e.g., voice traffic having priority over data traffic). In this example, the backup SAS service provider system 2 120 has the availability to provide SAS services for all of the CBSDs the SSAF entity 116 has determined to move and/or migrate to the backup SAS service provider system 2 120. Operation from step 1654 to step 1656 shown on FIG. 10C.

In step 1556, the SSAF entity 116 generates and sends message 1658 to the OSS/Domain Proxy 114. The message 1658 includes information providing confirmation that the switchover from the primary SAS service provider system 1 118 to the backup SAS service provider system 2120 is being initiated and identifies the CBSDs being switched (e.g., by providing a list of CBSD IDs). Operation proceeds from step 1656 to steps 1660 and 1664.

In step 1660, the OSS/Domain Proxy 114 receives and processes the message 1658. Operation proceeds from step 1660 to step 1662.

In step 1662, the OSS/Domain Proxy 114 updates information indicating which CBSDs are being provided SAS services by which SAS service provider systems and also sends a response to the SSAF entity 116 confirming receipt of the message 1658.

In step 1664, the SSAF entity 116 generates and sends message 1666 to the backup SAS service provider system 2 120. The message 1666 includes registration information for each of the CBSDs being moved and/or migrated to the backup SAS service provider system 2 120. In some embodiments, the registration information for each of the CBSDs is a registration object for the CBSD. In some embodiments, the message 1666 also includes a request for the backup SAS service provider system 2 120 to assume control of management of providing SAS services to the CBSDs for which registration information has been provided or for CBSDs for which CBSD ID information is provided. Operation proceeds from step 1664 to step 1668.

In step 1668, the backup SAS service provider system 2120 receives the message 1668 and extracts the CBSD registration information (e.g., CBSD registration objects) and/or CBSD ID information from the message 1668. Operation proceeds from step 1668 to step 1670.

In step 1670, the backup SAS service provider system 2120 generates message 1674. The message 1674 is a request for the SAS 122 to provide CBSD status information for the CBSDs being moved and/or migrated to the backup SAS service provider system 2120. In some embodiments, the message 1674 includes a list of the CBSD IDs or other CBSD identification information for which the status is being requested. Operation proceeds from step 1670 to step 1672.

In step 1672, the backup SAS service provider system 2120 sends the message 1674 to the SAS 122. Operation proceeds from step 1672 to step 1676.

In step 1676, the SAS 122 receives and processes the message 1674 requesting the status of the CBSDs being moved and/or migrated to the backup SAS service provider system 2 120. Processing the message 1674 including extracting information identifying the CBSDs for which status information is being requested and obtaining the requested status information from the SAS 122 memory and/or a database connected and/or coupled to the SAS 122 database in which the CBSD status information is stored. Operation proceeds from step 1676 to step 1678.

In step 1678, the SAS 122 generates and sends message 1680 to the backup SAS service provider system 2 120 in response to the message 1674. The message 1680 includes the requested CBSD status information for each of the CBSDs identified in the message 1674. The status information includes for example CBSD state information, spectrum grant information, spectrum authorization information, spectrum heartbeat information, SAS service provider system information providing SAS services for the CBSD. Operation proceeds from step 1678 to step 1682.

In step 1682, the backup SAS service provider system 2120 receives and processes the message 1680. Operation proceeds from step 1682 to step 1684. In step 1684, the backup SAS service provider system 2 120 determines the order and in some embodiments how (e.g., in batches) the CBSDs are to be moved and/or migrated from being provided services from the primary SAS service provider system 1 118 to the backup SAS service provider system 2 120. In some embodiments, the SSAF entity 116 provides the ordering or grouping for batching of CBSDs for migration wherein the ordering and/or batching prioritizes CBSD with a higher traffic load or number of subscribers over CBSDs with a lower traffic load or lower number of subscribers. Operation proceeds from step 1684 to steps 1686 and 1690.

In steps 1686 and 1690 the backup SAS service provider 2 120 and the SAS 122 exchange messages 1688 to re-register the identified CBSDs as being provided SAS services from backup SAS service provider system 2 120. The registration being performed in the order identified in step 1684 and is typically done in batches. The messages 1688 include CBSD ID information and/or registration information (e.g., CBSD registration object) for each of the CBSDs being migrated and/or moved from being provided SAS services by the primary SAS service provider system 1 118 to the backup SAS service provider system 2 120. For those CBSDs which are being newly registered, the CBSD registration is provided as a new registration as opposed to a migration or re-registration request. Operation proceeds from steps 1686 and 1690 to steps 1692 and 1698.

In step 1692, the backup SAS service provider system 2120 in response to message 1666 generates and sends message 1694 to the SSAF entity 116. The message 1694 includes information confirming that the secondary SAS service provider system 2 120 is now the registered SAS service provider system for the CBSDs which the SSAF entity 116 identified and/or provided registration information for in message 1666. Operation proceeds from step 1692 to step 1696.

In step 1696, the SSAF entity 116 receives and processes message 1694. Operation proceeds from step 1696 to step 1704.

In steps 1698 and 1702, the flow of messages 1700 is established between the backup SAS service provider system 2120 and the OSS/Domain Proxy 2120. The messages 1700 including information, requests, and responses for SAS services for the CBSDs now being provided SAS services by the backup SAS service provider system 2 120 (e.g., CBSD spectrum inquiry requests, CBSD spectrum grant requests, CBSD heartbeat requests, CBSD authorization requests, CBSD spectrum relinquishment requests and the responses to these SAS service requests). The messages also may include CBSD registration requests for new CBSDs received from the OSS/Domain Proxy 114 when the SAS registration service of the primary SAS service provider system 1 118 was once of the SAS services experiencing issues and/or problems and the OSS/Domain Proxy 114 has been instructed by the SSAF entity 116 to utilize the backup SAS service provider system 2 120 for new CBSD registrations.

In step 1704, the SSAF entity 116 performs testing of the SAS services of the primary SAS service provider system 1 118 by exchanging messages 1706 with the primary SAS service provider system 1 118 to determine when the primary SAS service provider system 1 118 has resolved its SAS service problems and/or issues and is once again providing reliable SAS services in response to SAS service requests sent by the SSAF entity 116. In step 1708, the primary SAS service provider system 1 118 receives, processes and responds to dummy CBSD SAS service test messages. The messages 1706 exchanged include requests from the SSAF entity 116 for SAS services for the dummy CBSDs of the second set of dummy CBSDs previously used for testing the primary SAS service provider system 1 120 and/or for unregistered dummy CBSDs if the SAS CBSD registration service is being tested. The exchanged messages 17606 further include the responses from the primary SAS service provider system 1 118 to the dummy CBSD SAS service request messages sent by the SSAF entity 116. In some embodiments, the SAS entity 116 will cycle through the CBSD states described in state diagram 300 for each of the second set of dummy CBSDs as part of the testing in which each of the CBSD states and SAS services is tested. In other instances for example when only one SAS service is impacted such as the SAS inquiry state, the SSAF entity 116 may, and in some embodiments does, just perform dummy CBSD tests for that SAS service. The SSAF entity 116 in step 1704 also collects data and information on the responses, lack of responses, and timing of responses to the dummy CBSD SAS service requests sent to the primary SAS service provider system 1 118. In some embodiments, the SSAF entity 116 also sends SAS service test messages (e.g., SAS service request messages for CBSDs of the first set of dummy CBSDs or unregistered dummy CBSDs) to the primary SAS service provider system 1 118 via the OSS/Domain Proxy 114. This testing is typically performed after the testing performed in steps 1704 and 1708 has been used to determine that the SAS services of the primary SAS service provider system 1 118 are once again available. Operation proceeds from step 1704 to step 1710.

In step 1710, the SSAF entity 116 performs processing and analysis of the test data obtained during the testing of the primary SAS service provider system 1 118 in steps 1704 and 1708 and any further SAS service testing performed via the OSS/Domain Proxy 114 to determine which SAS service functions of the SAS service provider system 1 118 are operational and reliable (e.g., SAS services are successfully being performed X % of times requested where X is a value equal to or above the expected success threshold indicating reliability (for example an amount within the guaranteed range of the primary SAS service provider system 1 118). When the SSAF entity 116 determines that the primary SAS service provider system 1 118 is not providing reliable service, the SAS service testing in steps 1704 and 1708 continues with the additional test data being processed and analyzed until the SSAF entity 116 determines that the primary SAS service provider system 1 118 is providing reliable SAS service functionality and the issues and/or problems previously experienced have been resolved. When the SSAF entity 116 determines based on the SAS service test data that the primary SAS service provider system 1 118 SAS service functions are available and reliable, operation proceeds from step 1710 to step 1712.

In step 1712, SSAF entity 116 generates message 1716. The message 1716 includes information notifying the OSS/Domain Proxy 114 that the CBSDs of the system 100 will be moved and/or migrated back to the primary SAS service provider system 1 118 from the backup SAS service provider system 2 120. In some embodiments, the message 1716 further includes information notifying the OSS/Domain Proxy 114 which SAS services of the primary SAS service provider system 1 118 have been restored and which have not when not all SAS services have been restored and/or are reliable (e.g., CBSD registration service not restored but all other SAS services restored). In some embodiments, the message 1716 also requests that the OSS/Domain Proxy 114 provide a list of the active CBSDs of system 100 whose services are being provided by the backup SAS service provider system 2 120. Operation proceeds from step 1712 to step 1714.

In step 1714, the SSAF entity 116 sends the message 1716 to the OSS/Domain Proxy 114. Operation proceeds from step 1714 to step 1718.

In step 1718, the OSS/Domain Proxy 114 receives and processes the message 1716. In processing the message 1716, the OSS/Domain Proxy 114 determines the active CBSDs of system 100 which are receiving SAS services from the backup SAS service provider system 2 120. Operation proceeds from step 1718 to step 1720 shown on FIG. 10D.

In step 1720, the OSS/Domain Proxy 114 generates message 1722 and sends it to the SSAF entity 116. The message 1722 includes a list of active CBSDs of the system 100 which are receiving SAS services from the backup SAS service provider 2 120. In some embodiments, the message 1722 includes registration information (e.g., registration objects for each of the active CBSDs being serviced by the backup SAS service provider system 2 120 and/or state information indicating the current state of the CBSD). In step 1720, the OSS/Domain Proxy 114 also ceases sending SAS service requests to the backup SAS service provider system 2 120 on behalf of the identified active CBSD included in message 1722. Operation proceeds from step 1720 to 1724.

In step 1724, the SSAF entity 116 receives and processes the message 1722. Operation proceeds from step 1724 to step 1726.

In step 1726, the SSAF entity 116 generates and sends message 1728 to the backup SAS service provider system 2 120. The message 1728 includes an instruction to enter the dormancy state with respect to providing SAS services to CBSDs identified in the message. The message 1728 includes the list of active CBSDs with their CBSD IDs being serviced by the backup SAS service provider system 2 120 which are to be moved and/or migrated to the primary SAS service provider system 1 118. In some embodiments, the message 1728 includes the registration information (e.g., registration object) for each of the active CBSDs and/or state information for each of the active CBSDs to be moved and/or migrated). Operation proceeds from step 1726 to step 1730.

In step 1730, the backup SAS service provider system 2120 receives and processes the message 1728. In response to receiving the message 1728, the backup SAS service provider system 2 120 enters the dormancy state with respect to the identified CBSDs and sends a confirmation message to the SSAF entity 116 that it has entered the dormancy state with respect to the CBSDs listed in message 1728. In the dormancy state, the backup SAS service provider system 2 120 ceases to provide SAS services to the identified CBSDs and does not send requests to the SAS 122 on behalf of the identified CBSDs for which it is in a dormancy state. Operation proceeds from step 1730 to step 1732.

In step 1732 in response to receiving the confirmation that the backup SAS service provider system 2 120 has entered the dormancy state with respect to the CBSDs identified in message 1729, the SSAF entity 116 generates message 1736.

Message 1736 includes information identifying the active CBSDs whose SAS services are to be moved and/or migrated and/or switched back from the backup SAS service provider system 2 120 to the primary SAS service provider system 1 118. The message 1736 in some embodiments includes CBSD Id information for each of the active CBSDs and/or registration information (e.g., CBSD registration object) for each of the CBSDs and/or state information for each of the CBSDs. Operation proceeds from step 1734 to step 1738.

In step 1738, the primary SAS service provider system 1 118 receives and processes message 1736. Operation proceeds from step 1738 to step 1740.

In step 1740, the primary SAS service provider system 1 118 determines based on the information included message 1738 (e.g., CBSD identification information, CBSD registration information (e.g., CBSD registration object), and/or CBSD state information) which of the CBSDs to be moved, migrated and/or switched back to the primary SAS service provider system 1 118 are CBSDs for which the primary SAS service provider system 1 118 is in a dormant state and which are not. The ones for which it is not in a dormant state are new active CBSDs. Operation proceeds from step 1740 to step 1742.

In step 1742, the primary SAS service provider system 1 118 generates and sends message 1744 to the SAS 122. The message 1744 includes information identifying the CBSDs for which the primary SAS service provider system 1 118 is taking over providing SAS services to the CBSDs from the backup SAS service provider system 2 120. In some embodiments, the message 1744 is a re-registration message in which the identified CBSDs are re-registered with the SAS 122 as being supported and provided SAS services from the primary SAS service provider system 1 118. In some such embodiments, the message 1744 includes registration information (e.g., a registration object) for each of the CBSDs being re-registered. In some embodiments message 1744 is a set of message exchanges in which the primary SAS service provider system 1 118 first obtains the status of each of the CBSDs identified and then re-registers or migrates the CBSDs to primary SAS service provider system 1 118 in batches. Operation proceeds from step 1742 to step 1746.

In step 1746, the SAS 122 receives and processes the message 1744. The SAS 122 updates its memory and/or a database connected and/or coupled to the SAS 122 to indicate that the CBSDs identified in the message 1744 are now being provided SAS services from the primary SAS service provider system 1 118. This may and in some embodiments does, include re-registering the identified CBSDs using registration information provided by the CBSDs and/or updating the state information and/or records for the CBSDs at the SAS 122 or controlled by the SAS 122 to indicate the change from the backup SAS service provider system 2 120 to the primary SAS service provider system 1 118 as being provided SAS service provider managing the SAS service requests and interactions with the SAS 122. In some embodiments, the take over is done in batches with multiple messages being received listing CBSDs to be migrated until all of the active CBSDs identified in message 1736 have been migrated. Operation proceeds from step 1746 to step 1748.

In step 1748, the SAS 122 generates and sends and acknowledgement (ACK) message 1750 to the primary SAS service provider system 1 118. The message 1750 includes information indicating the CBSDs identified in message 1744 that have been moved, migrated and/or switched over from backup SAS service provider system 2 120 to the primary SAS service provider system 1 118 at the SAS 122 so that SAS 122 only accepts SAS services requests form these CBSDs from the primary SAS service provider system 1 118. If there was a re-registration of a CBSD as part of the process new and/or changed registration for the CBSD is also included in the message 1750. In some embodiments, the message 1750 may include an indication of CBSDs which were identified to be migrated which were not migrated and a reason for the failure of the migration. Operation proceeds from step 1748 to step 1752.

In step 1752, the message 1750 is received and processed by the primary SAS service provider system 1 118. Operation proceeds from step 1752 to step 1754.

In step 1754, the primary SAS service provider system 1 118 generates and sends message 1756 to the SSAF entity 116 in response to message 1736. Message 1756 includes information confirming the move, migration and/or switchover of the SAS service provider from the backup SAS service provider system 2 120 to the primary SAS service provider system 1 118 has been completed for each of the CBSDS identified in message 1736. In some embodiments, the message 1756 includes new and/or additional registration information for the CBSDs if such information was included in message 1750. In some embodiments, the message 1756 may include an indication of CBSDs which were identified to be migrated which were not migrated and a reason for the failure of the migration. Operation proceeds from step 1754 to step 1758.

In step 1758, the SSAF entity 116 receives and processes the message 1756. Operation proceeds from step 1758 to steps 1760 and 1772.

In step 1760, the SSAF entity 116 generates and sends message 1762 to the OSS/Domain Proxy 114. the message 1762 includes information notifying the OSS/Domain Proxy 114 of the completion of the move, migration and/or switchover of the SAS service provider for the CBSDs of system 1 to the primary SAS service provider system 1 118 from the backup SAS service provider system 2 120. The message 1762 also in some embodiments provides identifying information for the CBSDs which were moved, migrated and/or switched such as for example, CBSD Id information and/or any new and/or updated registration information for the CBSD. The message 1762 in some embodiments also provides identification information for CBSDs for which a move, migration and/or switchover was requested but was not completed and the reason for the failure to complete the move, migration, and/or switchover. Operation proceeds from step 1760 to step 1764.

In step 1764, the OSS/Domain Proxy 114 receives and processes the message 1762. Processing the message 1762 including updating it records to indicate that the primary SAS service provider system 1 118 is now the SAS service provider system to utilize for SAS service requests for the CBSDs identified as being moved, migrated and/or switched over to the primary SAS service provider system 1 118. This may include updating addressing and interface information for communicating SAS service requests for these CBSDs to the primary SAS service provider system 1 118. In addition, the OSS/Domain Proxy 114 will also update its records with respect to any new or additional CBSD registration information provided in message 1762. Operation proceeds from step 1764 to steps 1766 and 1770.

In steps 1766 and 1770, messages 1768 are generated and exchanged by the OSS/Domain Proxy 114 and the primary SAS service provider 1 118 used for requesting and providing SAS services for the CBSDs which moved, migrated, and/or switched from the backup SAS service provider system 2 120 to the primary SAS service provider system 1 118.

In step 1772, SSAF entity 116 generates and sends message 1774 to the backup SAS service provider system 2 120. The message 1774 includes information identifying the CBSDs which have been successfully moved, migrated, and/or switched to the primary SAS service provider system 1 120 and indicates that the backup SAS service provider system 2 120 is no longer to provide any services for these CBSDs and does not need to keep them in a dormant state. All costs associated with SAS services provided by the backup SAS service provider system 2 120 for these CBSDs will now end. In some embodiments, if not all the CBSDs could be successfully moved, migrated and/or switched back to the primary SAS service provider system 1 118, the message 1774 may indicate that these CBSDs should be removed from the dormant state and the backup SAS service provider system 2 120 should commence providing SAS services. Operation proceeds from step 1772 to step 1776.

In step 1776, the backup SAS service provider system 2 120 receives and processes the message 1774. In processing the message 1774, the backup SAS service provider system 2 120 removes the CBSDs identified in the message 1774 for which it is to have any services from the dormant state to an inactive state for providing SAS services and/or removes their information from the backup SAS service provider system 2 120 and ceases charging for any SAS services provided for these CBSDs. In some embodiments, the message 1774 may indicate that certain CBSDs should be removed from the dormant state and the backup SAS service provider system 2 120 should commence providing SAS services for these CBSDs. These CBSDs are ones that were not successfully moved, migrated, and/or switched to the primary SAS service provider system 1 118. In such a scenario, the OSS/Domain Proxy 114 will continue to utilize the SAS services of the backup SAS service provider system 2 120 for these CBSDs. The SSAF entity 116 will re-attempt to move, migrate and/or switch these CBSDs back to the primary SAS service provider system 1 118 until successful. Operation proceeds from step 1776 to step 1749 where the method continues as previously described with the OSS/Domain Proxy 114 collecting information and providing it to the SSAF 116 which continues to perform testing of the primary SAS service provider system 1 118 using dummy CBSD test messages.

It is to be understood that various steps of the method may be, and in some embodiments are, implemented using sub-steps and/or broken up into separate steps such as for example, a step which generates and sends a message may be, and in some embodiments is implemented as two steps including a first step of generating the message and a second step of sending the message. Additionally, it is to be understood that various messages and/or the information included in them may be, and in some embodiments are, included in multiple messages.

In some embodiments, the SSAF entity 116 testing of the SAS service provider system 1 118 and/or SAS service provider system 2 120 is implemented using the test messaging illustrated and described in connection with the state diagram 300 and/or the signaling diagram/method 1400.

In some embodiments, whether or not a SAS service provider system is experiencing problems and/or issues providing SAS services is determined by comparing SAS service requests successfully fulfilled within a given period of time to a reliability threshold value. When the success rate is equal to or above the threshold value the SAS service provider system is determined to be reliably providing the SAS requested service or services. When the success rate is below the threshold value the SAS service provider system is determined to not be reliably providing the SAS requested service or services.

In some embodiments, whether or not a SAS service provider system is experiencing problems and/or issues providing SAS services is determined by comparing SAS service requests not successfully fulfilled (i.e., SAS service failure) within a given period of time to a reliability threshold value. When the failure rate is equal to or above the threshold value the SAS service provider system is determined to not be reliably providing the SAS requested service or services. When the failure rate is below the threshold value the SAS service provider system is determined to be reliably providing the SAS requested service or services.

FIG. 12 illustrates an exemplary table 1200 used for storing information for dummy CBSDs. In the exemplary system 100, the table 1200 is included in the database 156 but may be, and in some embodiments is, included in memory or a storage in one or more of the other components of the wireless network 100 such as for example in a storage device or memory of the SSAF 116 element of system 100. Table 1200 includes columns 1202, 1204, 1206, and 1208 and rows 1210, 1212, 1214, 1216, 1218, 1220, 1222, 1224, . . . , 1226. The entries in row 1210 are labels indicating the information contained in each column. Entries in column 1202 are the dummy CBSD Identifiers (IDs) (row 1210, entry 1202) and identify a particular dummy CBSD created by the SSAF 116 for testing a SAS service provider system (e.g., SAS service provider system 1 118 and/or SAS service provider system 2 120). Entries in column 1102 are identifiers corresponding to the dummy CBSD to which the information in the entries in the same row as the identifier correspond. Entries in column 1204 include dummy CBSD registration and simulation information for the dummy CBSD ID in the same row as the entry. Entries in column 1206 include dummy CBSD state information for the dummy CBSD ID in the same row as the entry. The entries in row 1208 include test information for the dummy CBSD ID in the same row as the entry. The entries in row 1212 correspond to dummy CBSD 1. The entries in row 1214 correspond to dummy CBSD 2. The entries in row 1216 correspond to dummy CBSD 3. The entries in row 1218 correspond to dummy CBSD 4. The entries in row 1220 correspond to dummy CBSD 5. The entries in row 1222 correspond to dummy CBSD 6. The entries in row 1224 correspond to dummy CBSD 7. The " . . . ." row and entries in that row represent additional dummy CBSDs used for testing the SAS services of a SAS service provider system. The entries in row 1226 correspond to dummy CBSD N, N being a positive integer greater than 7.

The entries in row 1212 are for the dummy CBSD 1 (entry row 1212, column 1202) and include dummy CBSD 1 registration and simulation information (entry row 1212, column 1204), dummy CBSD 1 state information which includes that dummy CBSD 1 is in a registration service via OSS/Domain Proxy test state (entry row 1212, column 1206) and the dummy CBSD test information corresponding to the dummy CBSD 1 is that the registration test via OSS/Domain Proxy has failed (entry row 1212, column 1208). In various embodiments, the dummy CBSD test information may also include additional information such as for example, the number of times a request to register the dummy CBSD 1 via the OSS/Domain Proxy with the SAS service provider system has failed and/or the type of failure (e.g., a failure response message being received or a registration response timer indicating no response was received in a predetermined amount of time).

The entries in row 1214 are for the dummy CBSD 2 (entry row 1214, column 1202) and include dummy CBSD 2 registration and simulation information (entry row 1214, column 1204), dummy CBSD 2 state information which includes that dummy CBSD 2 is in a direct registration service test state (i.e., the SSAF with respect to CBSD 2 is emulating a CBSD which is directly registering with the SAS service provider system without utilizing an OSS/Domain Proxy) (entry row 1214, column 1206) and the dummy CBSD test information corresponding to the dummy CBSD 2 is that the direct registration test has failed (entry row 1214, column 1208). In various embodiments, the dummy CBSD test information may also include additional information such as for example, the number of times a request to register the dummy CBSD 2 directly with the SAS service provider system has failed and/or the type of failure (e.g., a failure response message being received or a registration response timer indicating no response was received in a predetermined amount of time).

The entries in row 1216 are for the dummy CBSD 3 (entry row 1216, column 1102) and include dummy CBSD 3 registration and simulation information (entry row 1216, column 1204), dummy CBSD 3 state information which includes that dummy CBSD 3 is in a heartbeat test state (i.e., the SSAF is sending heartbeat request messages to the SAS service provider system as dummy CBSD 3) (entry row 1216, column 1206) and the dummy CBSD test information corresponding to the dummy CBSD 3 is that the heartbeat test has been successful (entry row 1216, column 1208). In various embodiments, the dummy CBSD test information may also include additional information such as for example, the number of times a heartbeat request message was sent to the SAS service provider system on behalf of the dummy CBSD has failed and/or the type of failure (e.g., a failure response message being received or a heartbeat response timer indicating no response was received in a predetermined amount of time). The dummy CBSD simulation information stored in entry row 1216, column 104) may, and typical does include, the information received in a successful heartbeat request response received from the SAS service provider system in response to a heartbeat request.

The entries in row 1218 are for the dummy CBSD 4 (entry row 1218, column 1102) and include dummy CBSD 4 registration and simulation information (entry row 1218, column 1204), dummy CBSD 4 state information which includes that dummy CBSD 4 is in a spectrum grant test state (entry row 1218, column 1206) and the dummy CBSD test information corresponding to the dummy CBSD 4 is that the spectrum grant test has been successful (entry row 1218, column 1208). In various embodiments, the dummy CBSD test information may also include additional information such as for example, the number of times a spectrum grant request message was sent to the SAS service provider system on behalf of the dummy CBSD has failed and/or the type of failure (e.g., a failure response message being received or a grant response timer indicating no response was received in a predetermined amount of time). The dummy CBSD simulation information stored in entry row 1218, column 1204 may, and typical does include, the information received in a successful grant request response received from the SAS service provider system in response to a spectrum grant request.

The entries in row 1220 are for the dummy CBSD 5 (entry row 1220, column 1202) and include dummy CBSD 5 registration and simulation information (entry row 1220, column 1204), dummy CBSD 5 state information which includes that dummy CBSD 5 is in an authorization test state (i.e., dummy CBSD 5 is performing an authorization or re-authorization operation to obtain authorization to transmit and/or communicate using spectrum granted to it by the SAS) (entry row 1220, column 1206) and the dummy CBSD test information corresponding to the dummy CBSD 5 is that the spectrum authorization test has been successful (entry row 1220, column 1208). In various embodiments, the dummy CBSD test information may also include additional information such as for example, the number of times a spectrum authorization or re-authorization request message was sent to the SAS service provider system on behalf of the dummy CBSD has failed and/or the type of failure (e.g., a failure response message being received or a authorization response timer indicating no response was received in a predetermined amount of time). The dummy CBSD simulation information stored in entry row 1220, column 1204 may, and typical does include, the information received in a successful authorization request response received from the SAS service provider system in response to a spectrum authorization request.

The entries in row 1222 are for the dummy CBSD 6 (entry row 1222, column 1202) and include dummy CBSD 6 registration and simulation information (entry row 1222, column 1204), dummy CBSD 6 state information which includes that dummy CBSD 6 is in a relinquishment test state (i.e., dummy CBSD 6 is attempting to relinquish use of spectrum granted to it by the SAS) (entry row 1222, column 1206) and the dummy CBSD test information corresponding to the dummy CBSD 6 is that the spectrum relinquishment test has been successful (entry row 1222, column 1208). In various embodiments, the dummy CBSD test information may also include additional information such as for example, the number of times a spectrum relinquishment request message was sent to the SAS service provider system on behalf of the dummy CBSD has failed and/or the type of failure (e.g., a failure response message being received or a relinquishment response timer indicating no response was received in a predetermined amount of time). The dummy CBSD simulation information stored in entry row 1222, column 1204 may, and typical does include, the information received in a successful relinquishment request response received from the SAS service provider system in response to a spectrum relinquishment request.

The entries in row 1224 are for the dummy CBSD 7 (entry row 1224, column 1202) and include dummy CBSD 7 registration and simulation information (entry row 1224, column 1204), dummy CBSD 7 state information which includes that dummy CBSD 7 is in a spectrum inquiry test state (i.e., dummy CBSD 7 is performing a spectrum inquiry operation in which the SSAF sends a spectrum inquiry request to the SAS service provider system as the dummy CBSD 7) (entry row 1224, column 1206) and the dummy CBSD test information corresponding to the dummy CBSD 7 is that the spectrum inquiry test has been successful (entry row 1224, column 1208). In various embodiments, the dummy CBSD test information may also include additional information such as for example, the number of times a spectrum inquiry request message was sent to the SAS service provider system on behalf of the dummy CBSD has failed and/or the type of failure (e.g., a failure response message being received or a spectrum inquiry response timer indicating no response was received in a predetermined amount of time). The dummy CBSD simulation information stored in entry row 1224, column 1204 may, and typical does include, the information received in a successful spectrum inquiry request response received from the SAS service provider system in response to a spectrum inquiry request.

The entries in row 1226 are for the dummy CBSD N (entry row 1226, column 1202) and include dummy CBSD N registration and simulation information (entry row 1226, column 1204), dummy CBSD N state information which is the current state of the dummy CBSD N, e.g., an unregistered state or one of the other CBSD states) (entry row 1226, column 1206) and the dummy CBSD test information corresponding to the dummy CBSD N (entry row 1226, column 1208) which may be in some embodiments no test information is available if the CBSD N has just been created an is an unregistered state).

Each of the dummy CBSD test states illustrated in the table 1200 of FIG. 12 corresponds to a SAS service test which is performed by the SSAF entity emulating a dummy CBSD to determine whether the SAS service provider system is experiencing problems with providing the SAS service under test. The dummy CBSD registration information includes registration information created by the SSAF (e.g., dummy CBSD registration object information described above) and used by the SSAF when it is emulating the dummy CBSD. The dummy CBSD test states also correspond to the CBSD states illustrated in state diagram 300 and discussed above. The dummy simulation information allows the SSAF entity to emulate or simulate a CBSD when it communicates with a SAS service provider system. The SSAF may either communicate with the SAS service provider system directly in which it emulates and/or simulates a CBSD which is directly communicating with the SAS service provider or it may communicate with the SAS service provider system via an OSS/Domain Proxy in which it emulates and/or simulates a CBSD communicating with the SAS service provider via an OSS/Domain Proxy.

The use of multiple dummy CBSDs concurrently in different dummy CBSD testing states allows the SSAF to determine which SAS services of a SAS service provider system are experiencing problems at a particular time. For example, if an SAS service provider system's SAS registration service is not allowing the registration of CBSDs but its other SAS services are still functioning according to testing results, then the SSAF may not take any actions with respect to currently registered CBSDs but will take actions to have CBSDs which are to be registered utilized a secondary or backup SAS service provider system for SAS registration services. If multiple dummy CBSDs are not being used to concurrently test the SAS service provider system's SAS services, then a single SAS service failure such as a SAS registration failure can block the SSAF from determining what other SAS services are not currently functioning or are experiencing problems.

Figure 11:
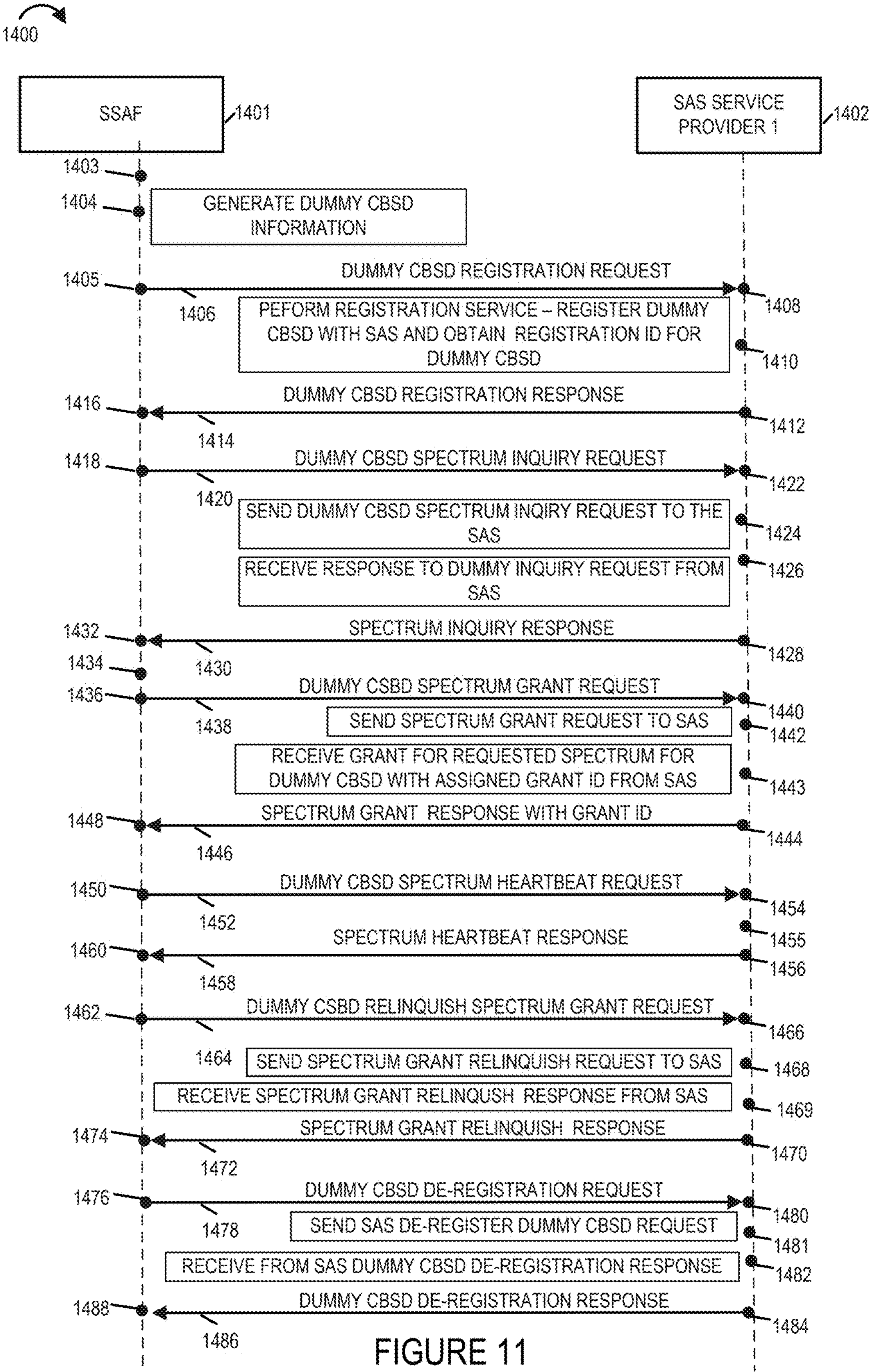
FIG. 11 illustrates a signaling diagram which shows the signaling and steps of an exemplary method used for determining problems with SAS services being provided by an SAS service provider system in accordance with an embodiment of the present invention.

FIG. 11 illustrates an exemplary signaling diagram/method 1400 for testing an SAS service provider system. Signaling diagram/method 1400 illustrates the steps and signaling between Spectrum Access System Switch and Availability Function (SSAF) entity 1401 and SAS Service Provider System 1 1402 which are used for testing the SAS service provider system 1 1402. The signaling messages exchanged between the SSAF 1401 and SAS service provider system 1 1402 are used by the SSAF 1401 to identify SAS services offered by the SAS service provider 1 1402 which are experiencing problems. The SAS services include for example, SAS registration services, spectrum inquiry services, spectrum grant request services, heartbeat services, spectrum grant authorization services, and spectrum grant relinquishment services. In various embodiments, the SSAF 1401 is able to determine which of the one or more SAS services of the SAS service provider system 1 1402 is experiencing problems based on the SAS service provider system 1 1402 responses or failure to respond within a pre-determined time period to service request messages sent by the SSAF 1401 to the SAS service provider system 1 1402 on behalf of a dummy CBSD (e.g., a fictious CBSD). In some embodiments, one or more of the signals illustrated in signaling diagram/method 1400 pass through an OSS/Domain Proxy situated on a signaling path between the SSAF 1401 and the SAS service provider system 1 1402.

The signaling/method 1400 may be, and in some embodiments is utilized and employed by system 100, system 200, and/or SSAF 116. In some embodiments, the SSAF 1401 is SSAF 116 of system 100 or system 200 and SAS Service Provider 1 1402 is SAS service provider 1 118 of system 100 or system 200. While it will be readily understood that additional steps and signaling are performed in connection with communicating information, messages, and packets between devices, the method 1400 focuses on and discusses the steps and signaling for understanding the invention. Elements or steps with the same reference numbers used in different figures are the same or similar and those elements or steps will not be described in detail again.

The method 1400 begins in start step 1403. Operation proceeds from start step 1403 to step 1404. In step 1404, the SSAF 1401 generates dummy CBSD information (e.g., information for registering a dummy CBSD with an SAS such as for example dummy CBSD registration object information) for a dummy CBSD to be used in testing the SAS services of the SAS service provider system 1 1402. The generated dummy CBSD information is stored in memory or a storage device, such as for example a database system (e.g., dummy CBSD database 156 of system 100 or system 200). Operation proceeds from step 1404 to step 1405.

In step 1405, the SSAF 1401 initiates a SAS registration service test. In step 1405, the SSAF 1401 generates and transmits registration request 1406 to the SAS service provider system 1 1402. The registration request 1406 includes information for registering a dummy CBSD with an FCC SAS system (e.g., SAS 122) utilizing the SAS registration services of the SAS service provider system 1 1402. In some embodiments, the information including in the registration request 1406 includes at least some of the dummy CBSD information generated by the SSAF 1401 in step 1404. In some embodiments, the registration request message 1406 includes a CBSD registration object including information for registering the dummy CBSD. The dummy CBSD is a fictious non-existent CBSD which will appear to the SAS service provider system 1 1402 as an actual CBSD requesting to be registered. Operation proceeds from step 1405 to step 1408.

In step 1408, the SAS service provider system 1 1402 receives the dummy CBSD registration request 1406. Operation proceeds from step 1408 to step 1410. In step 1410, the SAS service provider system 1 1402 performs the requested registration service and attempts to register the dummy CBSD with a Spectrum Access System (e.g., the SAS 122 of system 100 or 200) using information included in the dummy CBSD registration request 1406. When the registration with the SAS is successful, the SAS service provider system 1 obtains a registration ID for the dummy CBSD from the SAS. If the attempt to register the dummy CBSD with the SAS is unsuccessful, the SAS service provider system 1 either receives a failure response from the SAS or no response within given time period. In this example, the dummy CBSD registration is successful. Once the registration attempt is completed, operation proceeds from step 1410 to step 1412.

In step 1412, the SAS service provider system 1 1402 generates and communicates a registration response message 1414 to the SSAF 1401 indicating that the dummy CBSD has been successfully registered with the SAS and providing the registration ID for the dummy CBSD. The dummy CBSD includes the registration ID in future messages sent to the SAS service provider system 1 1402. When the registration of the dummy CBSD fails, the SAS service provider system 1 1402 sends a registration response message indicating a failure of the dummy CBSD registration attempt. Operation proceeds from step 1412 to step 1416.

In step 1416, the SSAF 1401 receives and processes the response message 1414 determining the dummy CBSD has been successfully registered. The SSAF 1401 stores the dummy CBSD registration ID for future use (e.g., to be included in future messages sent to the SAS service provider system 1 1402. In some embodiments, the dummy CBSD registration ID is stored with the dummy CBSD registration information generated by the SSAF 1401 in step 1404. In response to the successfully registration of the dummy CBSD, the SSAF 1401 makes the determination that the SAS service provider system 1 registration service is operational. The SSAF 1401 will also update the state of the dummy CBSD from unregistered to registered in a state machine by storing the updated dummy CBSD state (e.g., in memory or a database system (e.g., dummy CBSD database 156 of system 100 or 200)) with other information for this dummy CBSD. FIG. 3 illustrates a state machine for a dummy CBSD which is used by an SSAF 1401 in testing the SAS services of an SAS service provider system. In response to a successful dummy CBSD registration, operation proceeds from step 1416 to step 1418. However, if the response message 1414 indicates a failure of the registration or if no response message 1414 is received within a predetermined time period (response message expiration timer timeout), the dummy CBSD registration attempt is determined by the SSAF 1401 to have failed. The failure of the dummy CBSD registration attempt is recorded and stored for future reference. In such cases, operation proceeds from step 1416 back to step 1405 wherein the method continues as previously described. After a predetermined threshold number of dummy CBSD registration attempt failures, the SAS service provider system 1 1402 CBSD SAS registration service is determined to not be operational. The dummy CBSD's state remains unregistered and the SSAF 1401 updates its test data to indicate the SAS registration failure, the number of failed attempts, and the reason for the failure (e.g., either response indicates a failure or due to lack of response within a predetermined time period.). When there have been one or more failures before a successful dummy CBSD registration this test data is also stored. If the number of failures before a successful dummy CBSD registration has occurred is above a registration reliability failure threshold value, the SAS service provider system 1 1402 SAS registration service is determined to be operational but unreliable.

Operation proceeds from step 1416 to step 1418 once the registration has been successful completed.

In step 1418, the SSAF 1401 initiates a SAS spectrum inquiry service test. In step 1418, the SSAF 1401 generates and communicates a dummy CBSD spectrum inquiry request message 1420 to the SAS service provider system 1 1402. The spectrum inquiry request message 1420 includes the registration ID for the dummy CBSD as well as a request for information on available spectrum. The location of the dummy CBSD is either provided in the registration information when the dummy CBSD was registered or in the spectrum inquiry. In some embodiments, the spectrum inquiry request message 1420 identifies the type of spectrum (licensed (e.g., PAL) spectrum and/or unlicensed spectrum (GAA spectrum). In some embodiments, the spectrum inquiry request message 1420 also includes an amount of spectrum (e.g., number of channels and channel width and/or bandwidth). Operation proceeds from step 1418 to step 1422.

In step 1422, the SAS service provider system 1 1402 receives and processes the dummy CBSD spectrum inquiry request 1420. Operation proceeds from step 1422 to step 1424.

In step 1424, the SAS service provider system 1 1402 generates and sends a spectrum inquiry request to the SAS. In some embodiments, this spectrum inquiry request is a copy of the request 1420 while in others it includes the spectrum inquiry request information included in the request 1420. The SAS upon receiving the dummy CBSD spectrum inquiry request performs a channel availability assessment based on the location of the registered dummy CBSD and identifies the best available spectrum channels (i.e., spectrum channels with least amount of interference meeting the criteria (e.g., number of channels, spectrum type, spectrum amount) included in the spectrum inquiry) for the dummy CBSD. Once the best available channels have been identified, the SAS sends a spectrum inquiry response to the SAS service provider system 1 1402 including information identifying the best available channels. The spectrum inquiry response also may, and some times does, include information about the available spectrum channels and/or channels in use in the area (e.g., heat map of spectrum usage in the location of the dummy CBSD). Operation proceeds from step 1424 to step 1426. In step 1426, the SAS service provider system 1 1402 receives from the SAS spectrum inquiry response message which includes information identifying the best available spectrum channels for the dummy CBSD. Operation proceeds from step 1426 to step 1428.

In step 1428, the SAS service provider system 1 1402 generates and communicates a spectrum inquiry response message 1430 to SSAF 1401. The spectrum inquiry response message 1430 includes the identified available spectrum channels and/or the best available spectrum channels. In some embodiments, the spectrum inquiry response also includes information about the available spectrum channels and/or channels in use in the area (e.g., heat map of spectrum usage in the location of the dummy CBSD). In some embodiments, the spectrum inquiry response message 1430 is a forwarded copy of the spectrum inquiry response message received by the SAS service provider system 1 1402 from the SAS. Operation proceeds from step 1428 to step 1432.

In step 1432, the SSAF 1401 receives and processes the spectrum inquiry response message 1430 including determining whether the SAS spectrum inquiry request service has been successful completed for the dummy CBSD spectrum inquiry request test. The SSAF 1401 stores the dummy CBSD spectrum inquiry response information included in the spectrum inquiry response message 1430 for future use (e.g., to be used in a spectrum grant request). In some embodiments, the spectrum inquiry request response information is stored with the dummy CBSD registration information generated by the SSAF 1401 in step 1404. In response to the successfully receipt of the spectrum inquiry response message 1430 which includes the requested information, the SSAF 1401 makes the determination that the SAS service provider system 1 spectrum inquiry service is operational. The SSAF 1401 will also update the state of the dummy CBSD in a state machine by storing the updated dummy CBSD state (e.g., in memory or a database system (e.g., dummy CBSD database 156 of system 100 or 200)) with other information for this dummy CBSD. FIG. 3 illustrates a state diagram for a dummy CBSD which is used by an SSAF 1401 in testing the SAS services of an SAS service provider system. In response to a successful dummy CBSD spectrum inquiry response, operation proceeds from step 1432 to step 1434. However, if the response message 1430 indicates a failure of the spectrum inquiry request or if no response message 1430 is received within a predetermined time period (response message expiration timer timeout), the dummy CBSD spectrum inquiry request attempt is determined by the SSAF 1401 to have failed. The failure of the dummy CBSD spectrum inquiry request attempt is recorded and stored for future reference. In such cases, operation proceeds from step 1432 back to step 1418 wherein the method continues as previously described. After a predetermined threshold number of dummy CBSD spectrum inquiry request attempt failures, the SAS service provider system 1 1402 CBSD SAS spectrum inquiry service is determined to not be operational. The dummy CBSD's state remains registers and the SSAF 1401 updates its test data to indicate the SAS spectrum inquiry service failure, the number of failed attempts, and the reason for the failure (e.g., either response indicates a failure or due to lack of response within a predetermined time period.). When there have been one or more failures before a successful dummy CBSD spectrum inquiry request response is received, this test data is also stored. If the number of failures before a successful dummy CBSD spectrum inquiry request response message has occurred is above a spectrum inquiry service reliability failure threshold value, the SAS service provider system 1 1402 SAS spectrum inquiry service is determined to be operational but unreliable.

In step 1434, the SSAF 1401 initiates a SAS spectrum grant service test. The SSAF 1401 first determines which spectrum channels of the identified available spectrum channels in the spectrum inquiry response message 1430 to request be granted for use by the dummy CBSD. The determination may be, and in some embodiments is, based on the type of spectrum (e.g., licensed and/or unlicensed), quality of spectrum (amount of interference) and amount of spectrum. In some embodiments, the spectrum grant request may include different variations of these factors to test the different types of spectrum grant request features. The spectrum grant request typically includes a grant size from 5 MHZ to 150 MHz in a multiple of 5 MHz. Operation proceeds from step 1434 to step 1436. In step 1436, the SSAF 1401 generates and communicates dummy CBSD spectrum grant request message 1438 to the SAS service provider system 1 1402. The dummy CBSD spectrum grant request message includes the registration ID of the dummy CBSD and includes a request for a spectrum grant identifying the spectrum channels determined in step 1434. Operation proceeds from step 1436 to step 1440. In step 1440, the SAS service provider 1 1402 receives the spectrum grant request message 1438 from the SSAF 1401. Operation proceeds from step 1440 to step 1442. In step 1442, the SAS service provider system 1 1402 generates and sends a spectrum grant request message to the SAS on behalf of the dummy CBSD. The spectrum grant request message sent to the SAS includes information from the dummy CBSD spectrum grant request message 1438 including the information identifying the dummy CBSD and the spectrum being requested. In some embodiments, the spectrum grant message sent to the SAS is a forwarded copy of the dummy CBSD spectrum grant request 1438 and/or the grant request information included in it. The SAS upon receiving the spectrum grant request determines if the requested spectrum is available and when it is available grants the requested spectrum to the dummy CBSD (e.g., by allocating the granted spectrum channels to the dummy CBSD registration ID and indicating that these allocated spectrum channels are now assigned to the dummy CBSD). The grant response may, and typically does, include a grant expiry interval, channel type and other parameters. The SAS assigns a grant ID to the spectrum grant for tracking purposes. In this example, the requested spectrum channels are available and are granted to the dummy CBSD by the SAS. The SAS then generates and communicates the spectrum grant response message to the SAS service provider system 1 1402 which receives it step 1443. Operation proceeds from step 1443 to step 1444.

In step 1444, the SAS service provider system 1 1402 generates spectrum grant response with grant ID message 1446 and communicates it to the SSAF 1401. The spectrum grant response message 1446 indicates that the spectrum channels requested have been granted to the dummy CBSD, provides the grant ID corresponding to the spectrum grant, and grant expiry interval. Operation proceeds from step 1444 to step 1448.

In step 1448, the SSAF 1401 receives and processes the spectrum grant response message 1446 determining that the spectrum channels have been successfully obtained (i.e., via a spectrum grant from the SAS) for use by the dummy CBSD. The SSAF 1401 stores the information from the spectrum grant request message 1446 for future use (e.g., in a dummy database with the dummy CBSD registration information). This information includes for example, the spectrum grant ID, spectrum channels granted, transmission power level if provided, grant expiry interval). The SSAF 1401 will also update the state of the dummy CBSD in a state machine by storing the updated dummy CBSD state (e.g., in memory or a database system (e.g., dummy CBSD database 156 of system 100 or 200)) with other information for this dummy CBSD. FIG. 3 illustrates a state diagram for a dummy CBSD which is used by an SSAF 1401 in testing the SAS services of an SAS service provider system. The state of the dummy CBSD is changed to spectrum granted state. The SSAF 1401 also determines that the SAS spectrum grant request service of SAS service provider system 1 1402 is operational. When the spectrum grant response is determined to have been successfully (i.e., requested spectrum has been granted to the dummy CBSD), operation proceeds from step 1448 to step 1450. However, if the response message 1446 indicates a failure of the spectrum grant request or if no response message 1446 is received by the SSAF 1401 within a predetermined time period (response message expiration timer timeout), the dummy CBSD spectrum grant request attempt is determined by the SSAF 1401 to have failed. The failure of the dummy CBSD spectrum grant request attempt is recorded and stored for future reference. In such cases, operation proceeds from step 1446 back to step 1436 wherein the method continues as previously described or in some embodiments to step 1418 to identify what spectrum is still available. After a predetermined threshold number of dummy CBSD spectrum grant request attempt failures, the SAS service provider system 1 1402 CBSD SAS spectrum grant service is determined to not be operational. The dummy CBSD's state remains registered and the SSAF 1401 updates its test data to indicate the SAS spectrum grant service failure, the number of failed attempts, and the reason for the failure (e.g., either response indicates a failure or due to lack of response within a predetermined time period.).

When there have been one or more failures before a successful dummy CBSD spectrum grant request response is received, this test data is also stored. If the number of failures before a successful dummy CBSD spectrum grant request response message has occurred is above a spectrum grant service reliability failure threshold value, the SAS service provider system 1 1402 SAS spectrum grant service is determined to be operational but unreliable. In some embodiments, the spectrum grant response message 1146 may indicate that the spectrum grant was not approved (e.g., because the spectrum requested is no longer available). Such a message is not deemed a failure of the spectrum grant request service as it is a valid response which indicates that the SAS service provider system 1 1402 was able to contact the SAS, make the spectrum grant request and receive a valid response from the SAS while also providing the response to the SSAF 1401. In such instances, operation proceeds from step 1448 back to step 1418 where the method continues as previously described and a new spectrum inquiry request is made to determine what spectrum is currently available for which the dummy CBSD can make another spectrum grant request.

In step 1450, the SSAF 1401 initiates a SAS spectrum heartbeat service test. The SSAF 1401 generates and communicates dummy CBSD heartbeat request message 1452 to the SAS service provider system 1 1402 to request authorization to transmit using the spectrum granted to the dummy CBSD. The spectrum heartbeat request message 1452 includes the spectrum grant ID received in the spectrum grant response message 1146. Operation proceeds from step 1450 to step 1454.

In step 1454, the dummy CBSD spectrum heartbeat request is received and processed at the SAS service provider system 1 1402. Operation proceeds from step 1454 to step 1455. In step 1455, the SAS service provider system 1 1402 generates and sends a spectrum heartbeat request to the SAS. In some embodiments, this spectrum heartbeat request is a copy of the dummy spectrum heartbeat request 1452 while in others it includes the spectrum heartbeat request information included in the request 1452. The SAS upon receiving the dummy CBSD spectrum heartbeat request determines whether to approve authorization to transmit using the granted spectrum corresponding to the grant Id in the heartbeat request (i.e., the dummy CBSD is authorized to start or continue to transmit using granted spectrum correspond to grant ID), (ii) terminate the grant (i.e., the grant identified by the grant ID is the heartbeat request is no longer granted to the dummy CBSD (e.g., because the SAS needs to protect incumbents), or (iii) suspend the grant (i.e., the CBSD is not authorized to transmit at the present time but might be allowed to transmit again in the future using the granted spectrum). The SAS makes this authorize, terminate or suspend grant determination based on the need to protect incumbent users. The SAS then generates a heartbeat response message and communicates it the SAS service provider system 1 1402 in response the spectrum heartbeat request message it received from the SAS service provider system 1 1402. The spectrum heartbeat response message also includes a transmitExpireTime if the request to transmit is authorized and in some embodiments a suggested heatbeatInterval. The dummy CBSD being authorized to transmit up to the transmitExpireTime. The SAS service provider system 1 1401 receives the heartbeat response message from the SAS. Once the exchanges of messages in step 1455 is completed operation proceeds from step 1455 to step 1456.

In step 1456, the SAS service provider system 1 1402 generates and communicates a spectrum heartbeat response message 1458 to SSAF 1401 based on the heartbeat response message received from the SAS and includes information included in the heartbeat response message received from the SAS. In some embodiments, the spectrum heartbeat response message 1458 is a forwarded copy of the spectrum response message received by the SAS service provider system 1 1402 from the SAS. The heartbeat response message 1458 includes information authorizing the transmission using the granted spectrum and a transmitExpireTime and a proposed heartbeatInterval, a termination of the grant or a suspension of the grant which was included in the spectrum heartbeat response received from the SAS. Operation proceeds from step 1456 to step 1460.

In step 1460, the SSAF 1401 receives and processes the spectrum heartbeat response message 1458 and determines whether the SAS spectrum heartbeat service test is successful or a failure. In this example, as the SSAF 1401 receives a spectrum heartbeat response which is a valid response including either authorization to transmit, termination of the grant or suspension of the grant. The SSAF 1401 determines that the spectrum heartbeat service request was successful processes. The SSAF 1401 stores the information from the spectrum heartbeat response message 1458 for future use (e.g., in a dummy database with the dummy CBSD registration information). This information includes for example, information on whether (i) the dummy CBSD is authorized to transmit, the transmitExpireTime, and suggested heartbeat Interval, (ii) the dummy CBSD grant is terminated, or (iii) the dummy CBSD grant is suspended. The SSAF 1401 will also update the state of the dummy CBSD in a state machine by storing the updated dummy CBSD state (e.g., in memory or a database system (e.g., dummy CBSD database 156 of system 100 or 200)) with other information for this dummy CBSD. FIG. 3 illustrates a state diagram for a dummy CBSD which is used by an SSAF 1401 in testing the SAS services of an SAS service provider system. If the heartbeat response message includes an authorization to transmit, the dummy CBSD state is changed to dummy CBSD authorized to transmit state. If the dummy CBSD grant is terminated, the dummy CBSD state is changed to registered. If the dummy CBSD grant is suspended, the dummy CBSD state is changed to granted but suspended with respect to the grant Id. The SSAF 1401 also determines that the SAS spectrum heartbeat request service of SAS service provider system 1 1402 is operational. When the spectrum heartbeat response is determined to have been successfully and is in an authorized state or suspended state, operation proceeds from step 1460 back to step 1450 and the heartbeat process is continually repeated for a period of time to determine that the heartbeat service being provided by the SAS service provider system 1 1402 is reliable. In some embodiments, the heartbeat requests are sent at the suggested heartbeatInterval and less than the transmitExpiretime. The transmitExpireTime (transmit authorization expiration time) is included in every heartbeat response which authorizes transmission. This value indicates the time at which a CBSD must begin to hand off traffic and stop all transmission, unless it receives a re-authorization in a subsequent heartbeat. If no heartbeat response is received by the SSAF 1401 operation will proceed back to step 1450 within a heartbeat retry interval (e.g., 30 seconds) and repeat the process. This process may, and in some embodiments is, repeated a number of times (e.g., X times) to determine a failure rate. Based on the determined failure rate of heartbeat request responses, the SSAF 1401 determines whether the heartbeat request service of the SAS service provider system 1 1402 is reliable. In some embodiments, this continuous heartbeat request process is continued until the grant expiry time to test the ability of the SAS service provider 1 1402 grant authorization and/or re-authorization service. Each time a heartbeat response is received, the SSAF 1401 updates the stored information and state information for the dummy CBSD (e.g., with new transmitExpireTime for the authorization to transmit and authorization state (authorized to transmit, suspended, or terminated for the spectrum grant).

However, if the response message 1458 indicates a failure of the spectrum heartbeat request or if no response message 1458 is received by the SSAF 1401 within a predetermined time period (response message expiration timer timeout), the dummy CBSD spectrum heartbeat request attempt is determined by the SSAF 1401 to have failed. The failure of the dummy CBSD spectrum heartbeat request attempt is recorded and stored for future reference. In such cases, operation proceeds from step 1460 back to step 1450 wherein the method continues as previously described and another dummy heartbeat request message is sent. After a predetermined threshold number of dummy CBSD spectrum heartbeat request attempt failures, the SAS service provider system 1 1402 CBSD SAS spectrum heartbeat service is determined to not be operational. The dummy CBSD's state remains registered with spectrum granted and the SSAF 1401 updates its test data to indicate the SAS spectrum heartbeat service failure, the number of failed attempts, and the reason for the failure (e.g., either response indicates a failure or due to lack of response within a predetermined time period.).

When there have been one or more failures before a successful dummy CBSD spectrum heartbeat request response is received, this test data is also stored. If the number of failures before a successful dummy CBSD spectrum heartbeat request response message has occurred is above a spectrum heartbeat service reliability failure threshold value, the SAS service provider system 1 1402 SAS spectrum heartbeat service is determined to be operational but unreliable.

When SSAF 1401 testing of the SAS service provider system 1 1402 heartbeat service has been completed, operation proceeds from step 1460 to step 1462. In step 1462, the SSAF 1401 initiates a SAS spectrum grant relinquishment service test of the SAS service provider system 1 1402 by generating and communicating the dummy CBSD relinquish spectrum grant request message 1464 to the SAS service provider system 1 1402. The dummy CBSD is in a spectrum grant state at this time (e.g., spectrum granted but not authorized or suspended as spectrum heartbeat request is not working, spectrum granted and authorized for transmission, or spectrum grant suspended). The dummy CBSD relinquish spectrum grant request message 1464 includes the registration identifier for the dummy CBSD and the grant ID included in the spectrum grant response 1446 identifying the spectrum grant which is being relinquished. Operation proceeds from step 1462 to step 1466.

In step 1466, the dummy CBSD relinquish spectrum grant request message 1464 is received and processed by SAS service provider system 1 1402. Operation proceeds from step 1466 to step 1468. In step 1468, the SAS service provider 1 1402 sends a relinquish spectrum grant request message on behalf of the dummy CBSD to the SAS which includes the spectrum grant Id included in the message 1464. In some embodiments, the relinquish spectrum grant request sent to the SAS is a copy of the message 1464 and/or contains the information from the dummy CBSD relinquish spectrum grant request message 1464. The SAS 1402 receives and processes the relinquish spectrum grant request from the SAS service provider system 1 1402 and releases the spectrum identified by the spectrum grant Id and deallocates the spectrum corresponding to the spectrum grant ID from being assigned to the dummy CBSD. The spectrum is once again designated as available. The SAS then generates and sends a spectrum grant relinquish response to the SAS service provider system 1 1402. Operation proceeds from step 1468 to step 1469. In step 1469, the SAS service provider system 1 1402 receives and processes the spectrum grant relinquish response from the SAS. Operation proceeds from step 1469 to step 1470.

In step 1470, the SAS service provider system 1 1402 generates and communicates spectrum grant relinquish response message 1472 to the SSAF 1401. The spectrum grant relinquish response message 1472 includes information indicating that the spectrum grant has been successfully relinquished and is no longer granted to the dummy CBSD. In some embodiments, the spectrum grant relinquish response is a copy of or includes the information from spectrum grant relinquish response received by the SAS service provider system 1 1402 from the SAS. Operation proceeds from step 1470 step 1474.

In step 1474, the SSAF 1401 receives and processes the spectrum grant relinquish response message 1472 and determines that the spectrum grant has been successfully relinquished. The SSAF 1401 stores the information from the spectrum grant relinquish response message 1472 for future use (e.g., in a dummy database with the dummy CBSD registration information). This information includes for example that dummy CBSD is no longer granted spectrum corresponding to the spectrum grant ID which has been relinquished. The SSAF 1401 will also update the state of the dummy CBSD in a state machine by storing the updated dummy CBSD state (e.g., in memory or a database system (e.g., dummy CBSD database 156 of system 100 or 200)) with other information for this dummy CBSD. FIG. 3 illustrates a state diagram for a dummy CBSD which is used by an SSAF 1401 in testing the SAS services of an SAS service provider system. The state of the dummy CBSD is changed to CBSD registered state without a spectrum grant state. The SSAF 1401 also determines that the SAS spectrum grant relinquish service of SAS service provider system 1 1402 is operational. When the spectrum grant relinquish response 1472 is determined to have been successfully (i.e., requested spectrum grant has been released and/or relinquished and is no longer granted to the dummy CBSD), operation proceeds from step 1474 to step 1476. However, if the response message 1472 indicates a failure of the spectrum grant relinquish request or if no response message 1472 is received by the SSAF 1401 within a predetermined time period (response message expiration timer timeout), the dummy CBSD spectrum grant relinquish request attempt is determined by the SSAF 1401 to have failed. The failure of the dummy CBSD spectrum grant relinquish request attempt is recorded and stored for future reference. In such cases, operation proceeds from step 1474 back to step 1462 wherein the method continues as previously described. After a predetermined threshold number of dummy CBSD spectrum grant relinquish request attempt failures, the SAS service provider system 1 1402 CBSD SAS spectrum grant relinquish service is determined to not be operational. The dummy CBSD's state remains registered with spectrum grant and the SSAF 1401 updates its test data to indicate the SAS spectrum grant relinquish service failure, the number of failed attempts, and the reason for the failure (e.g., either response indicates a failure or due to lack of response within a predetermined time period.).

When there have been one or more failures before a successful dummy CBSD spectrum grant relinquish request response is received, this test data is also stored. If the number of failures before a successful dummy CBSD spectrum grant request relinquish response message has occurred is above a spectrum grant relinquish service reliability failure threshold value, the SAS service provider system 1 1402 SAS spectrum grant relinquish service is determined to be operational but unreliable.

Operation proceeds from step 1474 to step 1476 upon the completion of the testing of the SAS spectrum grant relinquish service.

In step 1476, the SSAF 1401 initiates testing of the SAS de-registration service of the SAS service provider 1 1402. In some embodiments, the de-registration service is part of the registration service. In step 1476, the SSAF 1401 generates and communicates dummy CBSD de-registration request message 1478 to the SAS service provider system 1 1402. The dummy CBSD de-registration request message 1478 includes the dummy CBSD registration ID and indicates that the dummy CBSD is to be de-registered. Operation proceeds from step 1476 to step 1480. In step 1400, the SAS service provider system 1 1402 receives and processes the dummy CBSD de-registration request message 1478. Operation proceeds from step 1480 to step 1481.

In step 1481, the SAS service provider system 1 1402 generates and send a CBSD de-registration request message to the SAS identifying the dummy CBSD registration ID as the CBSD to be de-registered. In some embodiments, the CBSD de-registration request message sent to the SAS includes is a copy of or includes the same information as the dummy CBSD de-registration request message 1478. The SAS receives and processes the CBSD de-registration request message from SAS service provider 1 1402 which results in the de-registration of the dummy CBSD. The SAS then generates and sends a de-registration response message to the SAS service provider 1 1402 that the dummy CBSD has been de-registered. Operation proceeds from step 1481 to step 1482. In step 1482, the SAS service provider system 1 1402 receives the de-registration response message from the SAS which includes information indicating that the dummy CBSD has been de-registered as requested. Operation proceeds from step 1482 to step 1484.

In step 1484, the SAS service provider system 1 1402 generates and communicates dummy CBSD de-registration response message 1486 to the SSAF 1401. The dummy CBSD de-registration response message in this example indicates that the dummy CBSD has been successfully de-registered. In some embodiments, the dummy CBSD de-registration response message is a copy of or includes the information from the CBSD de-registration response message from the SAS in step 1482. Operation proceeds from step 1484 to step 1488.

In step 1488, the SSAF 1401 receives and processes the dummy CBSD de-registration response message 1486 and determines that the dummy CBSD has been successfully de-registered. The SSAF 1401 stores the information from the de-registration response message 1486 for future use (e.g., in a dummy database with the dummy CBSD registration information). This information includes for example that dummy CBSD is no longer registered. The SSAF 1401 will also update the state of the dummy CBSD in a state machine by storing the updated dummy CBSD state (e.g., in memory or a database system (e.g., dummy CBSD database 156 of system 100 or 200)) with other information for this dummy CBSD. FIG. 3 illustrates a state diagram for a dummy CBSD which is used by an SSAF 1401 in testing the SAS services of an SAS service provider system. The state of the dummy CBSD registration is changed from registered to un-registered. The SSAF 1401 also determines that the SAS CBSD de-registration service of SAS service provider system 1 1402 is operational. However, if the response message 1486 indicates a failure of the dummy CBSD de-registration request or if no response message 1486 is received by the SSAF 1401 within a predetermined time period (response message expiration timer timeout), the dummy CBSD de-registration attempt is determined by the SSAF 1401 to have failed. The failure of the dummy CBSD de-registration request attempt is recorded and stored for future reference. In such cases, operation proceeds from step 1488 back to step 1476 wherein the method continues as previously described. After a predetermined threshold number of dummy CBSD de-registration request attempt failures, the SAS service provider system 1 1402 CBSD de-registration service is determined to not be operational. The dummy CBSD's state remains registered and SSAF 1401 updates its test data to indicate the SAS CBSD de-registration service failure, the number of failed attempts, and the reason for the failure (e.g., either response indicates a failure or due to lack of response within a predetermined time period.).

When there have been one or more failures before a successful dummy CBSD de-registration request response is received, this test data is also stored. If the number of failures before a successful dummy CBSD de-registration request response message has occurred is above a CBSD de-registration service reliability failure threshold value, the SAS service provider system 1 1402 SAS CBSD de-registration service is determined to be operational but unreliable.

The steps of method 1400 are repeated for the same and/or other CBSDs for testing the SAS service availability and reliability of the SAS service provider system 1 1402. The method 1400 can be used to test other SAS service provider systems wherein any SAS service provider system to be tested is replaces the SAS service provider system 1 1402.

While in this example, the SAS has been discussed as properly responding to the SAS service requests from the SAS service provider 1 1402, in actual implementation the SAS may not respond or respond in a timely manner (e.g., when the SAS is out of service, is overloaded, is not functioning, or there is an unacceptable delay on the connection between the SAS and the SAS service provider system 1 1402) which can result in the SAS service provider system 1 1402 responding with a failure message to the SSAF 1401. To prevent migrating CBSDs to a backup service provider system unnecessarily additional tests are performed by the SSAF entity to determine whether the SAS service provider system 1 1402 problems/issues with providing SAS services reliably are a result of the SAS service provider system 1, the SAS and/or the connection between the SAS service provider system 1 and SAS. These additional tests include pinging the SAS system to determine whether it is available and/or alive. These additional tests also include testing the backup service provider system using the method 1400 to determine that it can reliably provide SAS services or is experiencing similar issues to the SAS service provider system 1 1402 which indicates that the problems may not be with the SAS service provider system 1 1402 but with the SAS. While the method 1400 is illustrated for testing by the SSAF 1401 emulating or simulating a single dummy CBSD, the SSAF 1401 can, and in some embodiments does, emulate and/or simulate multiple dummy CBSDs to perform a plurality of tests in parallel, simultaneously, serially and/or in combination of serial and parallel.

Figure 4:
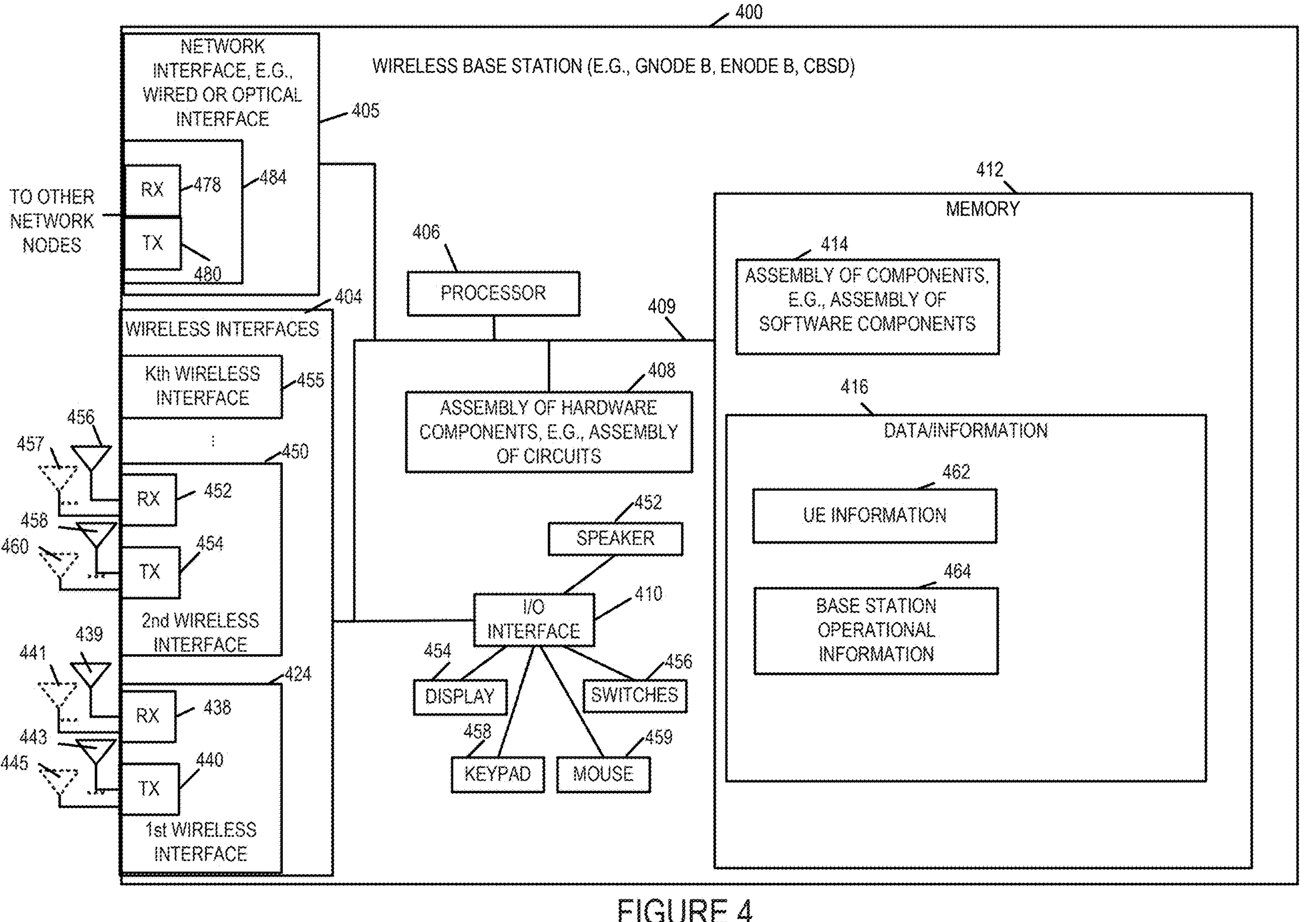
FIG. 4 illustrates details of an exemplary wireless base station, in accordance with one embodiment of the present invention.

FIG. 4 is a drawing of an exemplary wireless base station 400 in accordance with an exemplary embodiment. The wireless base station 400 may be, and in some embodiments is an eNodeB, gNodeB, or Citizens Broadband Radio Service Device (CBSD) 400, in accordance with an exemplary embodiment. Exemplary wireless base station 400 includes wireless interfaces 404, a network interface 405, e.g., a wired or optical interface, a processor 406, e.g., a CPU, an assembly of hardware components 408, e.g., an assembly of circuits, and I/O interface 410, and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interfaces 404 include a plurality of wireless interfaces including first wireless interface 424, second wireless interface 450, . . . , Kth wireless interface 455, K being an integer greater than 2. The wireless interfaces are used to communicate with the wireless devices, e.g., user equipment device. The first wireless interface 424 is used for example to communicate with a first user equipment device using a first spectrum band. The second wireless interface can be used to communicate with a second user equipment device using a second spectrum band. The first wireless interface 424 includes wireless receiver 438 and a wireless transmitter 440. In some embodiments, receiver 438 and transmitter 440 are part of a transceiver. In various embodiments, the first wireless interface 424 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a user equipment device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a user equipment device.

The second wireless interface 450 includes wireless receiver 452 and a wireless transmitter 454. In some embodiments, receiver 452 and transmitter 454 are part of a transceiver. In various embodiments, the second wireless interface 450 includes a plurality of wireless receivers and a plurality of wireless transmitters. Wireless receiver 452 is coupled to one or more receive antennas (receive antenna 1 456, . . . , receive antenna M 457), via which wireless base station 400 can receive wireless signals from other wireless communications devices including a second wireless communications device, e.g., CBRS UE device, using the same or a different wireless protocol than the first wireless interface. Wireless transmitter 454 is coupled to one or more wireless transmit antennas (transmit antenna 1 458, . . . , transmit antenna N 460) via which the wireless base station 400 can transmit signals to other wireless communications devices including a second wireless communications device, e.g., CBRS UE device. The wireless base station network interface 405 may be coupled to a cable modem, a core network, other networks, e.g., internet, or other wireless base stations. In some embodiments, the wireless base station 400 includes multiple network interfaces so that it can connect to multiple networks (e.g., a cable network and a core network) via the different interfaces.

Memory 412 includes an assembly of components 414, e.g., an assembly of software components, and data/information 416. Data/information 416 includes UE information 462 for the UE devices to which it is providing services and base station operational information 464 (e.g., spectrum usage information such as spectrum granted for use, spectrum heartbeat timing information, spectrum grant re-authorization timing information, registration information for registering with an SAS, etc.) In some embodiments, the UE information 462 includes for the UEs in the base station's coverage: UE identification information, UE location information (e.g., UE GPS coordinates), UE device type information, UE LTE category information, UE capabilities, UE session information such as session state information, session initiation request information, session type information. In some embodiments, the base station operational information 464 includes the information necessary to operate as a base station such as spectrum on which to communicate with user equipment devices. For base stations which are CBSDs, GAA and/or PAL spectrum granted by an SAS to the CBSD.

While the details of the first and second wireless interfaces are shown, the other wireless interfaces of the wireless base station, e.g., wireless interface K where K is an integer greater than 2 also include multiple receivers and transmitters so that the wireless base station 400 can provide wireless services to for example a plurality of wireless devices such as user equipment devices. In some embodiments, one or more of the wireless base stations discussed and/or shown in the Figures and/or in connection with the methods discussed herein are implemented in accordance with the wireless base station 400. For example, the CBSDs of system 100 of FIG. 1 and the CBSDs of system 200 in FIG. 2 may be, and in some embodiments are, implemented in accordance with the wireless base station 400.

Figure 5:
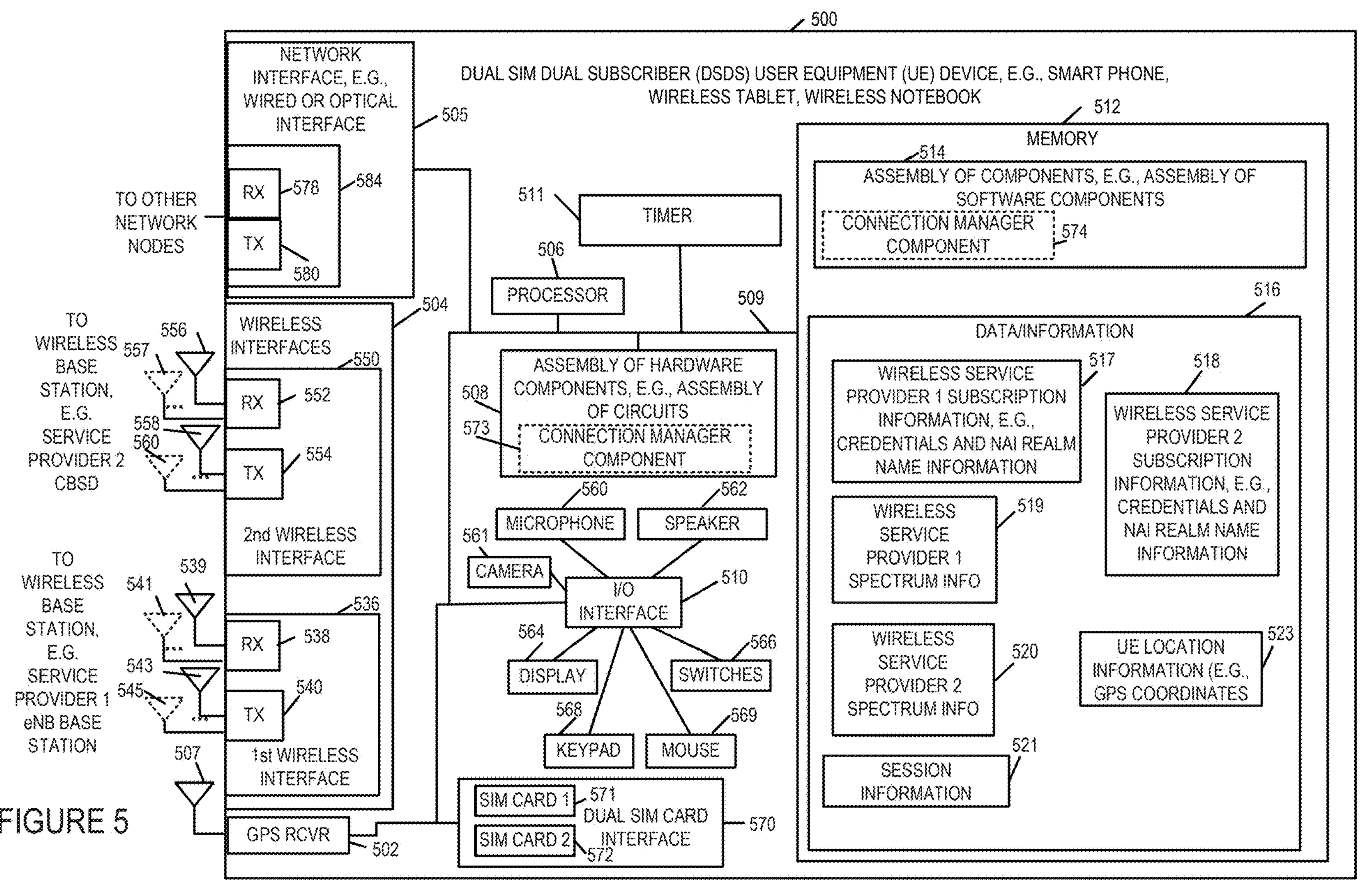
FIG. 5 illustrates details of an exemplary User Equipment (UE) device, e.g., a wireless device, a mobile device, cell phone, smartphone, wireless tablet, laptop, wireless notebook, in accordance with one embodiment of the present invention.

FIG. 5 is a drawing of an exemplary user equipment (UE) device 500 in accordance with an exemplary embodiment. UE device 500 is a wireless device such as for example a Customer Premises Equipment device, a mobile device, a cell phone, a smart phone, wireless tablet or wireless notebook. UE device 500 is a dual SIM dual subscription device that is enabled to communicate with different wireless base stations utilizing different wireless spectrum and/or wireless protocols, e.g., 5G wireless protocol, CBRS wireless protocol or cellular wireless protocol. Exemplary UE device 500 includes wireless interfaces 504, a network interface 505, a processor 506, e.g., a CPU, an assembly of hardware components 508, e.g., an assembly of circuits, and I/O interface 510, a GPS receiver 502 coupled to GPS receive antenna 507, a timer 511, e.g., a reference clock, a dual SIM card interface 570 including a first SIM card, (SIM card 1 571) corresponding a first wireless service provider, and a second SIM card (SIM card 2 572) corresponding to a second service provider, and memory 512 coupled together via a bus 509 over which the various elements may interchange data and information. UE device 500 further includes a microphone 560, camera 561, speaker 562, a display 564, e.g., a touch screen display, switches 566, keypad 568 and mouse 569 coupled to I/O interface 510, via which the various I/O devices (560, 561, 562, 564, 566, 568, 569) may communicate with other elements (502, 504, 505, 506, 508, 512, 570) of the UE device. Network interface 505 includes a receiver 578 and a transmitter 580. The network interface 505 can be coupled to routers within the home or customer premises or to wired (e.g., cable) or optical (e.g., fiber-optic) networks. In some embodiments, receiver 578 and transmitter 580 are part of a transceiver 584. In some embodiments, the assembly of hardware components 508 includes a connection manager component 573 which manages the process of connecting with one or more wireless networks as well as hand-off operations when moving from receiving services from one wireless network to another.

Wireless interfaces 504 include a plurality of wireless interfaces including first wireless interface 536 and a second wireless interface 550. The first wireless interface 536 is, e.g., used to communicate with wireless base stations in a first service provider's communications network, e.g., cellular, e.g., gNB tower base stations of the first service provider's communications network, e.g., using a first set of spectrum and a first communications protocol corresponding to the first service provider. The second wireless interface 550 is, e.g., used to communicate with a device, e.g., a CBSD base station, of a second service provider's communications network. For example, the second wireless interface 550 is used to communicate with a CBDS base station of the second service. The first wireless interface 536 includes wireless receiver 538 and a wireless transmitter 540. In some embodiments, receiver 538 and transmitter 540 are part of a transceiver. In various embodiments, the first wireless interface 536 includes a plurality of wireless receivers and a plurality of wireless transmitters. Wireless receiver 538 is coupled to a plurality of receive antennas (receive antenna 1 539, . . . , receive antenna M 541, M being an integer greater than 1), via which user equipment device 500 can receive wireless signals from other wireless communications devices including a wireless base station, e.g., a cellular wireless base station of the first service provider. Wireless transmitter 540 is coupled to a plurality of wireless transmit antennas (transmit antenna 1 543, . . . , transmit antenna N 545, N being an integer greater than 1) via which the user equipment device 500 can transmit signals to other wireless communications devices including a cellular wireless base station of the first service provider. The antennas 539, . . . , 541 and 543, . . . , 545 are typically mounted inside the housing of the wireless device but in some embodiments are located outside the user equipment device housing. In some embodiments the various antennas form an antenna array with the antennas pointing in different directions. In some embodiments, one or more of the antennas are included inside the housing of the user equipment device and the user equipment device includes one or more connections to which exterior antennas may be connected.

The second wireless interface 550 includes wireless receiver 552 and a wireless transmitter 554. In some embodiments, receiver 552 and transmitter 554 are part of a transceiver. In various embodiments, the second wireless interface 550 includes a plurality of wireless receivers and a plurality of wireless transmitters. Wireless receiver 552 is coupled to one or more receive antennas (receive antenna 1 556, . . . , receive antenna M 557), via which user device 500 can receive wireless signals from other wireless communications devices including, e.g. a CBSD base station of a second service provider. Wireless transmitter 554 is coupled to one or more wireless transmit antennas (transmit antenna 1 558, . . . , transmit antenna N 560) via which the user equipment device 500 can transmit signals to other wireless communications devices including, e.g. a CBSD of a second service provider or another user equipment device. The user equipment device network interface 505 may be coupled to LAN or WAN networks or routers so that the user equipment device can also obtain services via a hardwired connection in addition to through the wireless interfaces, e.g. when the UE device 500 is at a location where such a connection is possible.

Memory 512 includes an assembly of components 514, e.g., an assembly of software components, and data/information 516. In some embodiments, the assembly of software components 514 includes a connection manager component 574. Data/information 516 includes service provider 1 subscription information 517, e.g. credentials and NAI realm information corresponding to wireless service provide 1, wireless service provider 2 subscription information 518, e.g. credentials and NAI realm information corresponding to wireless service provider 2. Data/information 516 further includes wireless service provider 1 spectrum information 519 (e.g., spectrum on which the wireless service provider 1 operates), wireless service provider 2 spectrum information (e.g., CBRS spectrum on which wireless service provider 2 operates), session information 521 (session type, session endpoint addresses), UE location information (e.g., GPS coordinates received from the GPS receiver) 523.

While the exemplary UE device 500 is a dual SIM dual subscription device that is enabled to communicate with different wireless base stations using different wireless spectrum and/or protocols such as for example a cellular network base station and a CBRS network base station, the UE device 500 in some embodiments is a single subscriber device that communicates using only a single wireless protocol such as for example CBRS wireless protocol.

In some embodiments, the user equipment devices discussed in the Figures and/or in connection with the embodiments of the present invention are implemented in accordance with user equipment device 500. For example, UE 1 134, UE 2 136, UE 3 138, UE 4 140, UE 5 142, UE 6 144, UE 7 146, UE 8 148, UE 9 150, UE 10 152, . . . , UE X 154 in the system shown in FIG. 1 and UE 1 134, . . . , UE X 154 shown in FIG. 2 may be, and in some embodiments are, implemented in accordance with user equipment device 500.

Figure 6:
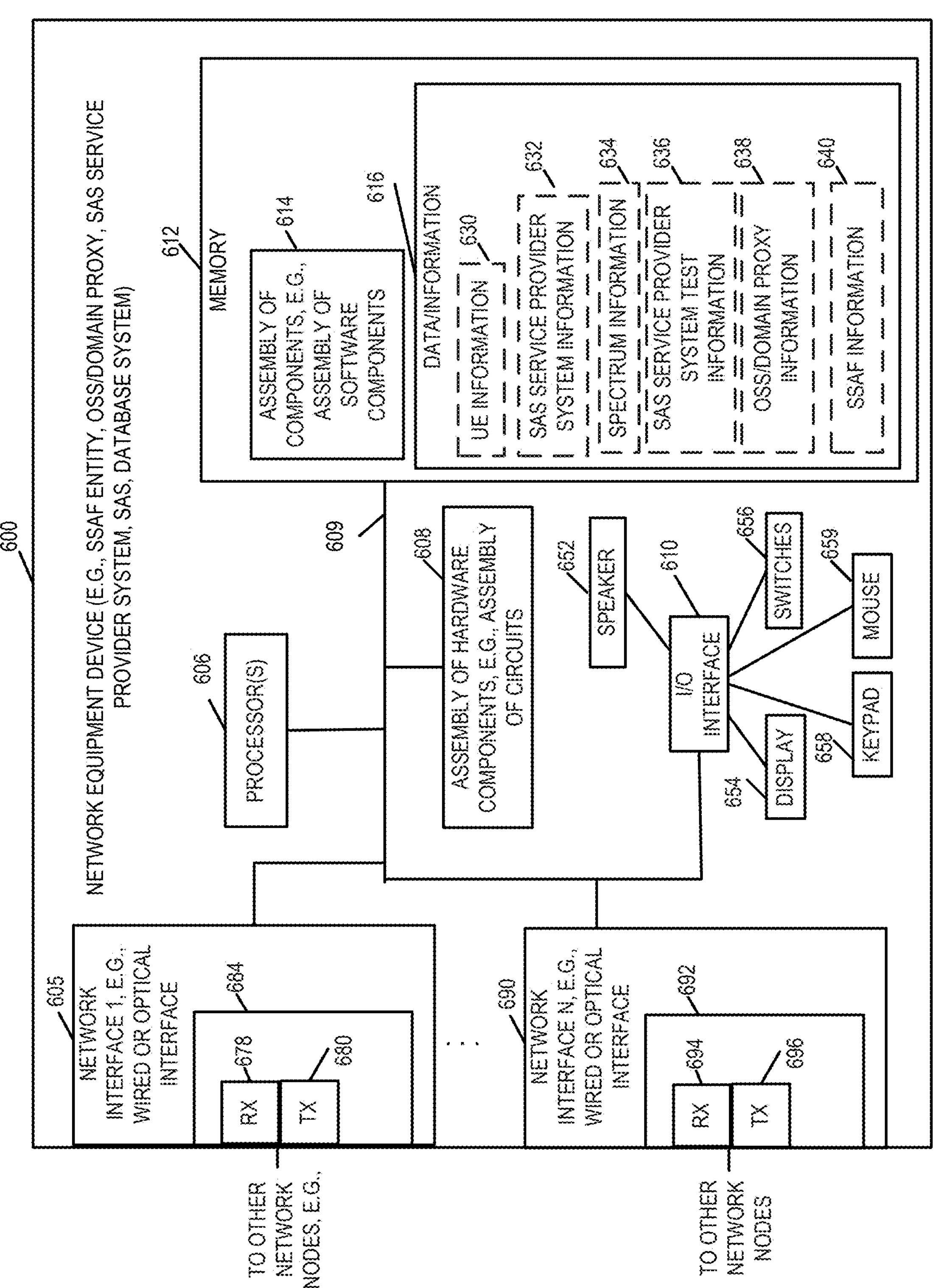
FIG. 6 illustrates details of an exemplary network equipment device and/or system, e.g., a Spectrum Access System Switch and Availability function (SSAF) node/device/entity, Operating Service Systems (OSS)/Domain Proxy, a Spectrum Access System, a SAS service provider system, a database system, in accordance with one embodiment of the present invention.

FIG. 6 is a drawing of an exemplary network equipment device, system, server or node, e.g., an OSS/Domain Proxy, an SAS, a database system, an SAS service provider system, Spectrum Access System Switch and Availability Function (SSAF), NSSF, AUSF, UDM, AMF, SMF, PCF, AF, UPF in accordance with an exemplary embodiment. The network equipment device 600 includes a plurality of network interfaces 605, . . . , 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The network equipment device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the network equipment device 600. Network interface 605 includes a receiver 678 and a transmitter 680. The network interface 605 is typically used to communicate with other devices, e.g., core network equipment, OSS/Domain Proxy, databases, SAS, SAS service provider system, wireless base station. In some embodiments, receiver 678 and transmitter 680 are part of a transceiver 684. Network interface 690 includes a receiver 694 and a transmitter 696. The network interface 690 is typically used to communicate with other devices, e.g., other network nodes in a core, etc. In some embodiments, receiver 694 and transmitter 696 are part of a transceiver 692. Memory 612 includes an assembly of component 614, e.g., an assembly of software components, and data/information 616. Data/information 616 includes UE information 630, SAS service provider system information 632, spectrum information 634, SAS service provider system test information 636, OSS/Domain Proxy information 638 and SAS information 640. The specific information included in data/information 616 depends on the specific network equipment device implemented. For example, when the network equipment device is an OSS the UE information 630 includes UE identification information, UE location information, UE device type information, UE category type information, UE capability information, of UEs being serviced by the system. The SAS service provider system information 632 includes information for implementing and operating an SAS service provider system including information about CBSDs receiving services from the SAS service provider system and information for providing SAS services. The spectrum information 634 is information about wireless spectrum usage, spectrum grants, and spectrum interference. The SAS service provider system test information 636 is information collected and/or measured for example by an SSAF entity on the services provided by the SAS service provider system such as which SAS services are experiencing problems and/or issues and the extent of the problem (e.g., partial outage or complete outage). The OSS/Domain proxy information 638 including information used by an OSS and/or Domain Proxy to provide services to the wireless network including interfacing with the SAS service provider system on behalf of the CBSDs of the wireless system as well as data collected on the operations of the wireless system.

The SSAF information 640 includes information for emulating CBSDs or implementing dummy CBSDs for communicating and testing an SAS service provider system as well as migrating CBSDs from a first SAS service provider system to a second SAS service provider system.

In some embodiments, the network equipment devices discussed in the Figures and/or in connection with the embodiments of the present invention described are implemented in accordance with network equipment device 600. For example, network equipment devices in the core networks (e.g., NSSF, AUSF, UDM, AMF, SMF, PCF, AF, UPF), OSS/Domain Proxy, Spectrum Access System, database system (e.g., dummy CBSD database), SAS service provider system, Spectrum Access System Switch and Availability Function (SSAF) entity in FIGS. 1, 2, 10, and 11 may be, and in some embodiments are, implemented in accordance with the network equipment device 600.

Figure 7:
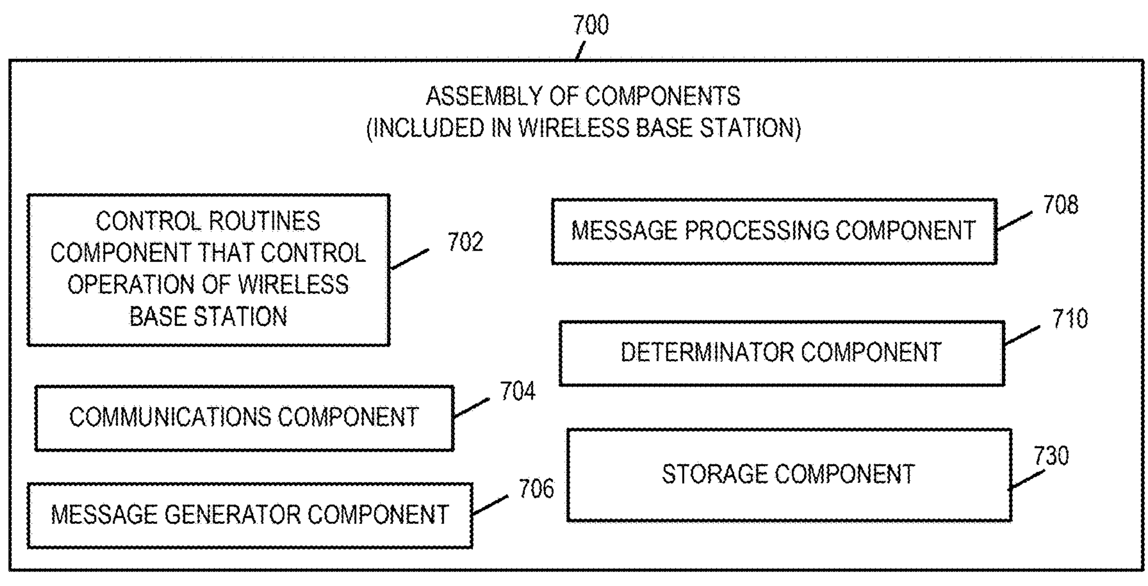
FIG. 7 illustrates an exemplary assembly of components for a wireless base station in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a determinator component 710, and a storage component 714.

The control routines component 702 is configured to control operation of the wireless base station (e.g., gNodeB, eNodeB, or a CBSD).

The communication component 704 is configured to handle communications, e.g., transmission and reception of messages, and protocol signaling for the wireless base station (e.g., communications with user equipment devices and components, functions, devices, and servers in its core network).

The message generator component 706 is configured to generate messages for transmission to other devices, e.g., request messages (e.g., SAS request messages such as CBSD registration request, spectrum inquiry request, spectrum grant request, heartbeat request, de-registration request), response messages, notification messages, messages for sharing information, information (e.g., spectrum channels and power transmission instructions), communications messages with network equipment devices, communications messages with user equipment devices. In some embodiments, the message generator component 706 is a sub-component of the communications component 704.

The message processing component 708 is configured to process messages received from other devices and implement operations in response to instructions and/or information included in the processed message, e.g., processing and implementing operations in connection with messages from user equipment devices, messages from network equipment devices. In some embodiments, the message processing component 708 is a sub-component of the communications component 704.

The determinator component 710 is configured to make determinations and decisions for the wireless base station including for example: determining what SAS services to communicate to a OSS/Domain Proxy and/or to an SAS service provider system and when to communicate the information (e.g., in compliance with a heartbeat schedule).

The storage component 712 is configured to manage the storage, and retrieval of data and/or instructions to/and from memory, buffers in memory, hardware buffers and/or storage device coupled and/or connected to the wireless base station.

Figure 8:
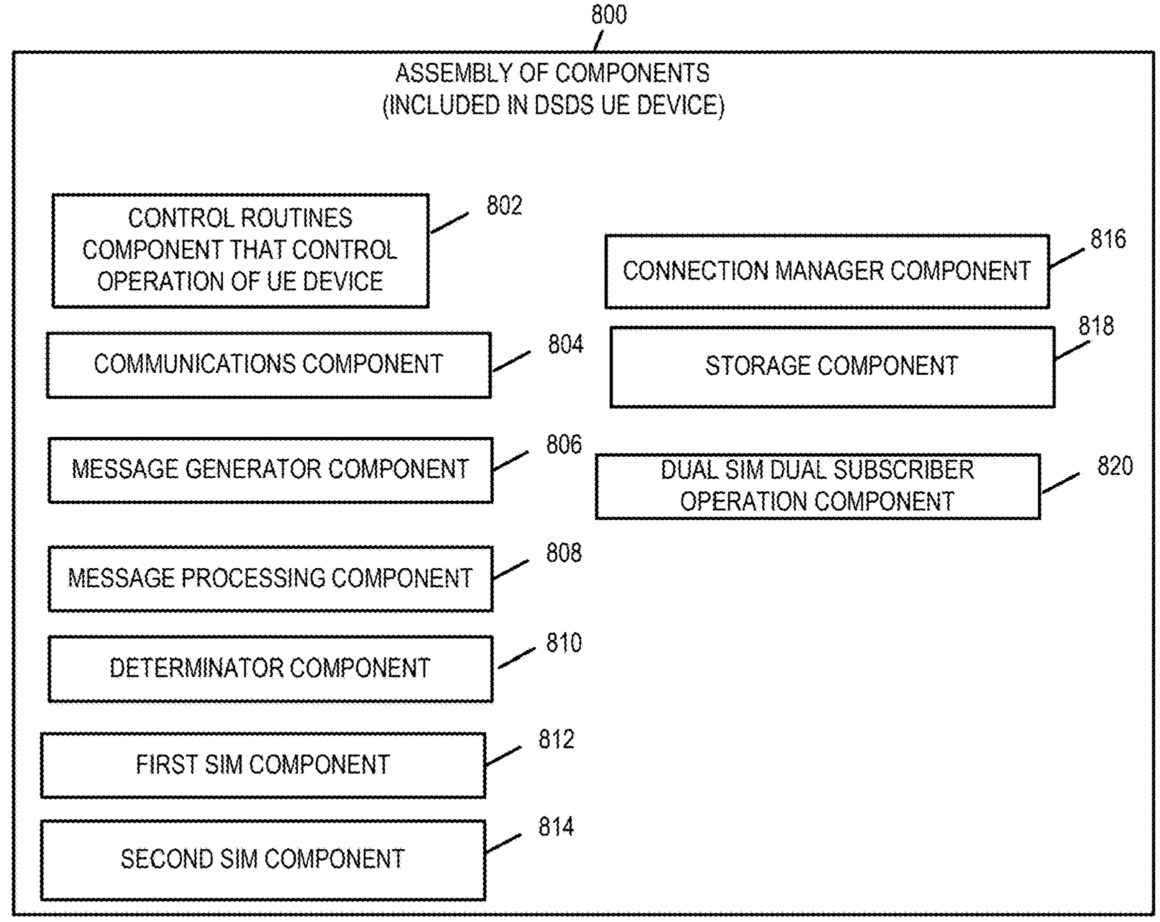
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808, a determinator component 810, a first SIM component 812, a second SIM component 814, a connection manager component 816, a storage component 818, and a dual SIM dual Subscriber operation component 820.

The control routines component 802 is configured to control operation of the UE. The communications component 804 is configured to handle communications, e.g., receipt and transmission of signals and provide protocol signal processing for one or protocols for the UE. The message generator component 806 is configured to generate messages for transmission to wireless base stations (e.g., CBSD devices, gNodeBs, eNodeBs) such as messages including request and response messages, etc. In some embodiments, the message generator component 806 is a sub-component of the communications component 804. The message processing component 808 processes received messages, e.g., requests for information. In some embodiments, the message processing component 808 is a sub-component of the communications component 804. The determinator component 810 makes determinations for the UE such as to switch to cellular network when CBRS spectrum usage is denied due to lack of SAS heartbeat services because of a result of problems with an SAS service provider system.

The first SIM component 812 is configured to store Subscriber Identity Information, e.g., a first set of credentials, for obtaining access to a first service provider/operator's wireless network. The second SIM component 814 is configured to store Subscriber Identity Information, e.g., a second set of credentials, for obtaining access to a second service provider/operator's wireless network. The connection manager component 816 is configured to manage the communications between the user equipment device and a first network and a second network including coordinating the off-load and/or handoff of calls from one network to the other network and the generation and sharing of UE location information. The storage component 818 is configured to perform all operations in storing and retrieving information, e.g., credential information, location information, spectrum channel grant information and transmission power level instructions, session information, from memory and/or storage devices (e.g., SIMs) located in the user equipment device.

The dual SIM dual subscriber mode of operation component 820 is configured to implement all operations for operating as a dual subscriber in which the user equipment device utilizes both SIM cards to communicate with two different wireless base stations using two different subscriptions, e.g., simultaneously or switching back forth between the two different wireless base stations. This component includes the management of the signaling between the two wireless base stations. In some embodiments, the dual SIM dual subscriber mode of operation component is a sub-component of the communications component 804.

Figure 9:
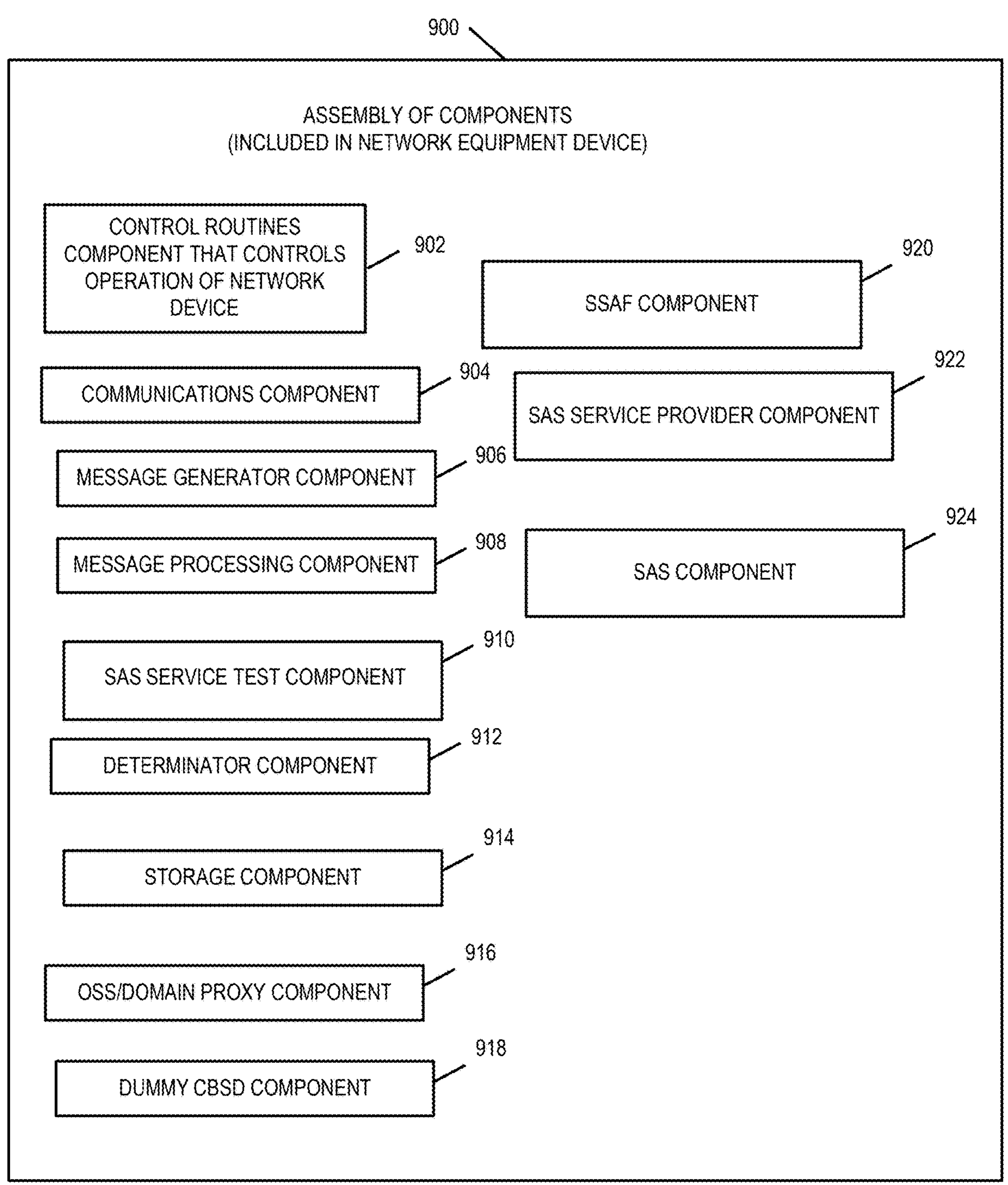
FIG. 9 illustrates an exemplary assembly of components for a network equipment device in accordance with an embodiment of the present invention.

FIG. 9 is a drawing of an exemplary assembly of components 900 which may be included in a network equipment device 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the network equipment device 600, with the components controlling operation of the network equipment device 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the network equipment device 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a SAS service test component 910, determinator component 912, a storage component 914, an OSS/Domain Proxy component 916, a dummy CBSD component 918, a SAS service and availability function component 920, a SAS service provider component 922, and a Spectrum Access System component 924.

The control routines component 902 is configured to control operation of the network equipment device. The communication component 904 is configured to handle communications, e.g., transmission and reception of messages, and protocol signaling for the network equipment device. The message generator component 906 is configured to generate messages for transmission to other devices. Exemplary messages which are generated include test messages, request messages and response message (e.g., base station (e.g., CBSD) registration request messages, base station registration response messages, base station spectrum inquiry request messages, spectrum inquiry response messages, base station spectrum grant request, spectrum grant response messages, base station relinquish spectrum grant messages, spectrum grant relinquish response messages, base station de-registration request messages, deregistration response messages, heartbeat request messages, heartbeat response messages.

The message processing component 908 is configured to process messages and implement procedures/operations in response to messages or based on the contents of messages. This includes messages received from other devices, e.g., messages from UEs, wireless base stations, core network, SSAF entity, SAS service provider system, OSS, Domain Proxy or SAS, including test messages, SAS service request and response message, notification messages, and messages with instructions.

The SAS service test component 910 is configured to provide the functions necessary for testing a SAS service including generating and storing dummy CBSD information, generating and sending dummy CBSD SAS service request messages, receiving and processing SAS service response messages, updating dummy CBSD information used for testing including dummy CBSD state information, calculating data on the SAS service tests, and making determination on the service availability and reliability of SAS services provided by an SAS service provider system. The SAS service test component 910 is in some embodiments a sub-component of the SSAF component 920.

The determinator component 912 is configured to make determinations and decisions for the network equipment device including for example: determining whether or not a SAS service provider system is experiencing problems, whether to migrate or switch CBSDs of a wireless network from a primary SAS service provider system to one or more backup SAS service provider systems, determining whether to switch the CBSDs back from the one or more backup SAS service provider systems to the primary SAS service provider system.

The storage component 914 is configured to manage the storage, and retrieval of data and/or instructions to/and from memory, and/or storage devices coupled and/or connected to the network equipment device, e.g., storage and retrieval of dummy CBSD registration and simulation information, dummy CBSD state information, storage and retrieval of test data.

The OSS/domain proxy component 916 is configured to provide OSS services and Domain Proxy services including interacting on behalf of wireless base stations and SSAF entities in its domain/network with an SAS service provider system providing SAS services to the wireless network. The OSS/Domain Proxy also collects data on its interactions with the SAS service provider system and provides the data to the SSAF. In some embodiments, the OSS/Domain Proxy analyzes collected data on its interactions with the SAS service provider system and identifies potential issues with one or more SAS services and notifies the SSAF entity.

The dummy CBSD component 918 is configured to emulate operations performed by an actual CBSD, e.g., sending request messages and responses as if the dummy CBSD is an actual CBSD for the purposes of interacting with and testing an SAS service provider system. In some embodiments, the dummy CBSD component 918 is sub-component of the SSAF component 920.

The SAS switch and availability function (SSAF) component 920 is configured to perform the functions and operations described herein including in connection with SSAF 116 of system 100, system 200, and method 1500, and SSAF 1401 of method 1400.

SAS service provider system component 922 is configured to provider SAS services as a certified SAS administrator acting as an intermediary between base stations (e.g., CBSDs), OSS/Domain Proxies, SSAF entities and SAS (e.g., FCC SAS).

The Spectrum Access System component 924 is configured to manage resources (e.g., spectrum) of a wireless network (e.g., CBRS network) including registering base stations, responding to spectrum inquiries, responding to spectrum grant requests, determining spectrum availability, evaluating spectrum based on location and interference, grant spectrum for use by base stations, respond to heartbeat requests, suspend spectrum grants, release spectrum grants, de-register base stations. The SAS component 924 is configured in some embodiments to perform the operations of a CBRS SAS (e.g., FCC Spectrum Access System).

The specific components of the assembly of components 900 included in any particular network equipment device may, and typically does vary depending on the specific network equipment device and the functionality required for the device and/or the operations the network equipment device is responsible for performing.

Various exemplary numbered embodiments illustrating different features of the present invention will now be discussed. The various features discussed may be used in variety of different combinations. It should be appreciated that not necessarily all embodiments include the same features and some of the features described below are not necessary but can be desirable in some embodiments. The numbered embodiments are only exemplary and are not meant to be limiting to the scope of the invention. The various method embodiments may be, and in some embodiments are, implemented on system 100 of FIG. 1 or system 200 of FIG. 2.

List of Exemplary Numbered Method Embodiments

Method Embodiment 1. A method comprising: performing (e.g., by an SAS switch and availability function (SSAF) entity) one or more tests on a first Spectrum Access System (SAS) service provider system, said first SAS service provider system providing SAS services to one or more wireless base stations (e.g., CBSDs) of a first wireless network (e.g., a first CBRS network); and determining whether or not the first SAS service provider system is experiencing problems providing SAS services to the first wireless network based on results of the one or more tests performed on the first SAS service provider system.

Method Embodiment 1A. The method of Method Embodiment 1, wherein the SAS services include one or more of the following: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

Method Embodiment 2. The method of Method Embodiment 1, wherein the first wireless network is a Citizen Broadband Radio Service (CBRS) network; and wherein the one or more wireless base stations are Citizens Broadband Radio Service Devices (CBSDs).

Method Embodiment 3. The method of Method Embodiment claim 1, wherein said one or more tests are performed by a Spectrum Access System switch and availability function (SSAF).

Method Embodiment 3A. The method of Method Embodiment 3, wherein the SSAF is implemented as a function of an Operating Service Systems (OSS) or Domain Proxy of the first wireless network.

Method Embodiment 3B. The method of Method Embodiment 3, wherein functionality of the SSAF is implemented as a cloud service.

Method Embodiment 3C. The method of Method Embodiment 3, wherein the functionality of the SSAF is implemented using one or more entities, devices or nodes.

Method Embodiment 4. The method of Method Embodiment 1, wherein said performing one or more tests on the first SAS service provider system includes requesting one or more SAS services be provided for a first dummy wireless base station (e.g., a first dummy CBSD) of the first wireless network, said first dummy wireless base station being a fictious non-existent wireless base station.

Method Embodiment 4A. The method of Method Embodiment 1, wherein said performing one or more tests on the first SAS service provider system includes requesting one or more SAS services be provided for a first dummy wireless base station (e.g., a first dummy CBSD) of the first wireless network, said first dummy wireless base station being a non-operating CBSD belonging to the first wireless base station (e.g., a CBSD owned by the first wireless network operator which is not in service and/or a CBSD registered with the FCC as belonging to the first wireless network but which is not in service).

Method Embodiment 4B. The method of Method Embodiment 1, wherein said performing one or more tests on the first SAS service provider system includes requesting one or more SAS services be provided for a first dummy wireless base station (e.g., a first dummy CBSD) of the first wireless network, said first dummy wireless base station being a wireless base station registered with the FCC as belonging to the first wireless network which is a fictious non-existent wireless base station.

Method Embodiment 6. The method of Method Embodiment 3, further comprising: prior to performing said one or more tests on the first SAS service provider system, generating, by the SSAF, information for registering a first dummy wireless base station with a Spectrum Access System (e.g., an FCC Spectrum Access System).

Method Embodiment 6A. The method of Method Embodiment 6, further comprising: storing, by the SSAF, the generated information for registering the first dummy wireless base station in a database.

Method Embodiment 6A1. The method of Method Embodiment 6, wherein said information for registering the first dummy wireless base station with a Spectrum Access System includes fictious information (e.g., fictious information or made up information on the location at which the first dummy wireless base station is deployed).

Method Embodiment 6A2. The method of Method Embodiment 6A1, wherein said information for registering the first dummy wireless base station with a Spectrum Access System further includes information corresponding to a wireless base station model certified with the Federal Communications Commission (e.g., fccid of a CBSD model which has been certified with the Federal Communications Commission—the same fccid corresponding to a certified CBSD model may be used for multiple CBSDs produced in accordance with the specifications of the certified model).

Method Embodiment 6A3. The method of Method Embodiment 6A1, wherein said information for registering the first dummy wireless base station with a Spectrum Access System further includes information corresponding to an actual wireless base station (e.g., userid, fccid, cbsdSerialNumber of a certified CBSD which is not currently operational and will remain non-operational while the first dummy CBSD is registered with an SAS service provider).

Method Embodiment 6B. The method of Method Embodiment 6, wherein the first dummy wireless base station is a first dummy CBSD; and wherein said information for registering the first dummy wireless base station with a Spectrum Access System includes one or more of the following: userid, fccid, cbsdSerialNumber, cbsdCategory, airinterface, measCapability, latitude, longitude, height, heightType, indoorDeployment, antennaAzimuth, antennaDowntilt, antennaGain, antennaBeamwidth for the first dummy CBSD.

Method Embodiment 6C. The method of Method Embodiment 6B, wherein said information for registering the first dummy wireless base station with the Spectrum Access System includes fictitious information not corresponding to an actual CBSD (e.g., fictitious location information such as latitude, longitude and height of the deployment of the CBSD base station).

Method Embodiment 6D. The method of Method Embodiment 6, wherein the first dummy wireless base station is a first dummy CBSD; and wherein said information for registering the first dummy wireless base station with a Spectrum Access System includes one or more of the following: userid, fccid, cbsdSerialNumber, cbsdCategory, airinterface, measCapability, latitude, longitude, height, heightType, indoorDeployment, antennaAzimuth, antennaDowntilt, antennaGain, antennaBeamwidth for the first dummy CBSD, said information for registering the first dummy wireless base station with the Spectrum Access System corresponding to an actual CBSD which is not operating.

Method Embodiment 7. The method of Method Embodiment 3, wherein said performing one or more tests on the first SAS service provider system includes emulating by the SAS switch and availability function one or more dummy CBSDs (e.g., non-operating and/or fictious CBSDs) requesting one or more SAS services from the first SAS service provider system; and determining, by the SAS switch and availability function, which of the one or more SAS services requested by the SAS switch and availability function are experiencing problems based on one or more of the following: (i) one or more responses received by the SAS switch and availability function from the first SAS service provider system in response to the one or more SAS service requests, or (ii) failure to receive one or more responses by the SAS switch and availability function from the first SAS service provider system to the one or more SAS service requests.

Method Embodiment 7A. The method of Method Embodiment 7, wherein said emulating by the SAS switch and availability function one or more dummy CBSDs requesting one or more SAS services from the first SAS service provider system includes sending SAS service request messages to the first SAS service provider system requesting the one or more SAS services.

Method Embodiment 7B. The method of Method Embodiment 7, wherein the one or more SAS services are one or more of the following SAS services: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

Method Embodiment 8. The method of Method Embodiment 1, wherein said one or more tests performed on the first SAS service provider system include tests to register one or more dummy wireless base stations (e.g., dummy CBSDs) with a Spectrum Access System (SAS); and wherein said determining whether or not the first SAS service provider system is experiencing problems providing SAS services to the first wireless network based on results of the one or more tests performed on the first SAS service provider system includes: making the determination that the first SAS service provider system is experiencing problems providing SAS services to the first wireless network when the results of the one or more tests performed on the first SAS service provider system indicate that the SAS service provider system is unable to register the one or more dummy wireless base stations with the SAS.

Method Embodiment 8A. The method of Method Embodiment 3, wherein said performing one or more tests on the first SAS service provider system includes: sending, by the SSAF, a plurality of registration requests to the first SAS service provider system on behalf of a first dummy wireless base station (e.g., a first dummy CBSD) of the first wireless network, said first dummy wireless base station being a fictious non-existent wireless base station; and wherein said determining whether or not the first SAS service provider system is experiencing problems providing SAS services to the first wireless network based on the results of the one or more tests performed on the first SAS service provider system includes: making the determination that the first SAS service provider system is experiencing problems providing SAS services to the first wireless network when the results of the one or more tests performed on the first SAS service provider system indicate that the SAS service provider system is unable to register the first dummy wireless base station with the SAS.

Method Embodiment 9. The method of Method Embodiment 3, further comprising: wherein determining whether or not the first SAS service provider system is experiencing problems providing services to the first wireless network based on the results of the one or more tests performed on the first SAS service provider system includes: determining that the first SAS service provider system is experiencing problems when the test results indicate no response was received for a threshold number of SAS requests (e.g., dummy CBSD registration requests, dummy CBSD spectrum grant requests, dummy CBSD heartbeat requests) sent to the first SAS service provider system by the SSAF on behalf of one or more dummy CBSDs within a first period of time, said one or more dummy CBSDs being fictious non-existent CBSDs.

Method Embodiment 10. The method of Method Embodiment 9, further comprising: in response to determining that the first SAS service provider system is experiencing problems (e.g., has failed), migrating or switching wireless base stations of the first wireless network to a second SAS service provider system; performing on an on-going basis additional tests on the first SAS service provider system to determine when the first SAS service provider system SAS service has been restored (e.g., is back up and running); and upon detecting that the first SAS service provider system SAS service has been restored migrating or switching the wireless base stations of the first wireless network which had been switched to the second SAS service provider system back to the first SAS service provider system.

Method Embodiment 11. The method of Method Embodiment 10, further comprising: prior to determining that first SAS service provider system is experiencing problems, sending, by the SSAF, a test message (e.g., a ping message) to a Spectrum Access System (SAS) to determine whether the SAS is on-line, said SAS being an FCC SAS with which the first SAS service provider system is interacting to provide SAS services; and determining that the SAS is not on-line when no response is received by the SSAF to the test message (e.g., the SSAF does not receive a ping response indicating that SAS is off-line and not available); and determining that the SAS is on-line when a response is received by the SSAF to the test message (e.g., the SSAF receives a ping response indicating that the SAS is on-line and available).

Method Embodiment 12. The method of Method Embodiment 10, prior to migrating or switching wireless base stations of the first wireless network to the second SAS service provider system, determining by the SSAF that a Spectrum Access System (SAS) is available, said SAS being an FCC SAS with which the first SAS service provider system is interacting to provide SAS services.

Method Embodiment 12B. The method of Method Embodiment 12A, further comprising: sending, by the SSAF, a ping message to the SAS; receiving, by the SSAF, a ping response message from the SAS; and determining that the SAS is available in response to receiving said ping response message.

Method Embodiment 13. The method of Method Embodiment 10, prior to migrating or switching wireless base stations of the first wireless network to the second SAS service provider system, performing by the SSAF tests on the second SAS service provider system by sending dummy wireless base station service requests to the second SAS service provider system.

List of Exemplary First Set of Numbered System Embodiments

System Embodiment 1. A communications system comprising: a Spectrum Access System switch and availability function (SSAF) node including: memory; and a first processor that controls the SSAF node to perform the following operations: performing one or more tests on a first Spectrum Access System (SAS) service provider system, said first SAS service provider system providing SAS services to one or more wireless base stations (e.g., CBSDs) of a first wireless network (e.g., a first CBRS network); and determining whether or not the first SAS service provider system is experiencing problems providing SAS services to the first wireless network based on results of the one or more tests performed on the first SAS service provider system.

System Embodiment 1A. The communications system of System Embodiment 1, wherein the SAS services include one or more of the following: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

System Embodiment 1B. The communications system of System Embodiment 1, wherein the SSAF node is implemented as a function of an Operating Service Systems (OSS) or Domain Proxy of the first wireless network.

System Embodiment 1C. The communications system of System Embodiment 1, wherein functionality of the SSAF node is implemented as a cloud service.

System Embodiment 2. The communications system of System Embodiment 1, wherein the first wireless network is a Citizen Broadband Radio Service (CBRS) network; and wherein the one or more wireless base stations are Citizens Broadband Radio Service Devices (CBSDs).

System Embodiment 3. The communications system of System Embodiment 1, wherein said performing one or more tests on the first SAS service provider system includes requesting one or more SAS services be provided for a first dummy wireless base station (e.g., a first dummy CBSD) of the first wireless network, said first dummy wireless base station being a fictious non-existent wireless base station.

System Embodiment 4A. The communications system of System Embodiment 1, wherein said performing one or more tests on the first SAS service provider system includes requesting one or more SAS services be provided for a first dummy wireless base station (e.g., a first dummy CBSD) of the first wireless network, said first dummy wireless base station being a non-operating CBSD belonging to the first wireless base station (e.g., a CBSD owned by the first wireless network operator which is not in service and/or a CBSD registered with the FCC as belonging to the first wireless network but which is not in service).

System Embodiment 4B. The communications system of System Embodiment 1, wherein said performing one or more tests on the first SAS service provider system includes requesting one or more SAS services be provided for a first dummy wireless base station (e.g., a first dummy CBSD) of the first wireless network, said first dummy wireless base station being a wireless base station registered with the FCC as belonging to the first wireless network which is a fictious non-existent wireless base station.

System Embodiment 6. The communications system of System Embodiment 3, wherein the first processor further controls the SSAF node to perform the following operation: generating information for registering the first dummy wireless base station with a Spectrum Access System (e.g., an FCC Spectrum Access System) prior to performing said one or more tests on the first SAS service provider system.

System Embodiment 6A. The communications system of System Embodiment 6, wherein the first processor further controls the SSAF node to perform the following operation: storing, by the SSAF, the generated information for registering the first dummy wireless base station in a database.

System Embodiment 6A1. The communications system of System Embodiment 6, wherein said information for registering the first dummy wireless base station with a Spectrum Access System includes fictious information (e.g., fictious information or made up information on the location at which the first dummy wireless base station is deployed).

System Embodiment 6A2. The communications system of System Embodiment 6A1, wherein said information for registering the first dummy wireless base station with a Spectrum Access System further includes information corresponding to a wireless base station model certified with the Federal Communications Commission (e.g., fccid of a CBSD model which has been certified with the Federal Communications Commission—the same fccid corresponding to a certified CBSD model may be used for multiple CBSDs produced in accordance with the specifications of the certified model).

System Embodiment 6A3. The communications system of System Embodiment 6A1, wherein said information for registering the first dummy wireless base station with a Spectrum Access System further includes information corresponding to an actual wireless base station (e.g., userid, fccid, cbsdSerialNumber of a certified CBSD which is not currently operational and will remain non-operational while the first dummy CBSD is registered with an SAS service provider).

System Embodiment 6B. The communications system of System Embodiment 6, wherein the first dummy wireless base station is a first dummy CBSD; and wherein said information for registering the first dummy wireless base station with a Spectrum Access System includes one or more of the following: userid, fccid, cbsdSerialNumber, cbsdCategory, airinterface, measCapability, latitude, longitude, height, heightType, indoorDeployment, antennaAzimuth, antennaDowntilt, antennaGain, antennaBeamwidth for the first dummy CBSD.

System Embodiment 6C. The communications system of System Embodiment 6B, wherein said information for registering the first dummy wireless base station with the Spectrum Access System includes fictitious information not corresponding to an actual CBSD (e.g., fictitious location information such as latitude, longitude and height of the deployment of the CBSD base station).

System Embodiment 6D. The communications system of System Embodiment 6, wherein the first dummy wireless base station is a first dummy CBSD; and wherein said information for registering the first dummy wireless base station with a Spectrum Access System includes one or more of the following: userid, fccid, cbsdSerialNumber, cbsdCategory, airinterface, measCapability, latitude, longitude, height, heightType, indoorDeployment, antennaAzimuth, antennaDowntilt, antennaGain, antennaBeamwidth for the first dummy CBSD, said information for registering the first dummy wireless base station with the Spectrum Access System corresponding to an actual CBSD which is not operating.

System Embodiment 7. The communications system of System Embodiment 1, wherein said performing one or more tests on the first SAS service provider system includes: emulating by the SSAF node one or more dummy CBSDs (e.g., non-operating and/or fictious CBSDs) requesting one or more SAS services from the first SAS service provider system; and determining, by the SSAF node, which of the one or more SAS services requested by the SSAF node are experiencing problems based on one or more of the following: (i) one or more responses received by the SSAF node from the first SAS service provider system in response to the one or more SAS service requests, or (ii) failure to receive one or more responses by the SSAF node from the first SAS service provider system to the one or more SAS service requests.

System Embodiment 7A. The communications system of System Embodiment 7, wherein said emulating by the SSAF node one or more dummy CBSDs requesting one or more SAS services from the first SAS service provider system includes sending SAS service request messages to the first SAS service provider system requesting the one or more SAS services.

System Embodiment 7B. The communications system of System Embodiment 7, wherein the one or more SAS services are selected from the following SAS services: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

System Embodiment 8. The communications system of System Embodiment 1, wherein said one or more tests performed on the first SAS service provider system include tests to register one or more dummy wireless base stations (e.g., dummy CBSDs) with a Spectrum Access System (SAS); and wherein said determining whether or not the first SAS service provider system is experiencing problems providing SAS services to the first wireless network based on results of the one or more tests performed on the first SAS service provider system includes: making the determination that the first SAS service provider system is experiencing problems providing SAS services to the first wireless network when the results of the one or more tests performed on the first SAS service provider system indicate that the SAS service provider system is unable to register the one or more dummy wireless base stations with the SAS.

System Embodiment 8A. The communications system of System Embodiment 1, wherein said performing one or more tests on the first SAS service provider system includes: sending, by the SSAF node, a plurality of registration requests to the first SAS service provider system on behalf of a first dummy wireless base station (e.g., a first dummy CBSD) of the first wireless network, said first dummy wireless base station being a fictious non-existent wireless base station; and wherein said determining whether or not the first SAS service provider system is experiencing problems providing SAS services to the first wireless network based on the results of the one or more tests performed on the first SAS service provider system includes: making the determination that the first SAS service provider system is experiencing problems providing SAS services to the first wireless network when the results of the one or more tests performed on the first SAS service provider system indicate that the SAS service provider system is unable to register the first dummy wireless base station with the SAS.

System Embodiment 9. The communications system of System Embodiment 1, wherein determining whether or not the first SAS service provider system is experiencing problems providing services to the first wireless network based on the results of the one or more tests performed on the first SAS service provider system includes: determining that the first SAS service provider system is experiencing problems when the test results indicate no response was received for a threshold number of SAS requests (e.g., dummy CBSD registration requests, dummy CBSD spectrum grant requests, dummy CBSD heartbeat requests) sent to the first SAS service provider system by the SSAF node on behalf of one or more dummy CBSDs within a first period of time, said one or more dummy CBSDs being fictious non-existent CBSDs.

System Embodiment 10. The communications system of System Embodiment 9, wherein the first processor further controls the SSAF node to perform the following operations: in response to determining that the first SAS service provider system is experiencing problems (e.g., has failed), migrating or switching wireless base stations of the first wireless network to a second SAS service provider system; performing on an on-going basis additional tests on the first SAS service provider system to determine when the first SAS service provider system SAS service has been restored (e.g., is back up and running); and upon detecting that the first SAS service provider system SAS service has been restored, migrating or switching the wireless base stations of the first wireless network which had been switched to the second SAS service provider system back to the first SAS service provider system.

System Embodiment 11. The communications system of System Embodiment 10, wherein the first processor further controls the SSAF node to perform the following additional operations: prior to determining that the first SAS service provider system is experiencing problems, sending, by the SSAF node, a test message (e.g., a ping message) to a Spectrum Access System (SAS) to determine whether the SAS is on-line, said SAS being an FCC SAS with which the first SAS service provider system is interacting to provide SAS services; and determining that the SAS is not on-line when no response is received by the SSAF node to the test message (e.g., the SSAF node does not receive a ping response indicating that the SAS is off-line and not available); and determining that the SAS is on-line when a response is received by the SSAF node to the test message (e.g., the SSAF node receives a ping response indicating that the SAS is on-line and available).

System Embodiment 12. The communications system of System Embodiment 10, wherein the first processor further controls the SSAF node to perform the following additional operation: prior to migrating or switching wireless base stations of the first wireless network to the second SAS service provider system, determining by the SSAF node that a Spectrum Access System (SAS) is available, said SAS being an FCC SAS with which the first SAS service provider system is interacting to provide SAS services.

System Embodiment 12B. The communications system of System Embodiment 12A, wherein the first processor further controls the SSAF node to perform the following additional operations: sending, by the SSAF node, a ping message to the SAS; receiving, by the SSAF node, a ping response message from the SAS; and determining that the SAS is available in response to receiving said ping response message.

System Embodiment 13. The communications system of System Embodiment 10, wherein the first processor further controls the SSAF node to perform the following additional operation: prior to migrating or switching wireless base stations of the first wireless network to the second SAS service provider system, performing by the SSAF node tests, on the second SAS service provider system, by sending dummy wireless base station service requests to the second SAS service provider system.

List of Exemplary Numbered Non-Transitory Computer Readable Medium Embodiments

Non-transitory Computer Readable Medium Embodiment 1. A non-transitory computer readable medium including a first set of computer executable instructions which when executed by a processor of a Spectrum Access System switch and availability function (SSAF) node cause the SSAF node to perform the steps of: performing one or more tests on a first Spectrum Access System (SAS) service provider system, said first SAS service provider system providing SAS services to one or more wireless base stations (e.g., CBSDs) of a first wireless network (e.g., a first CBRS network); and determining whether or not the first SAS service provider system is experiencing problems providing SAS services to the first wireless network based on results of the one or more tests performed on the first SAS service provider system.

Non-transitory Computer Readable Medium Embodiment 1A. The non-transitory computer readable medium of Non-transitory Computer Readable Medium Embodiment 1, wherein the SAS services include one or more of the following: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

Non-transitory Computer Readable Medium Embodiment 1B. The non-transitory computer readable medium of Non-transitory Computer Readable Medium Embodiment 1, wherein the SSAF node is implemented as a function of an Operating Service Systems (OSS) or Domain Proxy of the first wireless network.

Non-transitory Computer Readable Medium Embodiment 1C. The non-transitory computer readable medium of Non-transitory Computer Readable Medium Embodiment 1, wherein functionality of the SSAF node is implemented as a cloud service, said SSAF node being implemented in a cloud.

The techniques of various embodiments may be implemented using software, hardware and/or a combination of software and hardware. Various embodiments are directed to apparatus, e.g., wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements. Various embodiments are also directed to methods, e.g., method of controlling and/or operating wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements described herein are implemented using one or more components to perform the steps corresponding to one or more methods, for example, generating or creating messages (e.g., SAS service test messages), message reception, message transmission, performing migration operations, signal processing, sending, comparing, detecting, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements are configured to perform the steps of the methods described as being performed by the wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements, with a processor which includes a component corresponding to each of the steps of the various described methods performed by the device in which the processor is included. In some but not all embodiments a device, e.g., wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a wireless base stations, wireless devices, mobile terminals, network equipment, eNBs, gNBs, CBSDs, CBRS base stations, mobile devices, wireless devices, smart devices, user equipment devices, user devices, computers, smartphones, subscriber devices, core network systems, System Access System, Domain Proxy, OSS including a Domain Proxy, System Access System Switch and Availability (SSAF) function/entity, Spectrum Access System service provider system, servers, nodes, and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method comprising:

performing one or more tests on a first Spectrum Access System (SAS) service provider system, said first SAS service provider system providing SAS services to one or more wireless base stations of a first wireless network; and determining whether or not the first SAS service provider system is experiencing problems providing SAS services to the first wireless network based on results of the one or more tests performed on the first SAS service provider system; and wherein said performing one or more tests on the first SAS service provider system includes requesting one or more SAS services be provided for a first dummy wireless base station of the first wireless network, said first dummy wireless base station being a fictious non-existent wireless base station.

2. The method of claim 1, wherein the SAS services include one or more of the following: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

3. The method of claim 1, wherein the first wireless network is a Citizen Broadband Radio Service (CBRS) network;

wherein the one or more wireless base stations are Citizens Broadband Radio Service Devices (CBSDs); and wherein said first dummy wireless base station is a first dummy CBSD.

4. The method of claim 1, wherein said one or more tests are performed by a Spectrum Access System Switch and Availability Function (SSAF).

5. The method of claim 4, wherein said performing one or more tests on the first SAS service provider system further includes: emulating, by the SSAF, one or more dummy wireless base stations requesting one or more SAS services from the first SAS service provider system, said first dummy wireless base station being one of the one or more dummy wireless base stations; and determining, by the SSAF, which of the one or more SAS services requested by the SSAF are experiencing problems based on one or more of the following: (i) one or more responses received by the SSAF from the first SAS service provider system in response to the one or more SAS service requests, or (ii) failure to receive one or more responses by the SSAF from the first SAS service provider system to the one or more SAS service requests.

6. The method of claim 5, wherein the one or more SAS services include one or more of the following SAS services: (i) wireless base station Spectrum Access System registration services, (ii) spectrum inquiry request services, (iii) spectrum grant request services, (iv) spectrum heartbeat request services, (v) spectrum usage authorization request services, (vi) spectrum relinquishment request services, and (vii) wireless base station SAS de-registration services.

7. The method of claim 3, wherein said one or more tests are performed by a Spectrum Access System Switch and Availability Function (SSAF); and wherein determining whether or not the first SAS service provider system is experiencing problems providing services to the first wireless network based on the results of the one or more tests performed on the first SAS service provider system includes: determining that the first SAS service provider system is experiencing problems when the test results indicate no response was received for a threshold number of SAS requests sent to the first SAS service provider system by the SSAF on behalf of one or more dummy CBSDs within a first period of time, said one or more dummy CBSDs being fictious non-existent CBSDs, said first dummy CBSD being one of the one or more dummy CBSDs.

8. The method of claim 1, further comprising:

in response to determining that the first SAS service provider system is experiencing problems, migrating or switching wireless base stations of the first wireless network to a second SAS service provider system;

performing on an on-going basis additional tests on the first SAS service provider system to determine when the first SAS service provider system SAS service has been restored; and upon detecting that the first SAS service provider system SAS service has been restored, migrating or switching the wireless base stations of the first wireless network which had been switched to the second SAS service provider system back to the first SAS service provider system.

9. The method of claim 8, prior to migrating or switching wireless base stations of the first wireless network to the second SAS service provider system, determining by a Spectrum Access System Switch and Availability Function (SSAF) that a Spectrum Access System (SAS) is available, said SAS being a Federal Communications Commission (FCC) SAS with which the first SAS service provider system is interacting to provide SAS services.

10. The method of claim 4, further comprising:

prior to performing said one or more tests on the first SAS service provider system, generating, by the SSAF, information for registering the first dummy wireless base station with a Spectrum Access System.

11. The method of claim 1, wherein said one or more tests performed on the first SAS service provider system include tests to register one or more dummy wireless base stations with a Spectrum Access System (SAS), said first dummy wireless base station being one of the one or more dummy wireless base stations; and wherein said determining whether or not the first SAS service provider system is experiencing problems providing SAS services to the first wireless network based on results of the one or more tests performed on the first SAS service provider system includes: making the determination that the first SAS service provider system is experiencing problems providing SAS services to the first wireless network when the results of the one or more tests performed on the first SAS service provider system indicate that the SAS service provider system is unable to register the one or more dummy wireless base stations with the SAS.

12. A communications system comprising:

a Spectrum Access System Switch and Availability Function (SSAF) node including:

memory; and a first processor that controls the SSAF node to perform the following operations:

performing one or more tests on a first Spectrum Access System (SAS) service provider system, said first SAS service provider system providing SAS services to one or more wireless base stations of a first wireless network; and determining whether or not the first SAS service provider system is experiencing problems providing SAS services to the first wireless network based on results of the one or more tests performed on the first SAS service provider system; and wherein said performing one or more tests on the first SAS service provider system includes requesting one or more SAS services be provided for a first dummy wireless base station of the first wireless network, said first dummy wireless base station being a fictious non-existent wireless base station.

13. The communications system of claim 12, wherein the first wireless network is a Citizen Broadband Radio Service (CBRS) network;

wherein the one or more wireless base stations are Citizens Broadband Radio Service Devices (CBSDs); and wherein said first dummy wireless base station is a first dummy CBSD.

14. The communications system of claim 12, wherein the first processor further controls the SSAF node to perform the following operation:

generating information for registering the first dummy wireless base station with a Spectrum Access System prior to performing said one or more tests on the first SAS service provider system.

15. The communications system of claim 12, wherein said performing one or more tests on the first SAS service provider system further includes: emulating by the SSAF node one or more dummy wireless base stations requesting one or more SAS services from the first SAS service provider system, said first dummy wireless base station being one of the one or more dummy wireless base stations; and determining, by the SSAF node, which of the one or more SAS services requested by the SSAF node are experiencing problems based on one or more of the following: (i) one or more responses received by the SSAF node from the first SAS service provider system in response to the one or more SAS service requests, or (ii) failure to receive one or more responses by the SSAF node from the first SAS service provider system to the one or more SAS service requests.

16. The communications system of claim 12, wherein said one or more tests performed on the first SAS service provider system include tests to register one or more dummy wireless base stations with a Spectrum Access System (SAS), said first dummy wireless base station being one of the one or more dummy wireless base stations; and wherein said determining whether or not the first SAS service provider system is experiencing problems providing SAS services to the first wireless network based on results of the one or more tests performed on the first SAS service provider system includes: making a determination that the first SAS service provider system is experiencing problems providing SAS services to the first wireless network when the results of the one or more tests performed on the first SAS service provider system indicate that the SAS service provider system is unable to register the one or more dummy wireless base stations with the SAS.

17. The communications system of claim 13, wherein determining whether or not the first SAS service provider system is experiencing problems providing services to the first wireless network based on the results of the one or more tests performed on the first SAS service provider system includes: determining that the first SAS service provider system is experiencing problems when the test results indicate no response was received for a threshold number of SAS requests sent to the first SAS service provider system by the SSAF node on behalf of one or more dummy CBSDs within a first period of time, said one or more dummy CBSDs being fictious non-existent CBSDs, said first dummy CBSD being one of the one or more dummy CBSDs.

18. The communications system of claim 12, wherein the first processor further controls the SSAF node to perform the following operations in response to determining that the first SAS service provider system is experiencing problems:

migrating or switching wireless base stations of the first wireless network to a second SAS service provider system;

performing on an on-going basis additional tests on the first SAS service provider system to determine when the first SAS service provider system SAS service has been restored; and upon detecting that the first SAS service provider system SAS service has been restored, migrating or switching the wireless base stations of the first wireless network which had been switched to the second SAS service provider system back to the first SAS service provider system.

19. The communications system of claim 12, wherein the first processor further controls the SSAF node to perform the following operation:

determining, prior to migrating or switching wireless base stations of the first wireless network to the second SAS service provider system, that a Spectrum Access System (SAS) is available, said SAS being a Federal Communications Commission (FCC) SAS with which the first SAS service provider system is interacting to provide SAS services.

20. A non-transitory computer readable medium including a first set of computer executable instructions which when executed by a processor of a Spectrum Access System Switch and Availability Function (SSAF) node cause the SSAF node to perform the steps of:

performing one or more tests on a first Spectrum Access System (SAS) service provider system, said first SAS service provider system providing SAS services to one or more wireless base stations of a first wireless network; and determining whether or not the first SAS service provider system is experiencing problems providing SAS services to the first wireless network based on results of the one or more tests performed on the first SAS service provider system; and wherein said performing one or more tests on the first SAS service provider system includes requesting one or more SAS services be provided for a first dummy wireless base station of the first wireless network, said first dummy wireless base station being a fictious non-existent wireless base station.

* * * * *